(12) United States Patent
Kim

(10) Patent No.: US 11,190,400 B2
(45) Date of Patent: Nov. 30, 2021

(54) IDENTIFYING AND AUTOMATING A DEVICE TYPE USING IMAGE DATA

(71) Applicant: Belkin International, Inc., Playa Vista, CA (US)

(72) Inventor: Ryan Yong Kim, Rolling Hills Estates, CA (US)

(73) Assignee: BELKIN INTERNATIONAL, INC., Playa Vista, CA (US)

( * ) Notice: Subject to any disclaimer, the term of this patent is extended or adjusted under 35 U.S.C. 154(b) by 619 days.

(21) Appl. No.: 16/156,910

(22) Filed: Oct. 10, 2018

(65) Prior Publication Data

US 2019/0052524 A1 Feb. 14, 2019

Related U.S. Application Data

(63) Continuation-in-part of application No. 15/135,980, filed on Apr. 22, 2016, which is a continuation-in-part (Continued)

(51) Int. Cl.
*H04L 12/24* (2006.01)
*H04L 29/08* (2006.01)
(Continued)

(52) U.S. Cl.
CPC .......... *H04L 41/082* (2013.01); *F24H 9/2007* (2013.01); *G06K 9/00201* (2013.01);
(Continued)

(58) Field of Classification Search
CPC .............. H04L 41/082; H04L 41/0816; H04L 41/0853; H04L 41/0869; H04L 12/403; H04L 12/4625; H04L 12/6418; H04L 43/062; H04L 43/0876; H04L 67/10; H04L 67/12; H04W 4/70; F24H 9/2007; G06K 9/00201; G01D 4/002; H04Q 9/00; H04Q 2209/00; H04Q 2209/10; H04Q 2209/40;
(Continued)

(56) References Cited

U.S. PATENT DOCUMENTS 5,812,422 A 9/1998 Lyons
6,255,744 B1 7/2001 Shih et al.
(Continued)

OTHER PUBLICATIONS

Final Office Action dated Dec. 10, 2020 in U.S. Appl. No. 15/135,980, 26 pages.

*Primary Examiner* — Franklin D Balseca
(74) *Attorney, Agent, or Firm* — Kilpatrick Townsend & Stockton LLP

(57) ABSTRACT

Techniques for identifying a type of an electronic device using image data corresponding to the electronic device are provided. For example, a method may include receiving image data and textual data corresponding to an electronic device. The image data and textual data may be analyzed, and a type of the electronic device can be identified based on the analysis. Usage data associated with other electronic devices of the same type may be analyzed, and further processing may be performed based on the analysis of the usage data. In some embodiments, the further processing may include transmitting a message to a user device, the message including content related to usage of the electronic device.

20 Claims, 22 Drawing Sheets

Related U.S. Application Data of application No. 14/959,220, filed on Dec. 4, 2015, application No. 16/156,910, which is a continuation-in-part of application No. 14/959,409, filed on Dec. 4, 2015, now Pat. No. 1,010,716, and a continuation-in-part of application No. 14/550,478, filed on Nov. 21, 2014, now Pat. No. 10,003,497, which is a continuation of application No. 14/550,199, filed on Nov. 21, 2014, now Pat. No. 10,200,244, application No. 16/156,910, which is a continuation-in-part of application No. 14/550,519, filed on Nov. 21, 2014, now Pat. No. 9,967,145, which is a continuation of application No. 14/550,199, said application No. 15/135,980 is a continuation-in-part of application No. 14/508,100, filed on Oct. 7, 2014, now Pat. No. 9,348,689, which is a continuation of application No. 14/508,000, filed on Oct. 7, 2014, now Pat. No. 9,110,848, said application No. 15/135,980 is a continuation-in-part of application No. 14/755,777, filed on Jun. 30, 2015, now Pat. No. 9,858,771, which is a continuation of application No. 14/453,350, filed on Aug. 6, 2014, now Pat. No. 9,111,221, which is a continuation of application No. 14/452,832, filed on Aug. 6, 2014, now Pat. No. 9,224,277, said application No. 15/135,980 is a continuation-in-part of application No. 14/949,111, filed on Nov. 23, 2015, now Pat. No. 9,508,233, which is a continuation of application No. 14/452,832, said application No. 15/135,980 is a continuation-in-part of application No. 14/670,285, filed on Mar. 26, 2015, now Pat. No. 10,460,243, which is a continuation of application No. 14/668,828, filed on Mar. 25, 2015, now Pat. No. 9,299,029.

(60) Provisional application No. 62/087,697, filed on Dec. 4, 2014, provisional application No. 62/088,229, filed on Dec. 5, 2015, provisional application No. 62/087,704, filed on Dec. 4, 2014, provisional application No. 62/087,745, filed on Dec. 4, 2014, provisional application No. 62/087,780, filed on Dec. 4, 2014, provisional application No. 62/091,458, filed on Dec. 12, 2014, provisional application No. 62/090,344, filed on Dec. 10, 2014.

(51) Int. Cl.
| | | |
|---|---|---|
| *H04Q 9/00* | (2006.01) | |
| *F24H 9/20* | (2006.01) | |
| *H04L 12/26* | (2006.01) | |
| *H04L 12/46* | (2006.01) | |
| *H04L 12/403* | (2006.01) | |
| *H04L 12/64* | (2006.01) | |
| *H04W 4/70* | (2018.01) | |
| *G06K 9/00* | (2006.01) | |
| *G01D 4/00* | (2006.01) | |

(52) U.S. Cl.
CPC ........ *H04L 12/403* (2013.01); *H04L 12/4625* (2013.01); *H04L 12/6418* (2013.01); *H04L 41/0816* (2013.01); *H04L 41/0853* (2013.01); *H04L 41/0869* (2013.01); *H04L 43/062* (2013.01); *H04L 43/0876* (2013.01); *H04L 67/10* (2013.01); *H04L 67/12* (2013.01); *H04Q 9/00* (2013.01); *H04W 4/70* (2018.02); *G01D 4/002* (2013.01); *H04Q 2209/00* (2013.01); *H04Q 2209/10* (2013.01); *H04Q 2209/40* (2013.01); *H04Q 2209/60* (2013.01); *H04Q 2209/80* (2013.01); *H04Q 2209/823* (2013.01); *H04Q 2209/86* (2013.01)

(58) Field of Classification Search
CPC ........... H04Q 2209/60; H04Q 2209/80; H04Q 2209/823; H04Q 2209/86
See application file for complete search history.

(56) References Cited

U.S. PATENT DOCUMENTS

| | | | |
|---|---|---|---|
| 6,286,106 B1 | 9/2001 | Flannery | |
| 6,941,479 B1 | 9/2005 | Sugiura | |
| 7,260,695 B2 | 8/2007 | Batchelor et al. | |
| 7,334,158 B2 | 2/2008 | Bibikar et al. | |
| 7,624,174 B2 | 11/2009 | Sanghvi | |
| 7,653,212 B2* | 1/2010 | Haughawout | G06F 3/0482 382/100 |
| 8,155,766 B2 | 4/2012 | Ichikawa et al. | |
| 8,166,247 B2 | 4/2012 | Schwarz et al. | |
| 8,193,929 B1 | 6/2012 | Siu et al. | |
| 8,266,398 B2 | 9/2012 | Manczak et al. | |
| 8,495,423 B2 | 7/2013 | Frost et al. | |
| 8,819,471 B2 | 8/2014 | Alsina et al. | |
| 9,111,221 B1 | 8/2015 | Kelly et al. | |
| 9,253,455 B1 | 2/2016 | Harrison et al. | |
| 9,374,874 B1 | 6/2016 | Ewing | |
| 9,679,470 B2* | 6/2017 | Pratt | G08C 17/02 |
| 2004/0078655 A1 | 4/2004 | Sung | |
| 2005/0015424 A1 | 1/2005 | Aguilera et al. | |
| 2005/0210323 A1 | 9/2005 | Batchelor et al. | |
| 2005/0289393 A1 | 12/2005 | Bibikar et al. | |
| 2007/0282778 A1 | 12/2007 | Chan et al. | |
| 2009/0292887 A1 | 11/2009 | Manczak et al. | |
| 2009/0319569 A1 | 12/2009 | Parks | |
| 2010/0148672 A1 | 6/2010 | Hopper | |
| 2010/0150102 A1 | 6/2010 | Li et al. | |
| 2010/0289643 A1 | 11/2010 | Trundle et al. | |
| 2010/0323657 A1 | 12/2010 | Barnard et al. | |
| 2011/0066765 A1 | 3/2011 | Mochizuki | |
| 2011/0219259 A1 | 9/2011 | Frost et al. | |
| 2011/0230986 A1 | 9/2011 | Lafortune et al. | |
| 2011/0276215 A1 | 11/2011 | Wendling et al. | |
| 2012/0022675 A1 | 1/2012 | Kristjansson et al. | |
| 2012/0022812 A1 | 1/2012 | Longtin | |
| 2012/0246417 A1 | 9/2012 | Kaji et al. | |
| 2012/0296909 A1 | 11/2012 | Cao et al. | |
| 2012/0311366 A1 | 12/2012 | Alsina et al. | |
| 2012/0323510 A1 | 12/2012 | Bell et al. | |
| 2013/0005488 A1 | 1/2013 | Evans et al. | |
| 2013/0019076 A1 | 1/2013 | Amidi et al. | |
| 2013/0022132 A1 | 1/2013 | Paulsen et al. | |
| 2013/0109404 A1 | 5/2013 | Husney | |
| 2013/0113616 A1 | 5/2013 | Pinel et al. | |
| 2013/0132566 A1 | 5/2013 | Olsen et al. | |
| 2013/0142001 A1 | 6/2013 | Sweere et al. | |
| 2013/0179715 A1 | 7/2013 | Sun et al. | |
| 2013/0252712 A1 | 9/2013 | Wells et al. | |
| 2013/0285556 A1 | 10/2013 | Challapali et al. | |
| 2014/0005809 A1 | 1/2014 | Frei et al. | |
| 2014/0074307 A1 | 3/2014 | Matsuyama et al. | |
| 2014/0103819 A1 | 4/2014 | Mohan | |
| 2014/0122378 A1 | 5/2014 | Swaminathan et al. | |
| 2014/0122396 A1 | 5/2014 | Swaminathan et al. | |
| 2014/0128021 A1 | 5/2014 | Walker et al. | |
| 2014/0181012 A1 | 6/2014 | Min et al. | |
| 2014/0189234 A1 | 7/2014 | Tang et al. | |
| 2014/0222241 A1 | 8/2014 | Ols | |
| 2014/0266669 A1 | 9/2014 | Fadell et al. | |
| 2014/0281153 A1 | 9/2014 | Mehrotra et al. | |
| 2015/0019553 A1 | 1/2015 | Shaashua et al. | |
| 2015/0039047 A1 | 2/2015 | Parker | |
| 2015/0097682 A1 | 4/2015 | Rossi et al. | |
| 2015/0102928 A1 | 4/2015 | Sirotkin | |
| 2015/0105911 A1 | 4/2015 | Slupik et al. | |
| 2015/0156074 A1 | 6/2015 | Yamada et al. | |
| 2015/0161137 A1 | 6/2015 | Lashina et al. | |
| 2015/0177705 A1 | 6/2015 | Mylet | |

(56) References Cited

U.S. PATENT DOCUMENTS

| | | |
|---|---|---|
| 2015/0227118 A1 | 8/2015 | Wong |
| 2015/0268683 A1 | 9/2015 | Mccullough et al. |
| 2015/0331711 A1 | 11/2015 | Huang et al. |
| 2016/0041565 A1 | 2/2016 | Edwards |
| 2016/0094386 A1 | 3/2016 | Kaufman et al. |
| 2016/0112240 A1 | 4/2016 | Sundaresan et al. |
| 2016/0255697 A1 | 9/2016 | Bhide |
| 2016/0308731 A1 | 10/2016 | Yamashita et al. |
| 2016/0381458 A1 | 12/2016 | Kim et al. |
| 2017/0103327 A1 | 4/2017 | Penilla et al. |
| 2017/0124830 A1 | 5/2017 | Fadell et al. |
| 2017/0351226 A1* | 12/2017 | Bliss .................. G05B 19/4063 |

\* cited by examiner

IDENTIFYING AND AUTOMATING A DEVICE TYPE USING IMAGE DATA

CROSS-REFERENCE TO RELATED APPLICATIONS

This application is a continuation-in-part of U.S. application Ser. No. 15/135,980, filed on Apr. 22, 2016, which is continuation-in-part of U.S. application Ser. No. 14/959,220, filed on Dec. 4, 2015, which claims the benefit of and priority to U.S. Provisional Application No. 62/087,697, filed Dec. 4, 2014, and U.S. Provisional Application No. 62/088,229, filed Dec. 5, 2014. This application is also a continuation-in-part of U.S. application Ser. No. 14/959,409, filed on Dec. 4, 2015, which claims the benefit of and priority to U.S. Provisional Application No. 62/087,704, filed Dec. 4, 2014, U.S. Provisional Application No. 62/087,745, filed Dec. 4, 2014, and U.S. Provisional Application No. 62/087,780, filed Dec. 4, 2014. This application is also a continuation-in-part of U.S. application Ser. No. 14/550,478, filed Nov. 21, 2014, now U.S. Pat. No. 10,003,497, which is a continuation of U.S. Application Ser. No. 14/550,199, filed Nov. 21, 2014. This application is also a continuation-in-part of U.S. application Ser. No. 14/550,519 filed Nov. 21, 2014, now U.S. Pat. No. 9,967,145, which is a continuation of U.S. application Ser. No. 14/550,199, filed Nov. 21, 2014. U.S. application Ser. No. 15/135,980 is also a continuation-in-part of U.S. application Ser. No. 14/508,100, filed on Oct. 7, 2014, now U.S. Pat. No. 9,348,689, which is a continuation of U.S. application Ser. No. 14/508,000, filed on Oct. 7, 2014, now issued as U.S. Pat. No. 9,110,848. U.S. application Ser. No. 15/135,980 is also a continuation-in-part of U.S. application Ser. No. 14/755,777, filed on Jun. 30, 2015, now U.S. Pat. No. 9,858,771, which is a continuation of U.S. application Ser. No. 14/453,350, filed on Aug. 6, 2014, now U.S. Pat. No. 9,111,221, which is a continuation of U.S. application Ser. No. 14/452,832, filed on Aug. 6, 2014, now U.S. Pat. No. 9,224,277. U.S. application Ser. No. 15/135,980 is also a continuation-in-part of U.S. application Ser. No. 14/949,111, filed on Nov. 23, 2015, now U.S. Pat. No. 9,508,233, which is a continuation of U.S. application Ser. No. 14/452,832, filed on Aug. 6, 2014, now U.S. Pat. No. 9,224,277. U.S. application Ser. No. 15/135,980 is also a continuation-in-part of U.S. application Ser. No. 14/670,285, filed on Mar. 26, 2015, which is a continuation of U.S. application Ser. No. 14/668,828, filed on Mar. 25, 2015, now U.S. Pat. No. 9,299,029, which claims the benefit of and priority to U.S. Provisional Application No. 62/091,458, filed on Dec. 12, 2014, and U.S. Provisional Application 62/090,344, filed on Dec. 10, 2014. All of these applications are hereby incorporated by reference in their entireties for all purposes.

TECHNICAL FIELD

The present disclosure relates to identifying a type of an electronic device. Specifically, various techniques and systems are provided for identifying a type of an electronic device using image data corresponding to the electronic device.

BACKGROUND

Residences, offices, and other locations may have electronic devices (e.g., lamps, fans, heaters, televisions, motion sensors, etc.). Some electronic devices may be operated within a network environment. For example, an automation network may allow a user to schedule or otherwise automate functionalities of various electronic device connected to the network. Electronic devices may be associated with a large number of functionalities in addition to many possible permutations of automation settings. However, users may be unaware of some functionalities and may not utilize the most optimal automation rules and settings.

BRIEF SUMMARY

Techniques are described for identifying a type of electronic device using image data corresponding to the electronic device. In some embodiments, the type of an electronic device can be used to identify other electronic devices of the same type so that usage of such other devices by other users may be analyzed. Recommendations and other types of content related to usage of the electronic device can be provided.

In some embodiments, a computer-implemented method may be provided. The method may include receiving, at a computing device, image data and textual data corresponding to an electronic device. The image data and textual data may be analyzed, and a type of the electronic device can be analyzed based on the analysis. Usage data associated with other electronic devices of the same type may be analyzed, and further processing may be performed based on the analysis of the usage data.

In some embodiments, a system may be provided. The system may include one or more data processors and a non-transitory computer-readable storage medium containing instructions which when executed on the one or more data processors, cause the one or more processors to perform operations including receiving image data and textual data corresponding to an electronic device. The image data and textual data may be analyzed, and a type of the electronic device can be analyzed based on the analysis. Usage data associated with other electronic devices of the same type may be analyzed, and further processing may be performed based on the analysis of the usage data.

In some embodiments, a computer-program product tangibly embodied in a non-transitory machine-readable storage medium may be provided. The computer-program product may include instructions configured to cause a data processing apparatus to receive image data and textual data corresponding to an electronic device. The image data and textual data may be analyzed, and a type of the electronic device can be analyzed based on the analysis. Usage data associated with other electronic devices of the same type may be analyzed, and further processing may be performed based on the analysis of the usage data.

BRIEF DESCRIPTION OF THE DRAWINGS

Illustrative embodiments of the present invention are described in detail below with reference to the following drawing figures.

DETAILED DESCRIPTION

Figure 1:
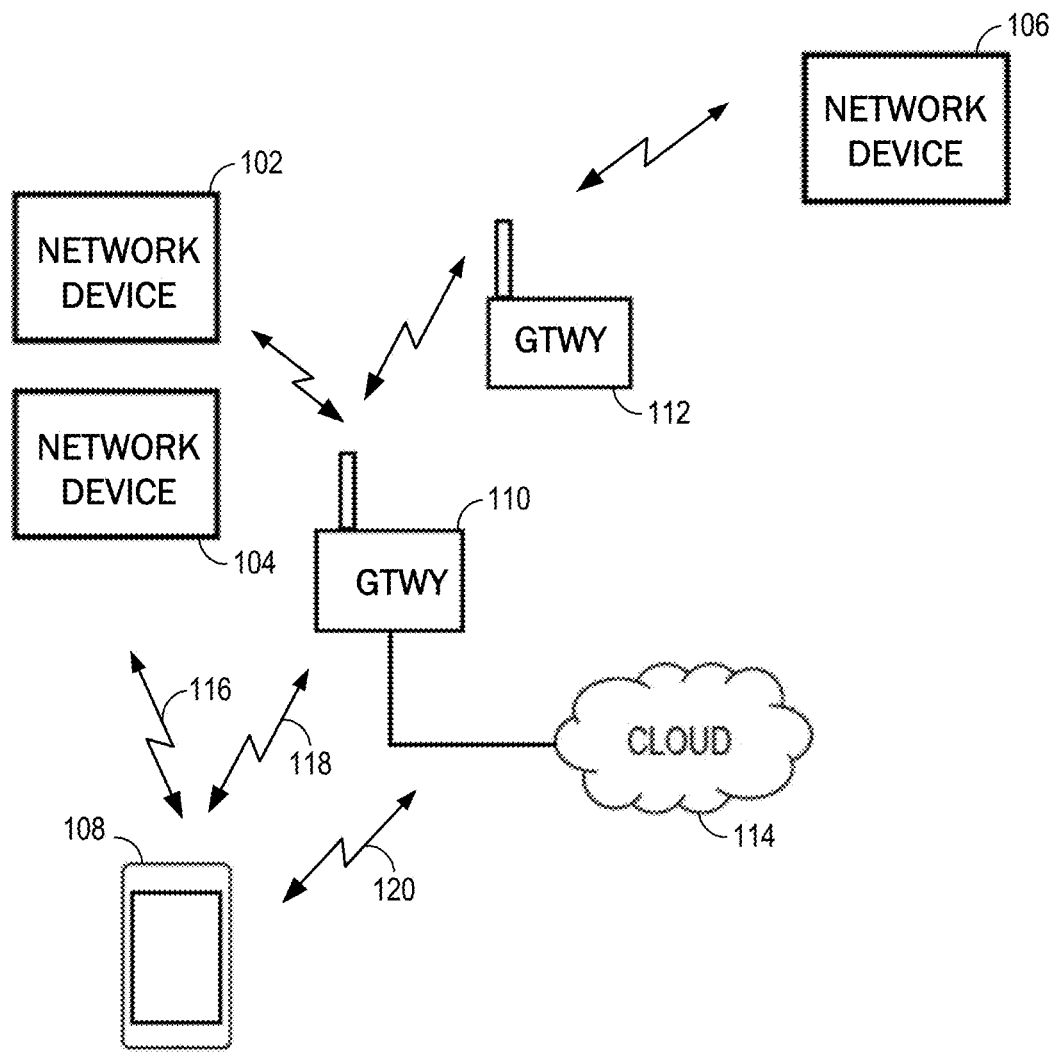
FIG. 1 is an illustration of an example of a wireless network environment, in accordance with some embodiments.

In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control one or more electronic devices (e.g., appliances) within an environment that can support the network. For example, an environment can include a home, an office, a business, an automobile, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

A local area network, such as a user's home local area network, can include multiple network devices that provide various functionalities. Network devices may be accessed and controlled using an access device and/or one or more network gateways. One or more gateways in the local area network may be designated as a primary gateway that provides the local area network with access to an external network. The local area network can also extend outside of the user's home and may include network devices located outside of the user's home. For instance, the local area network can include network devices such as exterior motion sensors, exterior lighting (e.g., porch lights, walkway lights, security lights, or the like), garage door openers, sprinkler systems, or other network devices that are exterior to the user's home. It is desirable for a user to be able to access the network devices while located within the local area network and also while located remotely from the local area network. For example, a user may access the network devices using an access device within the local area network or remotely from the local area network.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a WiFi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

An accountless authentication process may also be performed when the user is remote so that the user can access network devices within the logical network, using an access device, without having to enter network device login credentials. While remote, the access device may access the network devices in the local area network using an external network, such as a cloud network, the Internet, or the like. One or more gateways may provide the network devices and/or access device connected to the local area network with access to the external network. To allow accountless authentication, a cloud network server may provide a network ID and/or one or more keys to a network device and/or to the access device (e.g., running an application, program, or the like). In some cases, a unique key may be generated for the network device and a separate unique key may be generated for the access device. The keys may be specifically encrypted with unique information identifiable only to the network device and the access device. The network device and the access device may be authenticated using the network ID and/or each device's corresponding key each time the network device or access device attempts to access the cloud network server.

In some embodiments, a home local area network may include a single gateway, such as a router. A network device within the local area network may pair with or connect to the gateway and may obtain credentials from the gateway. For example, when the network device is powered on, a list of gateways that are detected by the network device may be displayed on an access device (e.g., via an application, program, or the like installed on and executed by the access device). In this example, only the single gateway is included in the home local area network (e.g., any other displayed gateways may be part of other local area networks). In some embodiments, only the single gateway may be displayed (e.g., when only the single gateway is detected by the network device). A user may select the single gateway as the gateway with which the network device is to pair and may enter login information for accessing the gateway. The login information may be the same information that was originally set up for accessing the gateway. The access device may send the login information to the network device and the network device may use the login information to pair with the gateway. The network device may then obtain the credentials from the gateway. The credentials may include a service set identification (SSID) of the home local area network, a media access control (MAC) address of the gateway, and/or the like. The network device may transmit the credentials to a server, such as a cloud network server. In some embodiments, the network device may also send to the server information relating to the network device (e.g., MAC address, serial number, or the like) and/or information relating to the access device (e.g., MAC address, serial number, application unique identifier, or the like).

The cloud network server may register the gateway as a logical network and may assign the first logical network a network identifier (ID). The cloud network server may further generate a set of security keys, which may include one or more security keys. For example, the server may generate a unique key for the network device and a separate unique key for the access device. The server may associate the network device and the access device with the logical network by storing the network ID and the set of security keys in a record or profile. The cloud network server may then transmit the network ID and the set of security keys to the network device. The network device may store the network ID and its unique security key. The network device may also send the network ID and the access device's unique security key to the access device. The network device and the access device may then communicate with the cloud server using the network ID and the unique key generated for each device. Accordingly, the user may remotely access the network device via the cloud network without logging in each time access is requested. Also, the network device can communicate with the server regarding the logical network.

In some embodiments, a local area network may include multiple gateways (e.g., a router and a range extender) and multiple network devices. For example, a local area network may include a first gateway paired with a first network device, and a second gateway paired with a second network device. In the event credentials for each gateway are used to create a logical network, a server (e.g., a cloud network server) may register the first gateway as a first logical network and may register the second gateway as a second logical network. The server may generate a first network ID and a first set of security keys for the first logical network. The first set of security keys may include a unique security key for the first network device and a unique security key for the access device for use in accessing the first network device on the first logical network. The server may register the second gateway as the second logical network due to differences in the credentials between the first gateway and second gateway. The server may assign the second gateway a second network ID and may generate a second set of security keys. For example, the server may generate a unique security key for the second network device and may generate a unique security key for the access device for use in accessing the second network device on the second logical network. The server may associate the first network device and the access device with the first logical network by storing the first network ID and the first set of security keys in a first record or profile. The server may also associate the second network device and the access device with the second logical network by storing the second network ID and the second set of security keys in a record or profile. The server may then transmit the first network ID and the first set of security keys to the first network device, and may transmit the second network ID and the second set of security keys to the second network device. The two network devices may store the respective network ID and set of security keys of the gateway with which each network device is connected. Each network device may send the respective network ID and the access device's unique security key to the access device. The network devices and the access device may then communicate with the cloud server using the respective network ID and the unique key generated for each device.

Accordingly, when multiple gateways are included in the home local area network, multiple logical networks associated with different network identifiers may be generated for the local area network. When the access device is located within range of both gateways in the local area network, there is no problem accessing both network devices due to the ability of the access device to perform local discovery techniques (e.g., universal plug and play (UPnP)). However, when the user is located remotely from the local area network, the access device may only be associated with one logical network at a time, which prevents the access device from accessing network devices of other logical networks within the local area network.

A computing device (e.g., a user device such as a cellular phone) may determine that one or more network devices are connected to the local area network. The determination may be made based on whether the computing device is located within the wireless network of the device or located remote from the wireless network. The computing device may have access to the wireless network based on its authentication with a logical network which enables access to the wireless network. In some embodiments, the computing device may perform local network discovery while within the wireless network to identify the devices connected to the network. Upon determining that the computing device is not located within the network, the computing device can determine the devices in the network by communication with a cloud network to obtain information about the devices on the network. The cloud network can store a status of devices on the network. The computing device can also determine devices on the network by accessing a local cache that can contain information it has previously received about devices known to exist on the network. The computing device can determine a status of the devices based on its local cache, information received from the cloud, or by direct communication with the devices within the local network. The computing device can access status information from the local cache to present in a display to a user.

The computing device may execute an application that can cause the computing device to present a graphical interface including information (e.g., status, name, icon, etc.) about devices discovered on the network. The graphical interface can present a visual interface for each device accessible on the network. In some embodiments, the visual interface corresponding to a network device can be rendered as a modular tile with one or more interactive elements and/or one or more interactive areas to control operation of the device. The visual interface corresponding to a network device can provide a status or state of the network device (e.g., on/off). Information displayed in a visual interface can include, for example, a default icon, a default name, interactive elements, and/or interactive areas for controlling one or more functionalities of a network device. The functionalities can include, for example, powering the network device on and off. The functionalities can enable adjustment of adjustable attributes and/or settings for a device. For example, a device can be a light bulb, for which attributes or settings (e.g., brightness) can be controlled via the tile.

In some embodiments, updated information can be provided that causes the information displayed in a tile corresponding to a network device to be modified. The updated information may include updated image data, textual data, and/or a status of the device. In some embodiments, updated image data (e.g., a photo of an electronic device such as an appliance coupled to the network device) and textual data (e.g., a description of the electronic device) provided by a user may replace the default icon and default name received and displayed when the network device was first discovered on the network.

As described herein, techniques are provided that allow the type of an electronic device to be identified so that usage data associated with other electronic device of the same type may be identified and analyzed. For example, a type of an electronic device may be identified using image and textual analysis. It may be desirable to identify the type of the electronic device to identify other electronic devices of the same type so that usage of the other electronic devices can be analyzed and recommendations (e.g., rules, settings, etc.) or other content related to usage of the electronic device can be provided. The techniques described herein may help identify the types of electronic devices using image data and textual data and may use the identification to enhance the operability of the electronic device, thus streamlining the customization process associated with the local area network (e.g., automation network) and improving utilization of device functionalities in addition to optimization of rules and other device settings.

Accordingly, techniques and systems are described herein for identifying a type of an electronic device using image data and text data associated with the electronic device, identifying other electronic devices of the same type, and analyzing usage data associated with the other electronic devices to provide content (e.g., recommendations) related to usage of the electronic device.

FIG. 1 illustrates an example of a wireless local area network 100. The local area network 100 includes a network device 102, a network device 104, and network device 106. In some embodiments, the network devices 102, 104, 106 may include home automation network devices that allow a user to access, control, and/or configure various electronic devices such as home appliances located within the user's home, such as a television, radio, light, a fan, a humidifier, a sensor, microwave, iron, and/or the like. For example, network device 102 may include a home automation switch that may be coupled with a home appliance. In some embodiments, network devices such as a home automation network device may be used in other environments (e.g., outside of a home), such as a business, a school, an establishment, or any place that can support the local area network 100 to enable communication with network devices. For example, a network device can allow a user to access, control, and/or configure electronic devices including office-related devices (e.g., copy machine, printer, fax machine, the like), audio-related devices (e.g., a receiver, a speaker, the like), media-playback devices (e.g., a compact disc player, a CD player, the like), video-related devices (e.g., a projector, a DVD player, the like), computing devices (e.g., a home computer, a laptop computer, a tablet, a personal digital assistant (PDA), a computing device, a wearable device, the like), lighting devices (e.g., a lamp, a light bulb, the like), devices associated with a security system, devices associated with an alarm system, and devices that can be operated in an automobile (e.g., radio devices, navigation devices, the like).

A user may communicate with the network devices 102, 104, 106 using an access device 108. The access device 108 may include any human-to-machine interface with network connection capability that allows access to a network. For example, the access device 108 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect® sensor, Wiimote®, or the like), an internet of things (IoT) device interface (e.g., an Internet enabled appliance such as a wall switch, a control interface, or the like). While only a single access device 108 is shown in FIG. 1, one of ordinary skill in the art will appreciate that multiple access devices may connect with the network devices 102, 104, 106. The user may interact with the network devices 102, 104, or 106 using an application, a web browser, a proprietary program, or any other program executed and operated by the access device 108. In some embodiments, the access device 108 may communicate directly with the network devices 102, 104, 106 (e.g., communication signal 116). In some embodiments, the access device 108 may communicate with the network devices 102, 104, 106 via the gateways 110, 112 (e.g., communication signal 118) and/or the cloud network 114 (e.g., communication signal 120).

The local area network 100 may include a wireless network, a wired network, or a combination of a wired and wireless network. A wireless network may include any wireless interface or combination of wireless interfaces (e.g., Zigbee®, Bluetooth®, WiFi®, IR, cellular, LTE, WiMax®, or the like). A wired network may include any wired interface (e.g., fiber, ethernet, powerline ethernet, ethernet over coaxial cable, digital signal line (DSL), or the like). The wired and/or wireless networks may be implemented using various routers, access points, bridges, gateways, or the like, to connect devices in the local area network 100. For example, the local area network may include gateway 110 and gateway 112. Gateway 110 or 112 can be utilized for providing communication capabilities to network devices 102, 104, 106 and/or access device 108 via radio signals in order to provide communication, location, and/or other services to the devices. While two gateways 110 and 112 are shown in FIG. 1, one of ordinary skill in the art will appreciate that any number of gateways may be present within the local area network 100. The network access provided by gateway 110 and gateway 112 may be of any type of network familiar to those skilled in the art that can support data communications using any of a variety of commercially-available protocols. For example, gateways 110, 112 may provide wireless communication capabilities for the local area network 100 using particular communications protocols, such as WiFi™ (e.g., IEEE 802.11 family standards, or other wireless communication technologies, or any combination thereof). Using the communications protocol(s), the gateways 110, 112 may transmit and receive radio frequencies with which wireless enabled devices in local area network 100 can communicate. A gateway may also be referred to as a base station, an access point, Node B, Evolved Node B (eNodeB), access point base station, a Femtocell, home base station, home Node B, home eNodeB, or the like. The gateways 110, 112 may include a router, a modem, a range extender, and/or any other device that provides network access among one or more computing devices and/or external networks. For example, gateway 110 may include a router and gateway 112 may include a range extender.

The gateways 110 and 112 may also provide the access device 108 and the network devices 102, 104, 106 with access to one or more external networks, such as the cloud network 114, the Internet, and/or other wide area networks. The cloud network 114 may include a cloud infrastructure system that provides cloud services. In certain embodiments, services provided by the cloud network 114 may include a host of services that are made available to users of the cloud infrastructure system on demand, such as registration and access control of network devices 102, 104, 106. Services provided by the cloud infrastructure system can dynamically scale to meet the needs of its users. The cloud network 114 may comprise one or more computers, servers, and/or systems. In some embodiments, the computers, servers, and/or systems that make up the cloud network 114 are different from the user's own on-premises computers, servers, and/or systems. For example, the cloud network 114 may host an application, and a user may, via a communication network such as the Internet, on demand, order and use the application.

In some embodiments, the cloud network 114 may host a Network Address Translation (NAT) Traversal application in order to establish a secure connection between the cloud network 114 and one or more of the network devices 102, 104, 106. For example, a separate secure Transmission Control Protocol (TCP) connection may be established by each network device 102, 104, 106 for communicating between each network device 102, 104, 106 and the cloud network 114. In some embodiments, each secure connection may be kept open for an indefinite period of time so that the cloud network 114 can initiate communications with each respective network device 102, 104, or 106 at any time. In some cases, other types of communications between the cloud network 114 and the network devices 102, 104, 106 and/or the access device 108 may be supported using other types of communication protocols, such as a Hypertext Transfer Protocol (HTTP) protocol, a Hypertext Transfer Protocol Secure (HTTPS) protocol, or the like. In some embodiments, communications initiated by the cloud network 114 may be conducted over the TCP connection, and communications initiated by a network device may be conducted over a HTTP or HTTPS connection. In certain embodiments, the cloud network 114 may include a suite of applications, middleware, and database service offerings that are delivered to a customer in a self-service, subscription-based, elastically scalable, reliable, highly available, and secure manner.

It should be appreciated that the local area network 100 may have other components than those depicted. Further, the embodiment shown in the figure is only one example of a local area network that may incorporate an embodiment of the invention. In some other embodiments, local area network 100 may have more or fewer components than shown in the figure, may combine two or more components, or may have a different configuration or arrangement of components.

Upon being powered on or reset, the network devices 102, 104, 106 may be registered with the cloud network 114 and associated with a logical network within the local area network 100. When multiple network devices 102, 104, 106 and gateways 110, 112 are included within a local area network, the network devices and/or gateways may be installed at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

A network device may detect one or more gateways upon being powered on or reset. In some embodiments, a provisioning process may occur when the network device is powered on or reset and detected by an access device. During the provisioning process, the access device 108 may directly communicate with the network device. In some embodiments, direct communication between network devices 102, 104, 106 and access device 108 may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device including a default name (e.g., "light switch") or a customized name (e.g., "my light switch").

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the gateway. For example, the login information may be the same information that was originally set up to access the gateway network signals (e.g., when the gateway was initially installed). The access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway.

A network device may obtain credentials from a gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the wireless local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

A network device may then send the credentials (e.g., gateway credentials) to the cloud network. For example, the network devices 102, 104, 106 may send credentials for the gateway with which they are paired to the server located within the cloud network 114. For example, network device 102 may transmit the credentials obtained from gateway 110 to the server, and network device 106 may transmit the credentials obtained from gateway 112 to the server. In some embodiments, the network device may also send other information relating to the network device (e.g., MAC address, serial number, make, model number, firmware version, and/or an interface module identifier, or the like) to the server and/or information relating to the access device (e.g., MAC address, serial number, application unique identifier, or the like) to the server. In some embodiments, the communication of the credentials and the other information from the network device to the cloud network server may be a Hypertext Transfer Protocol (HTTP), a Hypertext Transfer Protocol Secure (HTTPS) communication, a secure Transmission Control Protocol (TCP) communication, or the like. One of ordinary skill in the art will appreciate that other communication mechanisms may be used to communicate between the network device and the cloud network server.

Once the credentials are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

Once the unique IDs are received by the server, the server may register each network device and determine a visual interface module for each network device. For example, the server may register the network device 102 as a first network device. During the registration process, the server may determine or generate a first interface module ID for identifying a visual interface module suitable for controlling the first network device. As noted above, one of ordinary skill in the art will appreciate that any number of network devices may be present within the local area network, and thus that any number of network devices may be discovered and registered for the local area network.

In some embodiments, a modular visual interface framework may be utilized to dynamically and implicitly provide visual interface modules to an access device 108 so that the access device 108 can be used to control network devices within a network without having to install a new application or a version of an application for each network device. The visual interface modules can enable a user of the access device 108 to remotely control network devices within a network without having to physically interface with the network device. In certain embodiments, an application installed on the access device 108 can have a graphical interface, and the application can be configured to execute one or more visual interface modules usable to control respective network devices in a local area network. The visual interface modules, when executed by an application, can render a visual interface in the graphical interface to enable control of operation of the network device. In some embodiments, the visual interface module can be specific to a given network device.

The visual interface rendered for a visual interface module can be a modular tile that includes information identifying a respective network device and includes interactive areas or interactive elements for controlling and/or monitoring the network device on a network. The visual interface can provide information about a status of the network device corresponding to the tile. The status of a network device may be any changeable variable of that particular network device. For example, the status of a network device may include a state of the network device itself (e.g., on or off) or how the network device is situated within the network with respect to the other network and other devices throughout the network. In certain embodiments, the status can include a value, a state, or other unit of measure corresponding to a setting or an attribute related to operation of a device. The setting or the attribute can be adjustable within a range of values or between different states. For example, the device can be a light bulb and the status can include a value corresponding to brightness (e.g., a percentage of total brightness) emitted by the light bulb when the light bulb is powered-on.

Figure 2:
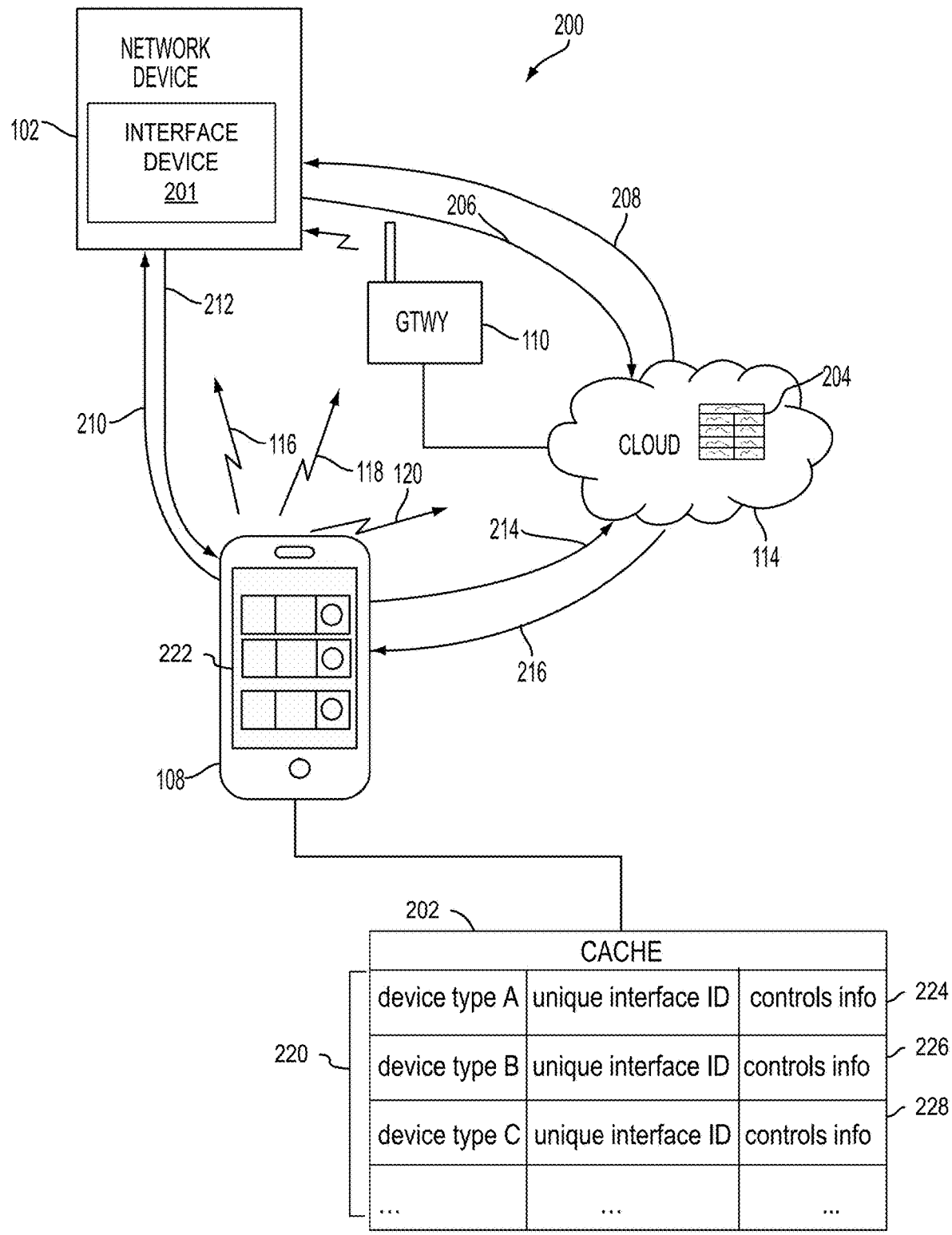
FIG. 2 shows an embodiment of a process for providing a visual interface module for controlling a device in a wireless network, in accordance with some embodiments.
Figure 3:
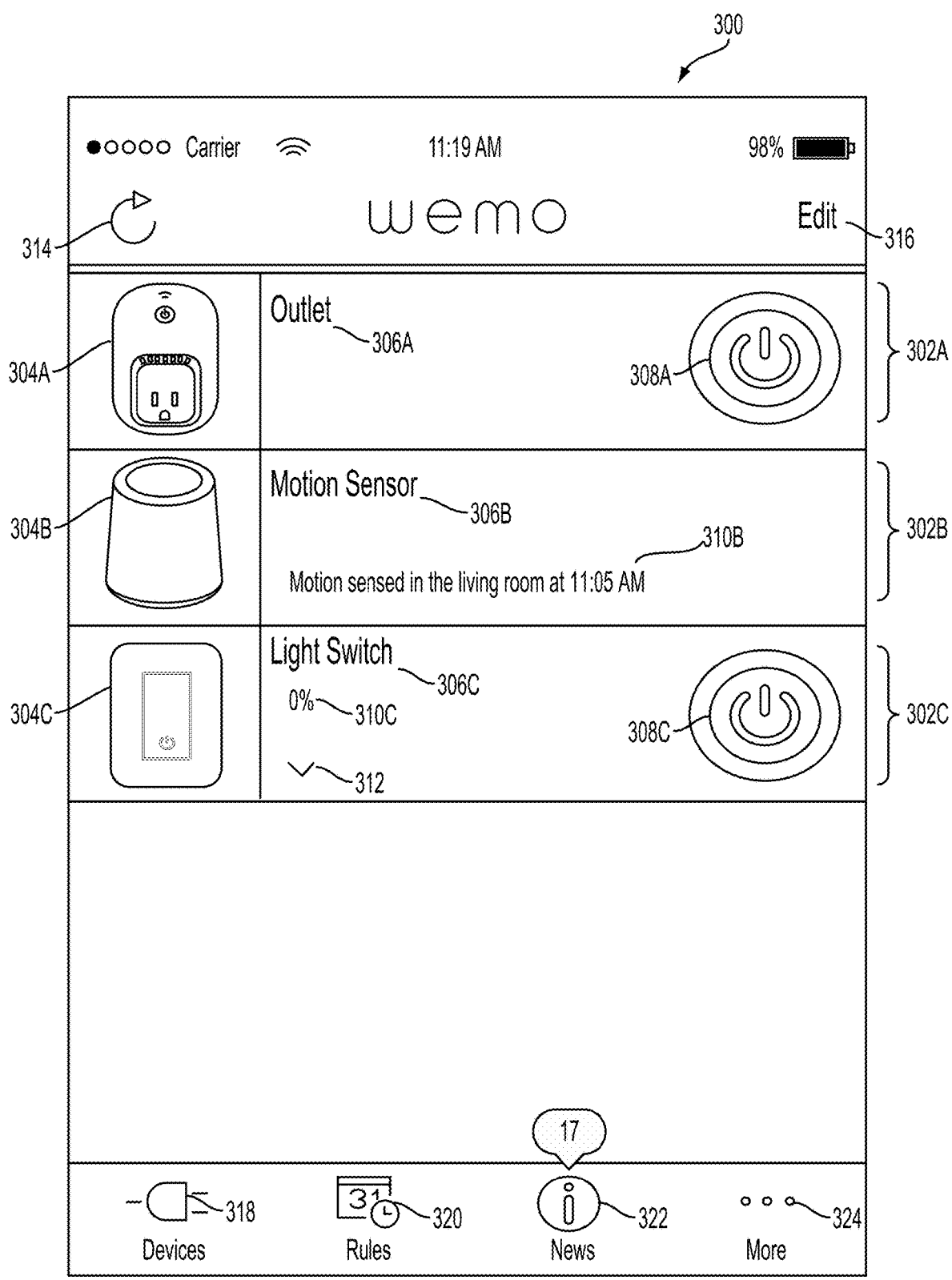
FIG. 3 depicts an example interface for controlling network devices and electronic devices coupled with the network devices, in accordance with some embodiments.

The visual interface can include one or more interactive elements or interactive areas to control one or more settings and/or attributes related to operation of the network device corresponding to the visual interface. The settings and/or attributes can correspond to functionalities or features of the network device. The functionalities can include, for example, powering the network device on and off, or adjusting a setting or an attribute of the network device. The visual interface can be updated to reflect the status of the network device with respect to the adjustment of one or more attributes and/or settings. Operation and implementation of the modular visual interface framework is described below with reference to FIGS. 2 and 3 is just one example of a visual interface that enables a user to control attributes and/or settings related to operation of network devices controllable via a computing device.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network. Also in embodiments where the server may determine that the access device 108 has already been registered with another network device, the server may have used a unique ID for the previously discovered network device 102 to determine a first interface module suitable for controlling the network device 102. Further in such embodiments, the server may use another unique ID for the network device 104 to identify a second interface module suitable for controlling network device 104.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway 112 may be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier. The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

A record or profile may then be created in a data store at the server for associating each network device with a corresponding known interface module so that the interface module can be provided to the access device. For example, the server of the cloud network 114 may associate the first network device 102 with a first interface module. Similarly, the server may associate the second network device 104 with a second interface module. In some embodiments, the server performs the association by generating and storing a record including the unique ID of the network device (e.g., MAC address or serial number of a network device), a unique ID of an interface module suitable to control the network device, and/or any other information relevant to the network device and/or the interface module. For example, the server may store a first record at a first memory space (e.g., in Flash, DRAM, a data store, a database, or the like) with the unique ID of the network device 102 and the unique ID of an interface module for monitoring and controlling the network device 102. The server may also store a second record at a second memory space along with the unique ID of the network device 106 and the unique ID of an interface module for monitoring and controlling the network device 106. The technique used to store records for associating each network device with a corresponding interface module may be dependent on a type of database that is included in the cloud network 114. For example, different databases may have different proprietary mechanisms for creating unique identifiers. The unique identifiers for each interface module may be generated using database specific technique. For example, a MySQL technique may be used to generate the unique IDs for interface modules. Each unique ID for interface modules may include a universally unique identifier (UUID) or a globally unique identifier (GUID).

The network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server. The server may also associate the network device 104 with a known interface module. The server may also generate a record in a data store of interfaces for the network device 104. The access device 108 may receive the interface module for controlling the network device 104 from the server, and then store the interface module in a local cache.

Then, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may then process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

As previously described, the access device, when located within range of the local area network, may be authenticated using accountless authentication that is based on the access device's authentication with the logical network. For example, if the access device has authorized access to the logical network (e.g., a WiFi network provided by a gateway), the network devices paired with that logical network may allow the access device to connect with them without requiring a network device login. Accordingly, the network device may perform accountless authentication of access devices that have authorization to access the logical network without requiring a user to provide login credentials for the network devices. While located remotely, the access device may also be authenticated to access the network devices via the cloud network using an accountless authentication process. For example, the network ID and the access device's unique security key may be used to allow the access device to communicate with the network devices via the cloud network (e.g., by generating a signature as described above).

When the access device 108 is located within range of both gateways 110, 112 in the local area network 100, the access device 108 does not encounter any issues when attempting to access any of the network devices 102, 104, 106. For example, the access device 108 may perform UPnP discovery and may list all if the network devices 102, 104, 106 that have responded to the discovery request regardless of which network ID the network devices 102, 104, 106 have. Accordingly, the existence of the first and second logical networks with first and second network IDs does not lead to any issues when the access device 108 is located within the local area network 100. However, when the user is located remotely, the access device 108 may only be associated with one logical network at a time. For example, the access device 108, while located remotely from the local area network 100, may query the cloud server with a known network ID (e.g., the first or second network ID). In response, the server will only return the network devices associated with that network ID. As a result, the user will not be able to see all network devices within the user's local area network 100.

FIG. 2 illustrates an embodiment of a process 200 for providing a visual interface module for controlling a network device. As shown, the process 200 may be performed by one or more computing devices, such as network device 102, a server associated with cloud network 114, or access device 108 described above with reference to FIG. 1. In some embodiments, the network device 102 is associated with a home automation network, such as the local area network 100 described above with respect to FIG. 1. Process 200 is illustrated as a data flow diagram, the operation of which represents operations that can be implemented in hardware, computer instructions, or a combination thereof. Gateway 110 is connected to cloud network 114, and allows network device 102 to connect to the cloud network 114, the Internet, or other external networks via gateway 110. In some embodiments, the network device 102 may be a home automation network device that allows a user to access, monitor, control, and/or configure various electronic devices such as home appliances located within the user's home including, but not limited to, a television, radio, light bulb, microwave, iron, fan, space heater, sensor, and/or the like. In some embodiments, the user can monitor and control network devices by interacting with a visual interface rendered by the gateway 110 (i.e., a web page for gateway 110), a visual interface rendered on display 222 of the access device 108, or a visual interface rendered by the network device 102.

In an embodiment, an application may be run on the access device 108. The application may cause the access device 108 to present a display 222 with a modular visual interface for each network device accessible on the local area network 100. When the application is run on the access device 108, the access device 108 can access a cache 202. The cache 202 can be a local cache located in onboard storage of the access device 108. The cache 202 can contain a known interface list 220 with records 224, 226 and 228 including interface information for different, known types of network devices. As shown, each of records 224, 226 and 228 can include a device type, a unique interface module ID, and controls information. The known interface list 220 can include a record for each device known by the access device 108 to exist on the local area network 100. When the application is run on the access device 108, the access device 108 can access the known interfaces 220 in the cache 202 to present the display 222, which lists modular interfaces for each network device on the local area network 100. In an example, the display 222 can include a modular tile for each connected network device having an interface in the known interface list 220. Exemplary communications used to populate cache 202 are described in the following paragraphs.

The process 200 can include utilizing communication 206 to register a visual interface module for a network device 102 with a server of cloud network 114. For simplicity, communication 206 is shown as a direct communication between network device 102 and cloud network 114. However, it is to be understood that in an embodiment, communication 206 can be sent from a manufacturer of network device 102 to cloud network 114. In an additional or alternative embodiment, communication 206 is sent from third party interface developer to cloud network 114. For example, a third party developer of a visual interface module for network device 102 may initiate communication 206 to cloud network 114. In the example of FIG. 2, communication 206 includes registration information for the network device 102. For example, communication 206 can include a unique device ID for network device 102. In some embodiments, the registration information may identify one or more capabilities of network device 102. The registration information can include a unique identifier for the network device, a default name of the network device, one or more capabilities of the network device, and one or more discovery mechanisms for the network device. In one example, communication 206 can include a resource bundle corresponding to network device 102. The resource bundle can be embodied as a structured folder structure whose contents define all visual and interactive elements/areas in a tile. For example, a resource bundle can be a zip file sent from a device manufacturer or a third party developer that is submitted or uploaded to cloud network 114. The resource bundle includes a unique device ID and files defining graphical content of a visual interface module. The graphical content can include definitions of interactive elements/areas for the interface module. The resource bundle can include templates defining interactive control states for each of the interactive elements, language translations for tile text, any menus for the tile, and graphical content of the menus. For example, the resource bundle can define templates, text, and graphical content using a markup language, such as HTML5.

At 206, the process 200 includes transmitting an indication that network device 102 is associated with the network. For example, network device 102 may transmit the indication to the server of the cloud network 114. In some embodiments, transmitting may include transmitting a unique identifier (ID) for the network device 102. For example, the network device 102 may send a communication to the server indicating a unique interface module ID for the network device 102. In such embodiments, the server may then determine that a match between the unique interface module ID and a known interface exists. The cloud network 114 can include a data store 204 of known interfaces. The access device 108 can download a visual interface module identified in data store 204 from the cloud network 114, which can be used to render a modular interface within display 222. In an embodiment, data store 204 can be a tile database where each record in the database is uniquely identified by a tile ID.

Cloud network 114 can use the unique device ID to determine an interface module for network device 102. As shown in FIG. 2, cloud network 114 can access a data store 204 of visual interface modules. A plurality of uniquely identified interface modules can be stored in data store 204. For example, each interface module in data store 204 can be associated with a unique interface module ID. In an embodiment, data store 204 is a database configured to store modular tiles for a plurality of network devices, with each of the stored modular tiles being identified by a unique tile ID. For instance, the network device 102 having a unique device identifier may be matched with an existing interface module based on comparing information received from the network device 102 with information stored in data store 204. In cases where an existing interface module for network device 102 is not found in data store 204, cloud network 114 can use information in a resource bundle for the network device 102 to generate an interface module, where the resource bundle is provided as part of a registration process for a given network device. The generated interface module can then be stored in data store 204 and assigned a unique interface module ID. In some embodiments, information in the resource bundle can be used to update an existing interface module stored in data store 204. After determining the interface module for network device 102, cloud network 114 sends communication 208 to network device 102 in order to provide a unique interface module ID to the network device 102. In one embodiment, communication 208 can include a unique tile ID corresponding to a modular tile for network device 102 that is stored in data store 204. In some embodiments, communication 208 includes a unique tile ID corresponding to a modular tile defined for network device 102. Upon receiving communication 208 with the unique interface module ID (i.e., a unique tile ID), the network device 102 can store the unique interface module ID. In one embodiment, for example, the unique interface module ID can be stored by an interface device 201 of the network device 102 that is configured to provide the interface module ID to an access device or gateway. In an embodiment, the interface device 201 is implemented as a 'smart module' in hardware and firmware, such as, for example, a system on a chip (SOC) integrated into the network device 102.

The interface device 201 can include flash memory and dynamic random access memory (DRAM). The flash memory may be used to store instructions or code relating to an operating system, one or more applications, and any firmware. The flash memory may include nonvolatile memory so that any firmware or other program can be can updated. In the event the interface device 201 loses power, information stored in the flash memory may be retained. The DRAM of the interface device 201 may store various other types of information needed to run the interface device 201, such as all runtime instructions or code. The flash memory or DRAM or a combination thereof may include all instructions necessary to communicate with network device 102.

The process 200 can include sending, from the access device 108, intra-network communication 210 including a query, to the network device 102. The query can be a request for information such as a query for capabilities, a request for an identity of the network device 102, and/or a request for a unique interface module ID. For example, communication 210 can be sent from access device 108 to network device 102 to query network device 102 about its identity. In response to the query sent from access device 108, the process 200 can include receiving intra-network communication 212 at the access device 108 with device information for the network device 102. According to an embodiment, in response to the query, the network device 102 can send communication 212 to inform the access device 108 of the identity and/or capabilities of the network device 102. For instance, in response to receiving the query, the network device 102 may send communications 212 to the access device 108 with at least a unique interface module ID. The process 200 can include utilizing intra-network device communications 210 and 212 as part of a discovery process for the network device 102. For example, when the network device 102 is initially connected to the network, it and access device 108 can automatically exchange communications 210 and 212 to provide the access device 108 with information that can be used to determine a basic, default visual interface stored in cache 202.

Within the context of a modular tile framework, embodiments can dynamically render a functional user interface without having to download the appropriate interface template from a remote server, such as a server associated with the cloud network 114, in order to control a newly discovered network device. These embodiments can be used in cases where a connection to the Internet or the cloud network 114 is unavailable or unreliable, and immediate use of a newly discovered network device is desired. In this case, an application on the access device 108 or a stationary device such as gateway 110 could, based on certain information received from the network device 102, dynamically render a functional interface for immediate use. Such a functional interface may not be the ideal, visually optimized, interface that is downloadable from the cloud network 114. However, such a functional interface will suffice until the application is able connect to the Internet and/or the cloud network 114 and subsequently download the appropriate and visually optimized interface module for the network device 102.

In some embodiments, communication 212 may be received when the network device 102 is rebooted (e.g., powered on, reset or restored to default settings, or the like). For example, when the network device 102 is rebooted, it may broadcast one or more messages on the local area network 100 to discover whether there are any access devices in the local area network 100. For example, communication 212 may be broadcast according to a UPnP protocol during a discovery process. The network device 102 may receive communications 210 from access device 108 indicating that it is located within the local area network 100 and interrogating network device 102 about its functionalities. That is, after receiving a broadcast message from network device 102, access device 108 may then query network device 102 by sending communication 210 in order to receive the communication 212 including information about the network device.

After receiving communication 212, if the access device 108 can access the cloud network 114, it sends a communication 214 to the cloud network 114 as a request for an interface module for the network device 102. Otherwise, if the access device 108 cannot access the cloud network 114, the access device 108 looks up the unique interface module ID received from the network device 102 in cache 202. As discussed above, cache 202 can be a local cache stored on the access device 108. Basic properties for known interfaces can be stored in cache 202 as a device type and controls information. These basic properties can include, for example, a default icon, a default name, and interactive elements or interactive areas for controlling one or more primary functionalities of a network device. The primary functionalities can include, for example, powering the network device on and off. The basic properties can also include controls information for secondary functionalities.

In some embodiments, when the access device is connected to the cloud network 114, the access device 108 sends communication 214 to query the cloud network 114 about network device 102. The communication 214 can include at least the unique interface module ID for the network device 102. At this point, the cloud network 114 can compare the unique interface module ID of the network device 102 to known interface module IDs stored in data store 204 in order to determine that there is a match between the unique interface module ID sent with communication 214 and a known interface module. If the cloud network 114 finds an interface module in its data store 204, it transmits the interface module to the access device 108 via communication 216. For example, if the access device 108 is currently using a default interface module for network device 102 that was determined based on exchanging communications 210 and 212, and then subsequently is able to connect to the cloud network 114, communications 214 and 216 between the access device 108 and the cloud network 114 can be used to obtain an updated interface module for the network device 102.

Upon receiving communication 216 from the cloud network 114, the access device 108 populates a record in cache 202 corresponding to the network device 102 with device type and controls information received via communication 216. That is, when the access device is remote from the local area network 100, it can exchange communications 214 and 216 with the cloud network 114 to receive an interface module for a network device. Information received via communications 216 can be used to populate records of cache 202. Records in cache 202 can be updated using modular interfaces received via communication 216. In additional or alternative embodiments, new records can be created in cache 202 when communication 216 includes a modular interface for a newly discovered network device.

Records 224, 226, 228 in cache 202 store network device types, unique interface module IDs, and control information for known network devices. The access device 108 uses the records in cache 202 to render visual interfaces in the display 222. For example, the display 222 can include a navigable list of modular tiles corresponding to network devices in the local area network 100.

Display 222 can also include an indicator representing a state of network device 102. In embodiments, communications 212 and/or 214 can include a last known state of the network device 102 and/or historical data associated with the network device 102. In one embodiment, such state information can be based on information received via communication 212 from the network device 102 when the access device 108 is connected to the local area network 100. In this way, display 222 of the access device 108 can reflect a current state and historical data for the network device 102 when the access device is not connected to the local area network 100. In additional or alternative embodiments, the state information can be based on information received via communication 216 from the cloud network 114 when the access device 108 is connected to the cloud network 114. Using the state information, an interface module or tile for the network device 102 within display 222 can indicate an 'on' or 'off' state for the network device 102 when the network device is powered on or off.

FIG. 3 depicts an example interface for controlling network devices and electronic devices coupled with network devices, in accordance with some embodiments. Display 300 is a visual interface usable to monitor and control one or more network devices. Display 300 includes modular tiles 302A, 302B, and 302C (hereinafter "tiles 302") for interacting with network devices in a network. In this embodiment, tiles 302A, 302B, and 302C correspond with three different network devices, including an outlet, motion sensor, and light switch.

In some embodiments, the information contained in tiles 302 can be received via an intra-network communication (e.g., communication 210) between the computing device operating the display 300 and the network device. For example, the information in the communication can include information about icons, names, status, or capabilities of one or more network devices. In some embodiments, a communication can be sent from the computing device to a network device to query the network device about its identity. In response to receiving the query, the network device may send communications to the computing device operating the display 300 with at least a unique interface module ID. The communication may provide the computing device with information that can be used to determine a basic, default visual interface that includes the tiles 302.

The communication may be transmitted between the computing device operating the display 300 and the network during the initial discovery process. For example, when the network device is initially connected to the network, it and the computing device can automatically exchange these communications. The information in the communications can establish the initial information in tiles 302.

The tiles 302 may also include icons 304A, 304B, and 304C (hereinafter "icons 304"). The icons 304 can include default images corresponding to each network device. For example, the default images may include an outline, silhouette, photograph, or other visual representation of the network device. As illustrated, the image data for tile 302A includes an outline of an outlet, the image data for tile 302B includes an outline of a motion sensor, and the image data for tile 302C includes an outline of a light switch.

The tiles 302 may also include a name 306A, 306B, and 306C (hereinafter "names 306") for the corresponding network device. The names 306 include a default description of the network device (e.g., "outlet") or the electronic device. In some embodiments, the default description can be associated with each network device during the registration process described above. As illustrated, tile 302A corresponds with an outlet network device and is named "outlet," tile 302B corresponds with a motion sensor network device and is named "motion sensor," and tile 302C corresponds with light switch network device and is named "light switch."

As described above, when the network devices are first discovered on the network, the network devices can be associated with icons 304 that may include default images (e.g., an outline of an image of an outlet, motion sensor, and light switch) and further associated with names 306 that may correspond with default names (e.g., "outlet," "motion sensor," and "light switch"). The default information in tiles 302 may be customizable by developers and/or manufacturers of the network devices and/or provided in a resource bundle for the network device to generate the corresponding icon and name.

The tiles 302 may also include interactive elements configured to control one or more states, settings, attributes, and/or other aspects of the network devices. For example, in FIG. 3, the interactive elements can include a power button, as illustrated as a power button 308A in tile 302A, for turning the outlet on and off. The interactive element 308A can be selected with a click or press (e.g., a tap gesture) to turn the outlet on and off. Similarly, in the example described in FIG. 3, tile 302C includes a power button 308C for turning a light switch on and off.

In certain embodiments, the status or state of a network device (used interchangeably) can be indicated within the tile, including any piece of information pertinent to that particular network device. For example, the status of a network device may include a state of the network device itself (e.g., on or off) or how the network device is situated within the network with respect to other network devices in the network. For example, the status of a network device may refer to the network device's proximity to another network device and/or its ability to communicate with another network device because of the relative signal strength between the two network devices. In some embodiments, tiles 302 can convey status information about a network device, including, but not limited to, a firmware version, a last known firmware update status, connectivity to cloud status, registration status (e.g., an indication that the network device has a key or does not), a primary mode of the network device (e.g., on or off), a secondary mode of the device (e.g., standby, high, low, etc.), a schedule, and settings for the network device.

In some embodiments, the status can include a value or some other information indicating a unit of measure for a setting or an attribute related to operation of a network device. The setting or attribute can be adjustable within a range of values in some embodiments. For example, the network device can be a light bulb and the status can include a value corresponding to brightness (e.g., a percentage of total brightness) emitted by the light bulb when the light bulb is powered-on. In another embodiment, the network device can be a motion sensor and the status can include a value corresponding to sensitivity of the sensor in a range of values between 0 to 100 when the sensor is powered-on.

The displayed status of a network device can change based on time (e.g., a period, an interval, or other time schedule). For example, tile 302B may indicate a sensor-specific status 310B that changes when an event such as motion is detected. In an illustrative embodiment, the tile may provide a status that includes "Motion sensed in the living room at 11:05 AM."

Status information may be provided in multiple locations in tiles 302 as well. For example, tile 302C includes icon 304C representing a light switch and name 306C for the light switch (e.g., "light switch" as a default). As shown, the status 310C in the tile 302C for the light switch can indicate a brightness level for the light switch. In the exemplary display 300, status 310C indicates that the light switch is at 0%, which corresponds to the light switch being turned off. In some embodiments, this status may also be reflected by the power button 308C for the light switch not being lit up or shaded/bolded.

When a network device has extended capabilities, such as secondary or tertiary functionalities, an interactive element 312 can be selected to expand and contract a menu including controllable settings for the capabilities. The menu can be, for example, a full drop down menu or drawer with interactive elements for setting the extended capabilities of the network device to be displayed within the graphical interface. The display 300 can enable control of settings and/or attributes related to operation of the network device corresponding to the tile. For example, the tiles 302 can include a drawer that displays the operations for secondary functionalities in response to a selection made for a primary functionality (e.g., controlling a power state) for a network device. In certain embodiments, the drawer can display secondary settings, including a default, implied secondary setting for a network device that can affect the operation of the network device and can be related to scheduling operation of the network device (e.g., setting on/off times), selecting auto off timeouts or thresholds, selecting settings for putting the network device into standby, hibernate, or sleep mode, and/or controlling adjustable features (e.g., lighting or speed). By enabling a user control features and secondary settings of a network device, the user is enabled with the ability to remotely control multiple features for several network devices without being present at a location for those devices.

Display 300 can also include selectable icons and links 314, 316, 318, 320, 322, and 324 outside of the tile display area. For example, refresh icon 314 can be selected to refresh information presented in display 300, such as status and state information displayed in tiles 302A, 302B, and 302C. For instance, the status 310B in tile 302B for the motion sensor can be refreshed on an automatic, periodic basis, in addition to being manually updated when refresh icon 314 is selected. Similarly, the brightness status 310C in tile 302C for the light switch can be updated when refresh icon 314 is selected.

The edit link 316 can be selected to edit the list of tiles 302A, 302B, and 302C. For example, edit link 316 can be selected to sort or re-order the sequence of tiles 302A, 302B, and 302C displayed in display 300. Edit link 316 can also be selected to delete one of the tiles 302A, 302B, and 302C in cases where a user no longer wants to view a given tile. Devices icon 318 can be selected to list discovered network devices in a network.

Rules icon 320 can be selected to display rules pertaining to network devices. For example, rules icon 320 can be selected to display a rule that turns on the light switch of tile 302C for a specified duration when the motion sensor of tile 302B detects motion. That is, by selecting rules icon 320, a user can create or edit a rule that turns on a light switch for a certain number of minutes when a motion sensor detects motion in a room. In this way, rules can relate functionalities of multiple network devices to each other. News icon 322 can be selected to review news items, such as news associated with network devices and/or the application. For instance, news icon 322 can be selected to view announcements and news items relevant to network devices controlled via tiles 302A, 302B, and 302C and/or information relevant to the application, such as messages of available tile updates. The more icon 324 can be selected to access additional features of the application.

As described above, in some embodiments, network devices may be initially associated with default icons and descriptions (e.g., names). In some instances, a user may desire to customize this information to indicate a specific electronic device (e.g., an appliance) that is coupled to the network device. For example, if a lamp (e.g., the electronic device) is plugged into an outlet (e.g., the network device), the user may want to replace the default icon with image data (e.g., a photograph of the lamp) and further replace the default description with a customized textual data (e.g., "My Lamp," "Bedroom Lamp," etc.). Some embodiments may allow a user to provide such customized image data and textual data.

Figure 4:
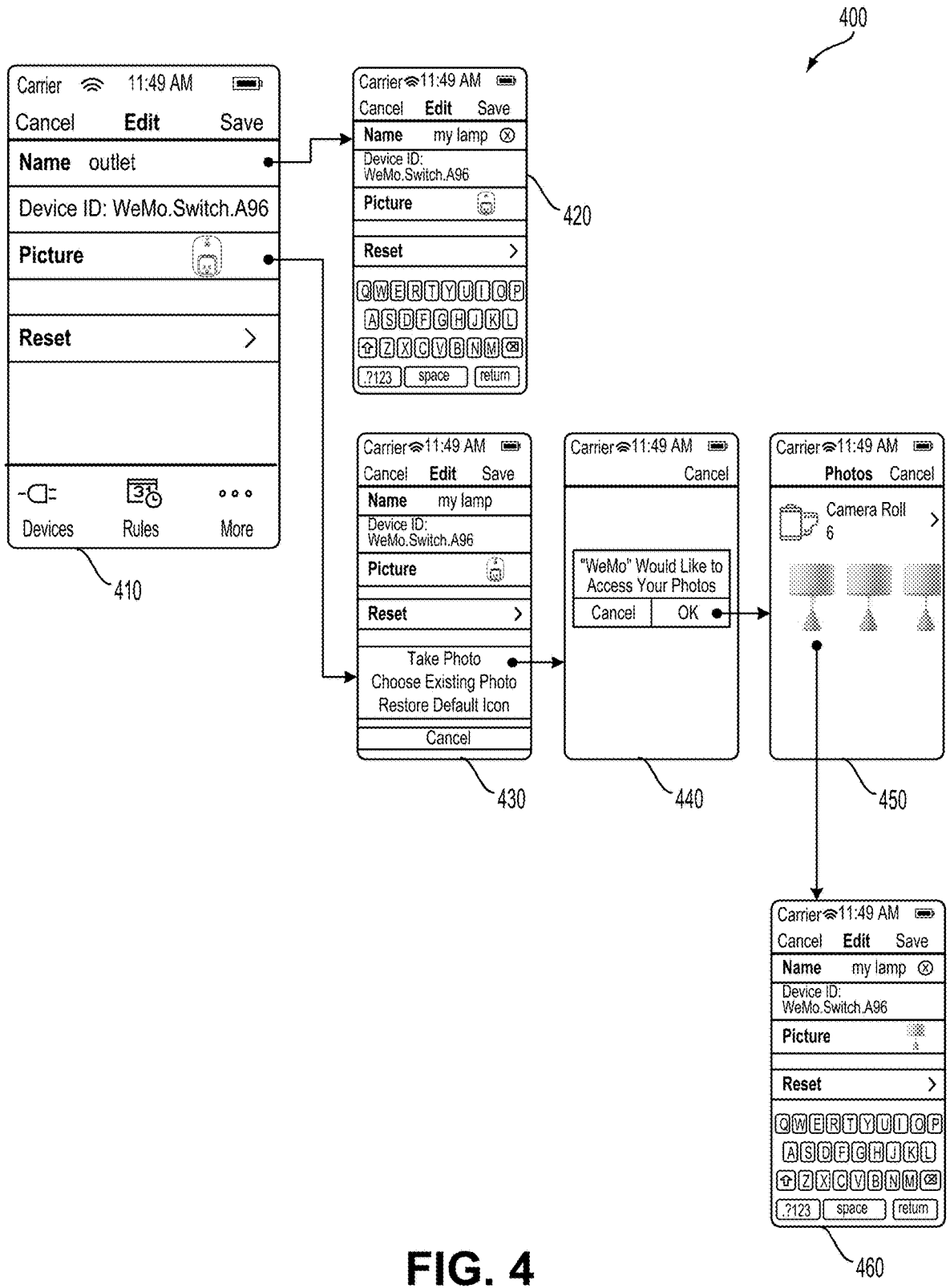
FIG. 4 shows example interfaces for providing image data and textual data corresponding to an electronic device, in accordance with some embodiments.

FIG. 4 shows example interfaces for providing image data and textual data corresponding to an electronic device, in accordance with some embodiments. In some embodiments, the interfaces 400 can be displayed on a user device such as an access device (e.g., cellular phone) or any other suitable device. The interfaces 400 may include one or more displays to edit, change, add, remove, alter, or otherwise adjust a tile corresponding to a network device. For example, a user may select the edit link 316 from display 300 to provide image data and textual data corresponding to an electronic device coupled to a network device.

At 410, an illustrative interface for providing image data and textual data may be displayed. For example, a default icon (e.g., an image of the outlet) and a default name or description (e.g., "outlet") may be initially included within the interface for the network device, and one or more fields may be provided for a user to replace the default icon and description with customized image data and textual data. As illustrated, in some embodiments, the default description (i.e. "outlet") can be selected (e.g., via a tap gesture or other input) to activate a field for modifying the description.

At 420, the display may provide text entry elements (e.g., a soft keyboard) to accept a different name for the outlet from the user. The user may select letters, numbers, and/or symbols using the text entry elements to provide textual data in the form of a customized description to be associated with the network device. The digital display may disappear after the user provides the textual data (e.g., by pressing enter or next to deactivate the text entry elements). As illustrated, the user may provide textual data including "my lamp" to replace the default description "outlet" for the particular electronic device (e.g., a lamp) electronically coupled with the network device (e.g., the outlet).

At 430, the user may also choose to provide image data as a replacement of the default icon for the network device. The display may provide an interface to allow the user to provide the image data. For example, the interface can allow the user to take a photo (e.g., of the electronic device coupled with the network device), choose an existing photo (e.g., stored in a data store within the computing device or another device in the network), or restore the image data to a default icon (e.g., a silhouette of an outlet or lamp). In an embodiment, the user may select the "Choose Existing Photo" option and progress to 440.

At 440, a notification may be displayed. The notification may request that the user authorize access to stored graphical data (e.g., photographs). Such graphical data may be accessed and/or retrieved from the computing device, network device, cloud network, or other location. As illustrated, the user may select "OK" or "Cancel" when asked to authorize access. When the user selects "OK," the display may progress to 450.

At 450, the display may provide indications of the stored graphical data. For example, the indications can include photographs from a camera roll stored at the access device, cloud network, or other location. In some embodiments, the user can browse through and select one or more photographs to use as the image data for the tile associated with the network device. As illustrated, the user may select one of the lamp images to use as image data.

At 460, the tile corresponding to the network device can display the provided image data and textual data instead of the original default icon and default description. In some embodiments, the selection of the image data and textual data can be copied and/or transmitted to a data store (e.g., a cloud storage device, etc.), and associated with the tile.

Figure 5:
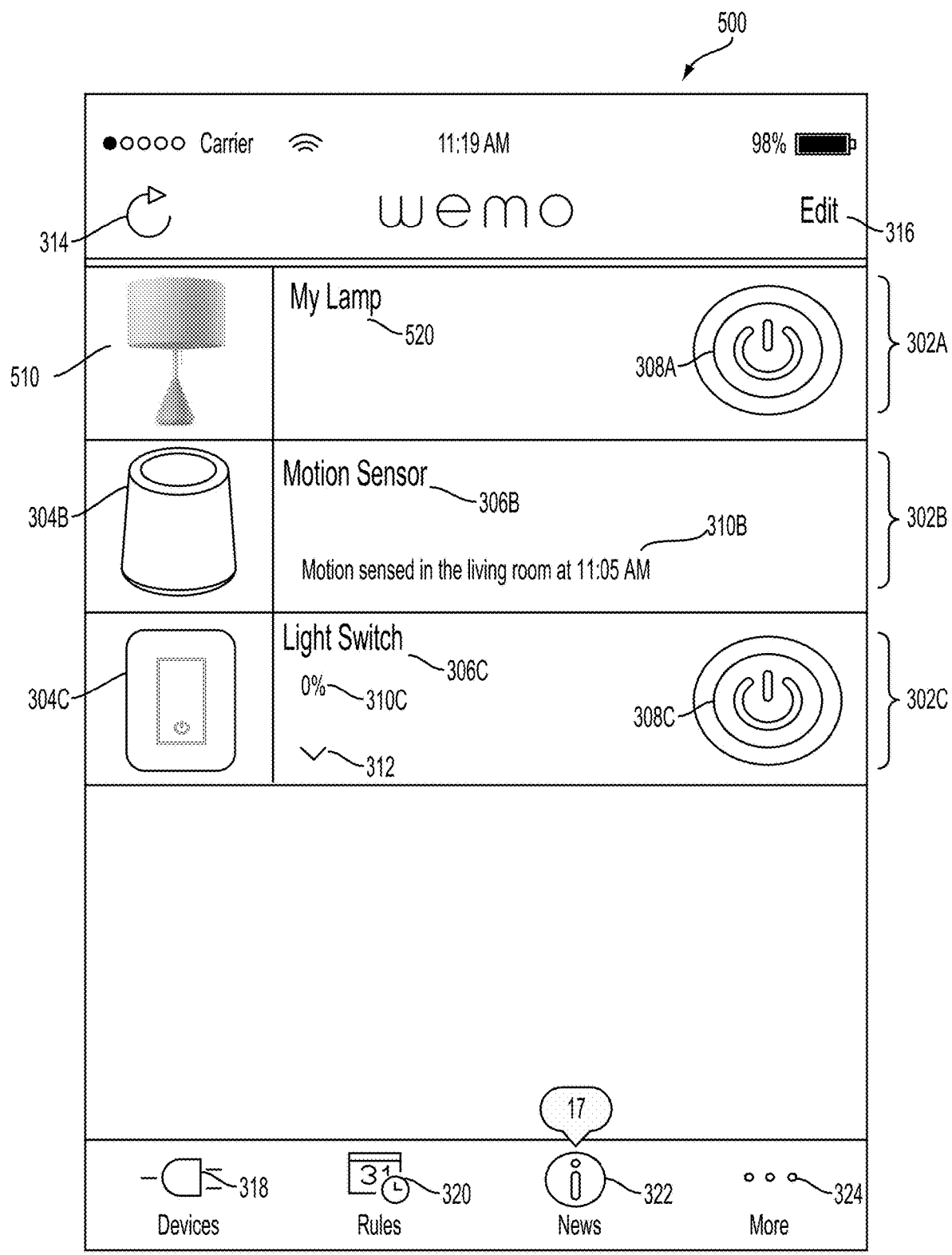
FIG. 5 depicts an example interface with received image data and textual data, in accordance with some embodiments.

FIG. 5 depicts an example interface with received image data and textual data, in accordance with some embodiments. The display 500 may be similar to the display 300 illustrated in FIG. 3. The display 500 may also include the received image data and textual data received for a particular network device. For example, where the default icon 304A of FIG. 3 included an outline image of an outlet, the new image data in FIG. 5 includes a photograph of a lamp 510 that is electronically coupled with the outlet. Further, where the default description 306A of FIG. 3 included a default description of the network device (e.g., "Outlet"), the new textual data in FIG. 5 includes a customized description of the electronic device coupled to the network device (e.g., "My Lamp").

Figure 6:
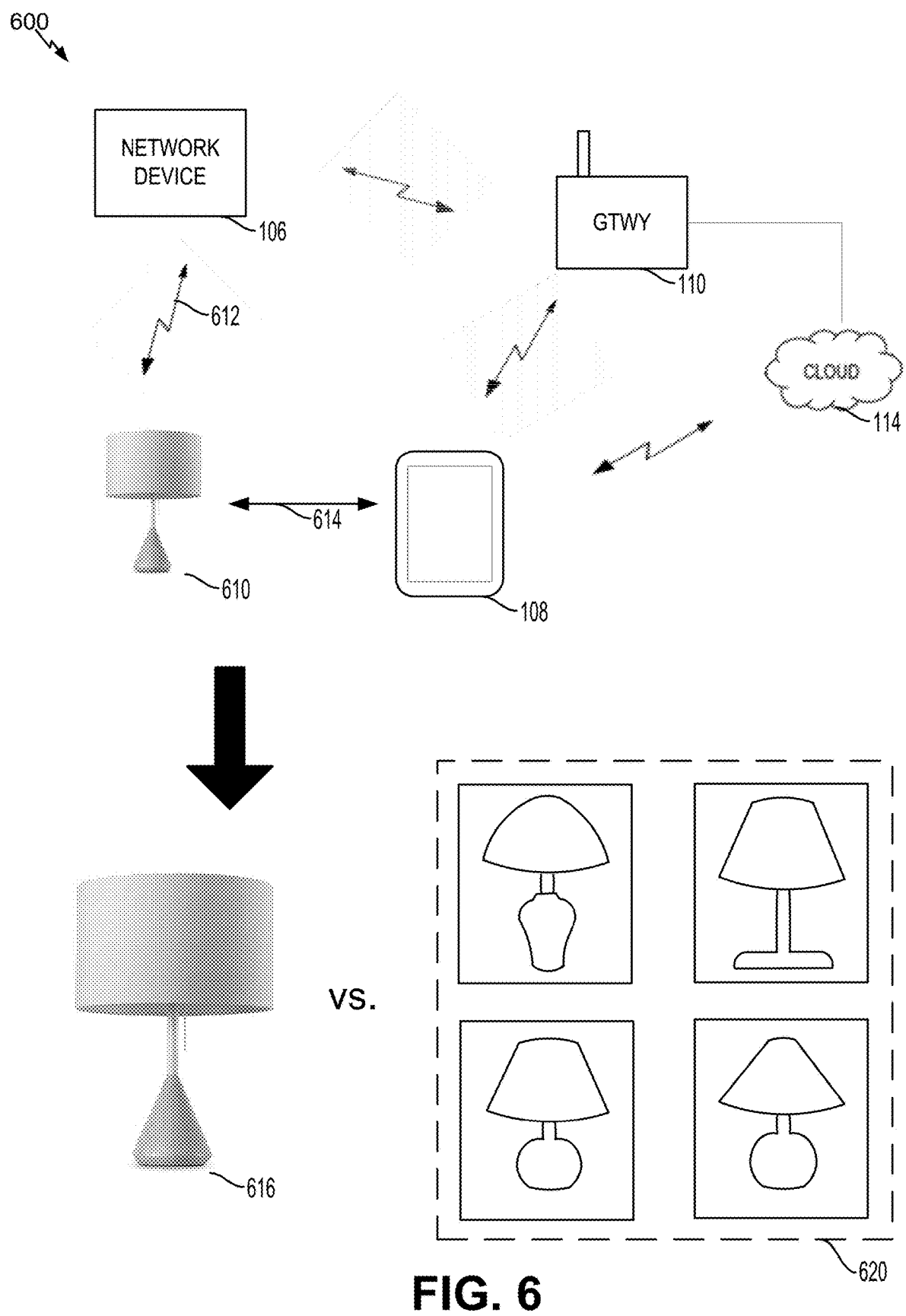
FIG. 6 shows an example process for analyzing image data and textual data, in accordance with some embodiments.

FIG. 6 shows an example process for analyzing image data and textual data, in accordance with some embodiments. The process may be performed by any suitable computing device including one or more of the devices included in the wireless network environment 100 described with FIG. 1, including any of network devices 102, 104, 106, access device 108, gateways 110, 112, and/or the cloud network 114. The network may also include an electronic device 610, illustrated herein as a lamp. It should be understood that electronic device 610 is illustrated as a lamp, but could be any suitable electronic device.

As illustrated in FIG. 6, a network device 106 is coupled 612 with an electronic device 610, such that the network device 106 transfers energy or data with the electronic device 610. For example, the electronic device 610 (e.g., the lamp) can be plugged into a network device 106 (e.g., the outlet). In another example, the electronic device 610 (e.g., a battery-operated mobile device) may receive energy or data through an electronic coupling with a network device 106 (e.g., a wireless charging station or data store). In each instance, the network 106 device and electronic device 610 may be coupled 612.

In some embodiments, access device 108 can receive an image 614 of an electronic device 610. For example, as described in FIGS. 3-5 and described above, the user can take a picture of the lamp using the access device 108 (e.g., a cellular phone). The picture of the lamp can be stored on the user's access device, a cloud network 114, data store, or other location.

The image data and textual data may be transmitted between one or more computing devices in the wireless network environment 100. For example, the access device 108 may interact with the gateway 110 to transmit the image data and textual data to the gateway 110. The gateway may transmit the image data and textual data to the cloud network 114. In some embodiments, the access device 108 can transmit the image data and textual data to the cloud network 114 without utilizing the gateway 110 (e.g., using a cellular or other data network).

In some embodiments, the picture of the lamp can be received as image data 616. As further described above, textual data may also be received (not shown). The textual data can include a customized description of the lamp coupled with the outlet.

As illustrated in FIG. 6, the image data and textual data can be analyzed by the cloud network 114 to determine a type of the electronic device 610. In some embodiments, the image data can be analyzed using image processing pattern or gradient matching, object recognition, scene change detection, or any other suitable technique in an attempt to determine the type of the electronic device 610 from the image data. In some embodiments, natural language processing, optical character recognition (OCR), or any other suitable technique may be used in an attempt to determine the type of the electronic device 610 from the image data.

In some embodiments, the image data 616 (e.g., the lamp photograph) can be compared to other image data 620 corresponding to other electronic devices associated with other users and/or networks. In some embodiments, one or more points of interest in each photograph may be compared. Images with the fewest number of differences may be considered of the same type within some level of confidence. Analysis of the textual data can also affect the confidence that the electronic device 610 is of a particular type. In the example illustrated in FIG. 6, it can be determined that the type of the electronic device 610 is "a lamp" based on the analysis of the image data and textual data.

The identified type of the electronic device may be compared with other electronic devices of the same or similar type in order to identify usage data associated with such other electronic devices. Such usage data may include rules, settings, and/or attributes utilized by other users for electronic devices of the same type. For example, in the lamp example, analyzing usage data can result in a determination that some percentage of other outlets coupled to lamps are associated with a user-provided rule that power to the outlet is to turned on the lamp thereby turned on after 6 PM local time. Further examples are described below.

It should also be appreciated that the wireless network environment 100 may transfer, receive, and store information without cloud network 114 in some embodiments, and that any of the functionalities described with respect to FIG. 6 may be performed by any suitable computing device, such as the access device 108, network device 106, gateway 110, etc.

Figure 7:
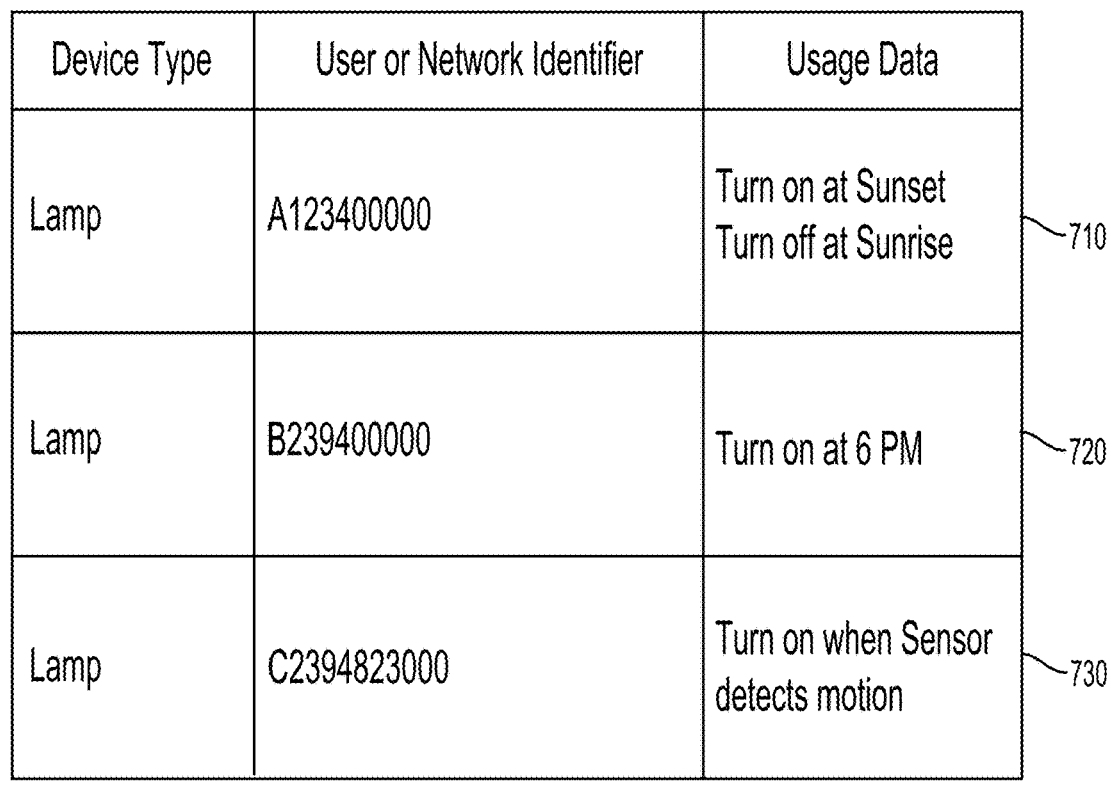
FIG. 7 shows an illustration of a data store including usage data, in accordance with some embodiments.

FIG. 7 shows an illustration of a data store including usage data, in accordance with some embodiments. The data store 700 may include one or more electronic device types, corresponding user or network identifiers, and usage data. In the example illustrated in FIG. 7, data store 700 includes usage data for lamps. It should be appreciated, however, that data store 700 can include usage data describing any other suitable electronic devices such as a fan, garage door opener, sprinklers, heater, television, etc. In some embodiments, data store 700 can be included in the cloud network 114 illustrated in FIGS. 1 and 6. In some other embodiments, data store 700 can be included in any other suitable device such as network device 106, access device 108, gateway 110, etc.

In some embodiments, a record or profile may be created in a data store 700 for associating each network device and/or electronic device with a corresponding, known interface module so that the interface module can be provided to the computing device (e.g., access device operating display 300 in FIG. 3). For example, as described in FIG. 1, the server of the cloud network 114 may associate the first network device 102 with a first interface module and the second network device 104 with a second interface module. In some embodiments, the server performs the association by generating and storing a record including the unique ID of the network device (e.g., MAC address or serial number of a network device), a unique ID of an interface module suitable to control the network device, and/or any other information relevant to the network device and/or the interface module. For example, the server may store a first record at a first memory space (e.g., in Flash, DRAM, a data store, a database, or the like) with the unique ID of the network device 102 and the unique ID of an interface module for monitoring and controlling the network device 102. The server may also store a second record at a second memory space along with the unique ID of the network device 106 and the unique ID of an interface module for monitoring and controlling the network device 106.

In FIG. 7, electronic device types (e.g., lamps) can be associated with user identifiers associates with multiple user or network identifiers associated with multiple networks. In some embodiments, network device identifiers (e.g., MAC address, serial number, etc.) can be associated with device types (e.g., identifiers of outlets coupled to outlets in other networks associated with other users). As further illustrated in FIG. 7, data store can associate each electronic device type with usage data relating to usage of the electronic device (e.g., usage of the coupled network device) by other users and/or in other networks. In some embodiments, such usage data can include one or more rules or other automation settings used to control the functionalities of the corresponding electronic device type (e.g., the functionalities of the coupled network device). Usage of network devices and coupled electronic device types can be monitored for many users in many different networks.

The usage data may include various types of information. For example, as illustrated in FIG. 7, the usage data can include a rule 710 that causes an outlet in first network (or associated with a first user) to power on a lamp at sunset and power off the lamp at sunrise, a rule 720 that causes an outlet in a second network (or associated with a second user) to power on a lamp at 6 PM, and a rule 730 that causes an outlet in a third network (or associated with a third user) to power on a lamp when another network device (i.e. a motion sensor) detects motion.

The usage data may be analyzed. In some embodiments, the analysis can include an identification of the most common rules or other automation parameters used to operate other electronic devices of the same type. In some embodiments, rules and other automation parameters may be ranked, filtered, and/or sorted using various metrics, such as frequency, duration, recency, proximity, or any other suitable metrics. In some embodiments, based on the analysis of usage data stored in data store 700, a message related to usage of the particular device type can be transmitted to a user device (e.g., a cellular phone) after determining that a device of the same type has been added to a network associated with the user device.

Figure 8:
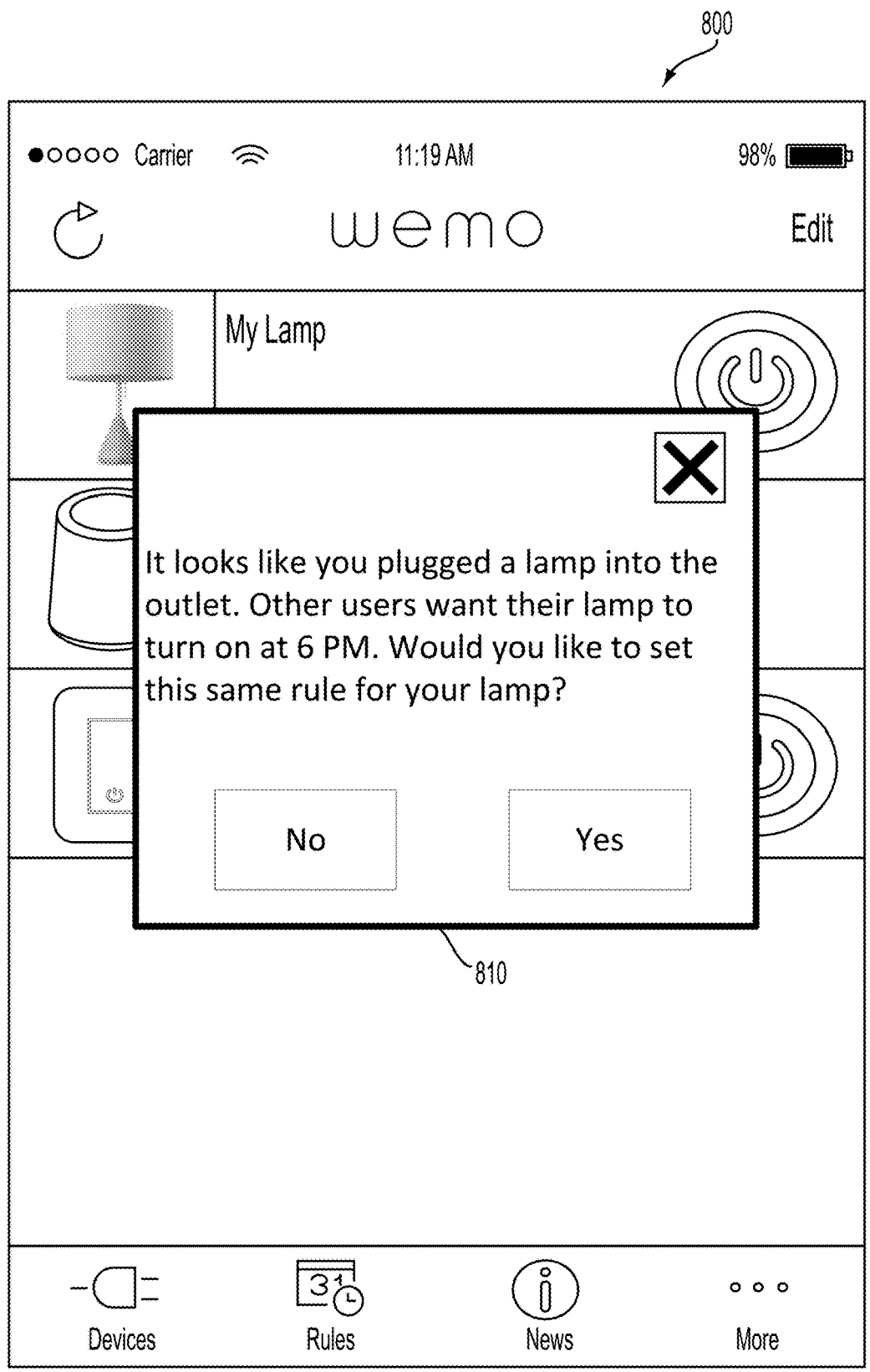
FIG. 8 shows an illustration of an example interface for providing a notification related to usage of an electronic device, in accordance with some embodiments.
Figure 9:
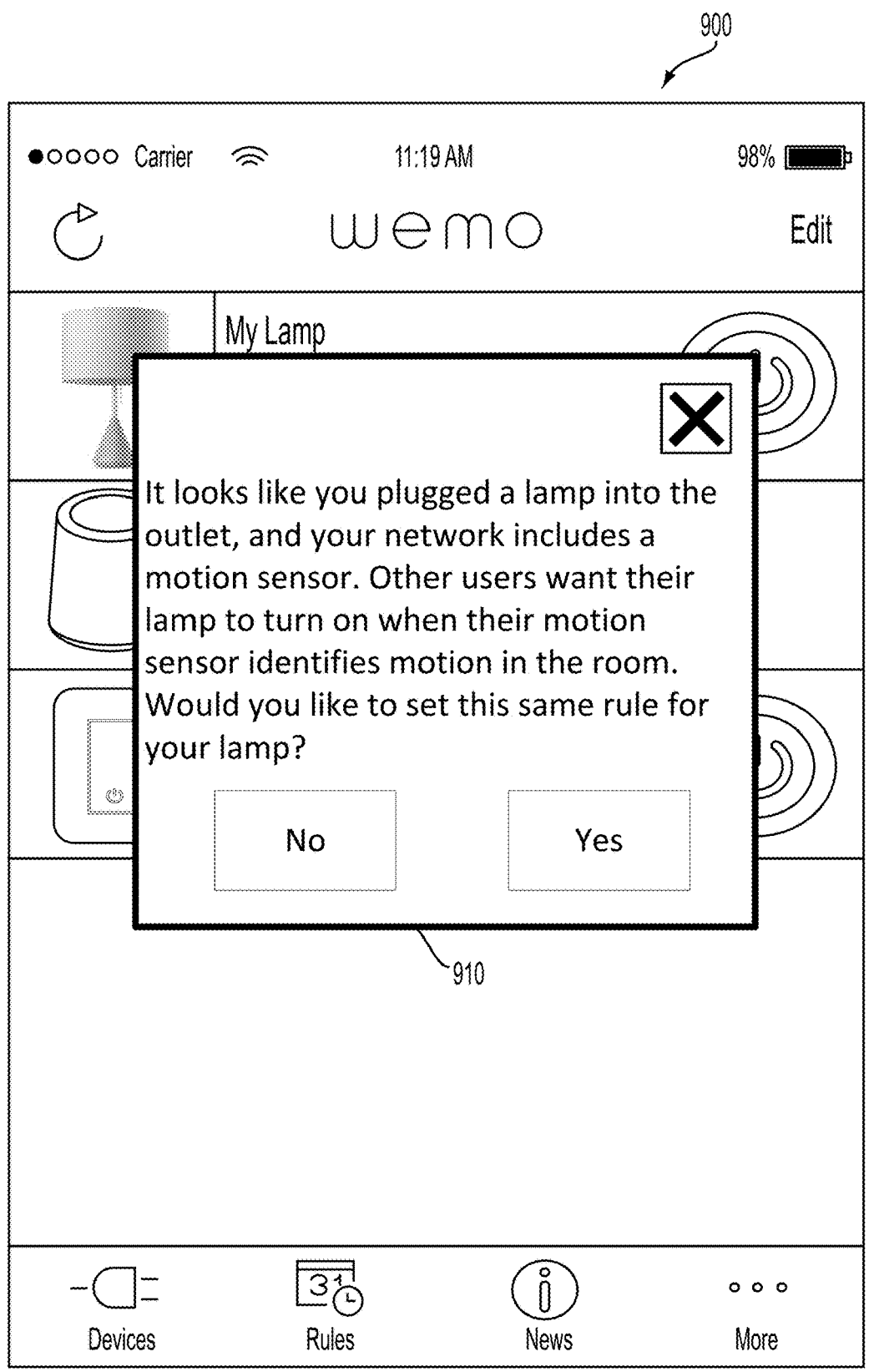
FIG. 9 shows an illustration of an example interface for providing a notification related to usage of an electronic device, in accordance with some embodiments.

FIGS. 8 and 9 depict example interfaces that provide a message related to usage of an electronic device. The interfaces may be similar to the interface 300 described with FIG. 3. The interface may include tiles, icons, names identifying different network devices and/or electronic devices electronically coupled with the network device, a status of the corresponding device, and one or more selectable icons and links (e.g., edit link, rules icon, etc.). The message may be transmitted to a user device (e.g., a cellular phone) or any other suitable device. In some embodiments, the messages can be provided through other means, including transmitting the message to a user device as a text message or Short Message Service (SMS), email message, audible message, or other suitable message format.

FIG. 8 shows an illustration of an example interface for providing a notification related to usage of an electronic device, in accordance with some embodiments. The interface 800 may be configured to display the message 810. The message 810 can include content related to the usage of the electronic device. As illustrated, the message includes "It looks like you plugged a lamp into the outlet. Other users want their lamp to turn on at 6 PM. Would you like to set this same rule for your lamp?" As described above, such a rule can be identified by analyzing usage data associated with the user of other electronic devices of the same type. The user may respond to the message by selecting "yes" or "no" to establish a rule for their corresponding electronic device (e.g., lamp).

FIG. 9 shows an illustration of an example interface for providing a notification related to usage of an electronic device, in accordance with some embodiments. The interface 900 may be configured to display message 910. As illustrated with message 810, message 910 may be transmitted to a user device. The content of message 910 may relate to usage of other electronic devices of the same type. For example, as illustrated, the message 910 includes "It looks like you plugged a lamp into the outlet, and your network includes a motion sensor. Other users want their lamp to turn on when their motion sensor identifies motion in the room. Would you like to set this same rule for your lamp?" The user may respond to the message by selecting "yes" or "no" to establish a rule for the corresponding electronic device (e.g., lamp) such that it is turned on when a motion sensor in the same network detects motion.

Figure 10A:
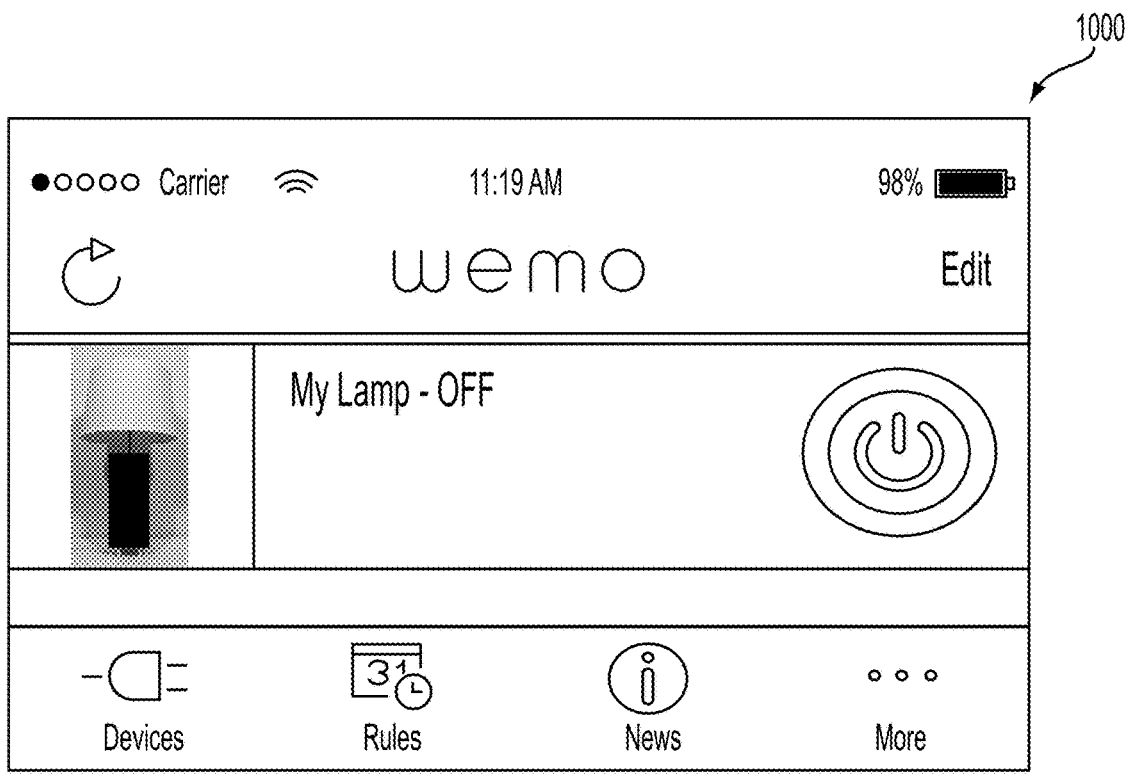
FIGS. 10A and 10B show example interfaces for providing a state of an electronic device, in accordance with some embodiments.
Figure 10B:
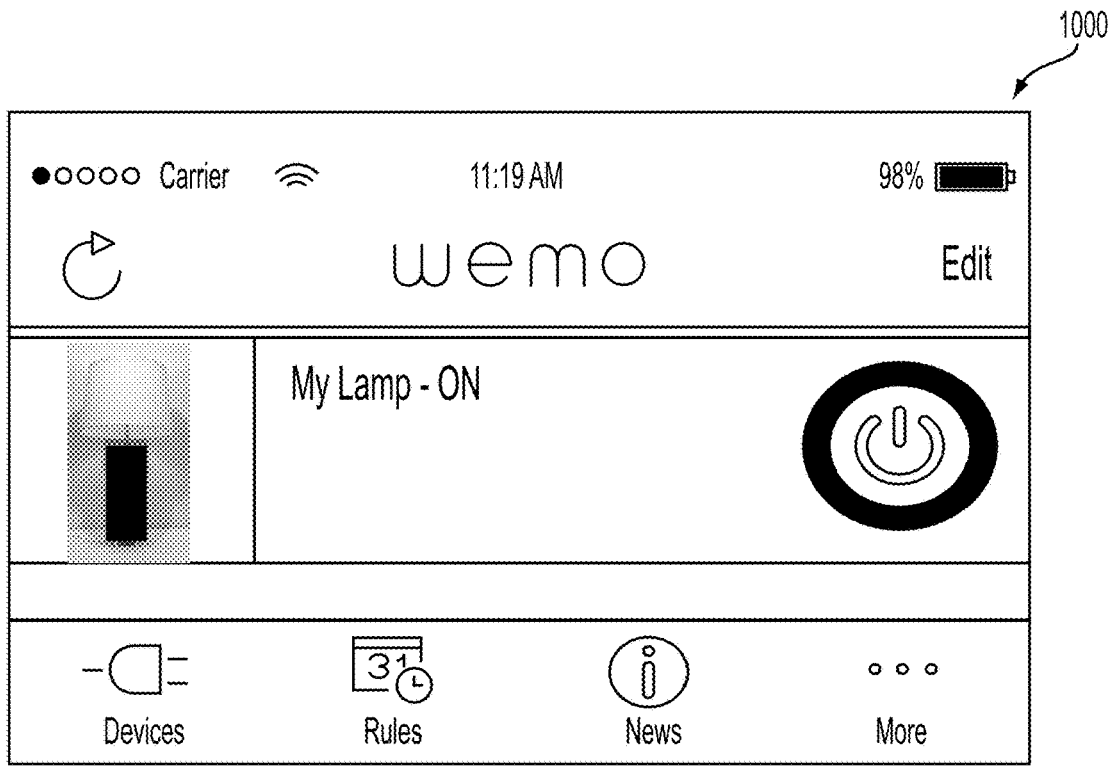

FIGS. 10A and 10B show example interfaces for providing a state of an electronic device, in accordance with some embodiments. As illustrated in FIG. 3, a status or state of the electronic device may be provided on a display. In some embodiments, different graphical data (e.g., user-provided photographs) may correspond with different states of an electronic device. Different textual data (e.g., user-provided descriptions) may also correspond with different states of an electronic device. For example, FIG. 10A illustrates an electronic device "my lamp" in an "off" state and FIG. 10B illustrates the same electronic device in an "on" state. The image data may correspond with the state (e.g., an image of the lamp off in FIG. 10A and an image of the lamp off in FIG. 10B) and the textual data may further correspond with the state (e.g., the name of the lamp is "my lamp—OFF" in FIG. 10A and the name of the lamp is "my lamp—ON" in FIG. 10B). The state of any suitable electronic device can be indicated using image data and/or textual data corresponding to particular states of such devices according to various embodiments. The state of an electronic device can be monitored and, when a change is detected, image data and/or textual data corresponding to the new state can be displayed.

Figure 11:
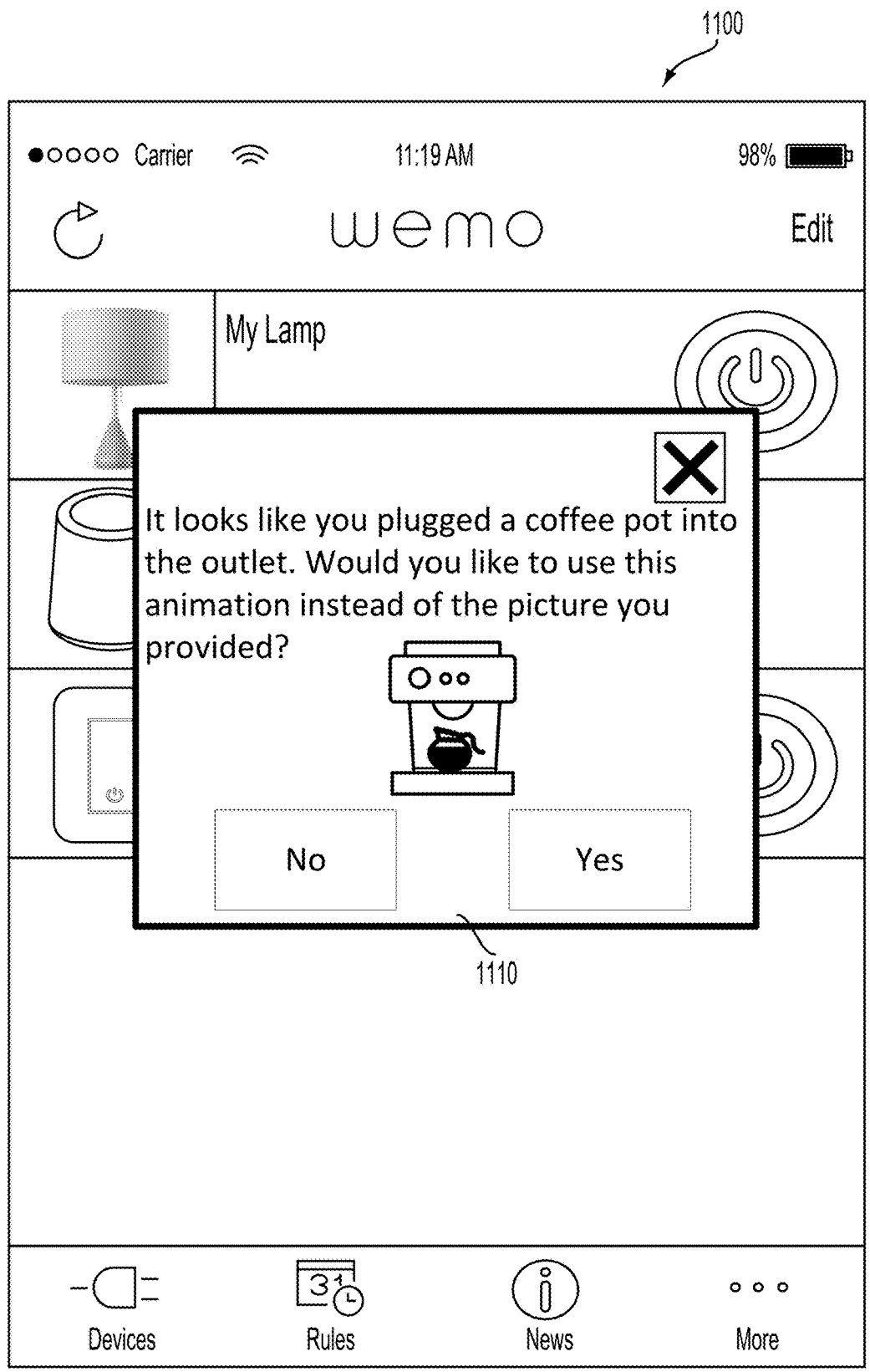
FIG. 11 shows an illustration of an example interface for providing a notification related to an animation corresponding to an electronic device, in accordance with some embodiments.

FIG. 11 shows an illustration 1100 of an example interface for providing a notification related to an animation corresponding to an electronic device, in accordance with some embodiments. In some embodiments, upon receiving image data (e.g., a photo) provided by the user, the message 1110 may provide the user with an opportunity to instead associate an animation with the electronic device instead of the image data. For example, upon determining that the electronic device type is a "coffee pot" using image data (e.g., a photo of a coffee pot) and textual data (e.g., a description of the coffee pot) provided by the user, an animation of a coffee pot can be identified (or generated). The message can be a notification asking the user whether they wish to associated the animation with the electronic device in the user interface (e.g., the corresponding tile). As illustrated, the message 1110 may include "It looks like you plugged a coffee pot into the outlet. Would you like to use this animation instead of the picture you provided?" The message can accompany a sample of the animation and the user can respond to the message (e.g., "yes" or "no"). One or more animations can be provided for any suitable electronic device.

Figure 12A:
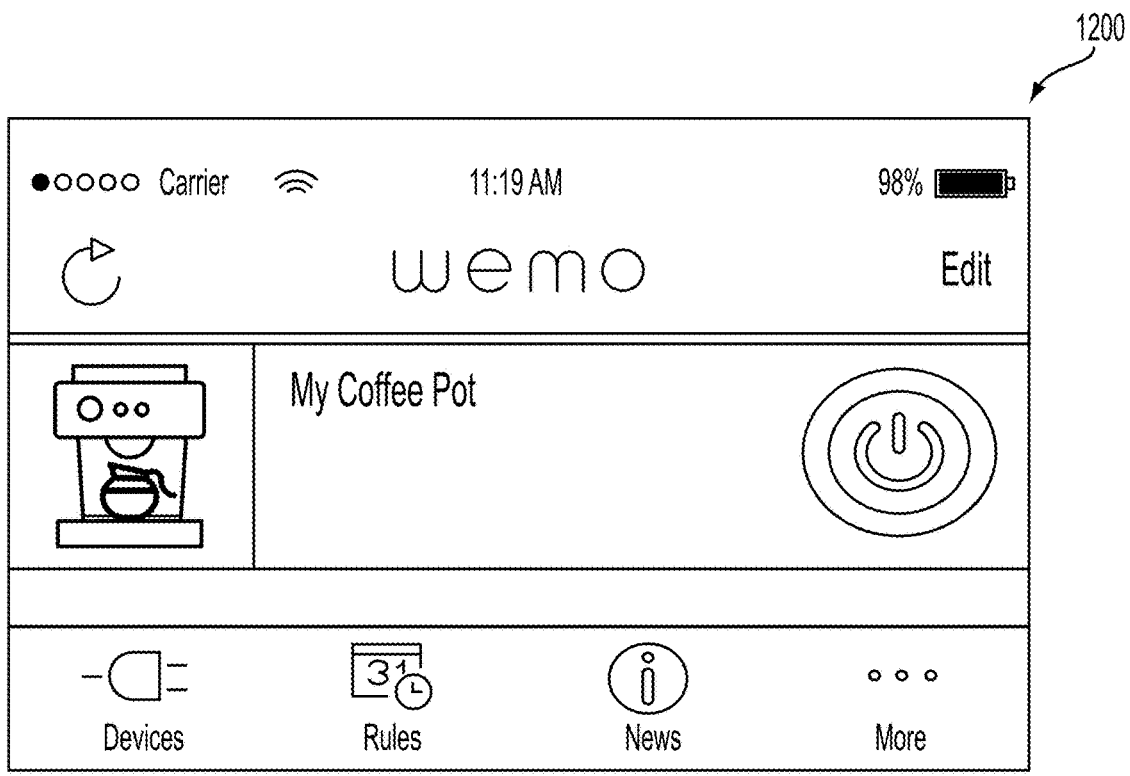
FIGS. 12A and 12B show an example interface including an animation corresponding to an electronic device at two points of time, in accordance with some embodiments.
Figure 12B:
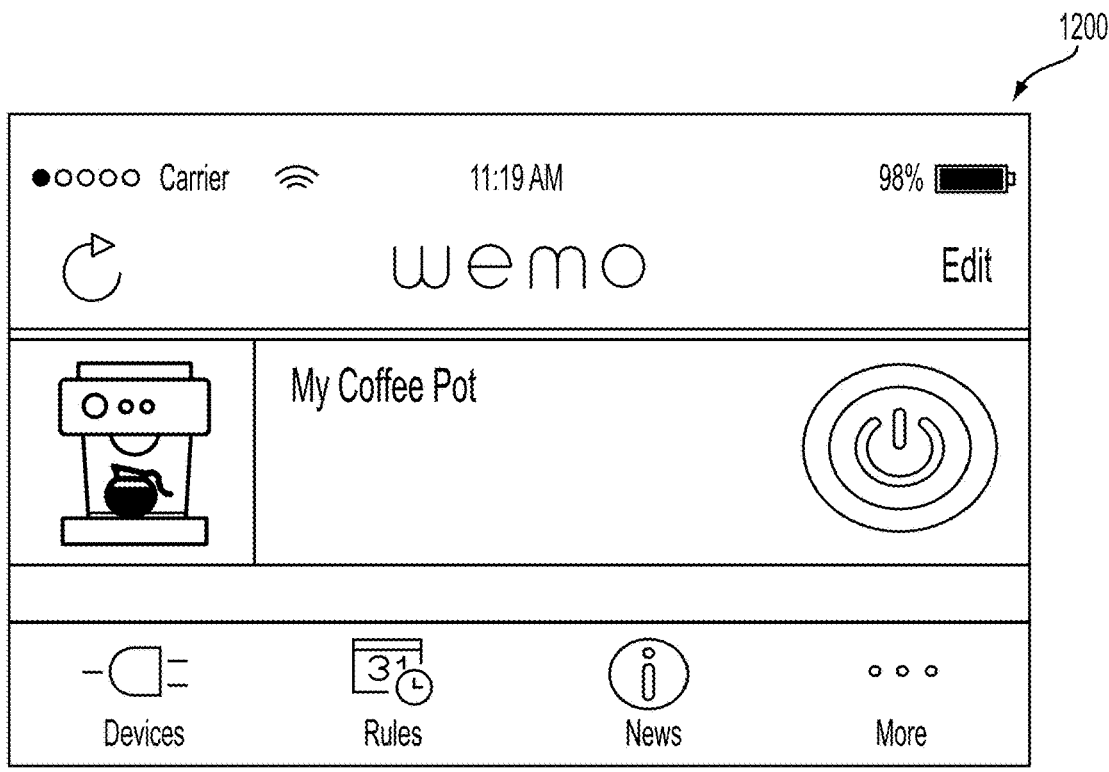

In some embodiments, the animation may indicate a state of the electronic device. FIGS. 12A and 12B show an example interface including an animation corresponding to an electronic device at two points of time, in accordance with some embodiments. The interface 1200 can show the animation of the coffee pot at two points of time in two different states. For example, FIG. 12A may include the animation at time 0 indicating that the coffee pot is off or just beginning to brew coffee and FIG. 12B may include the animation 5 minutes later indicating that the coffee pot is on and brewing (or the brewing is complete). Any suitable states of any suitable electronic device can be indicated by one or more animations according to various embodiments.

Figure 13:
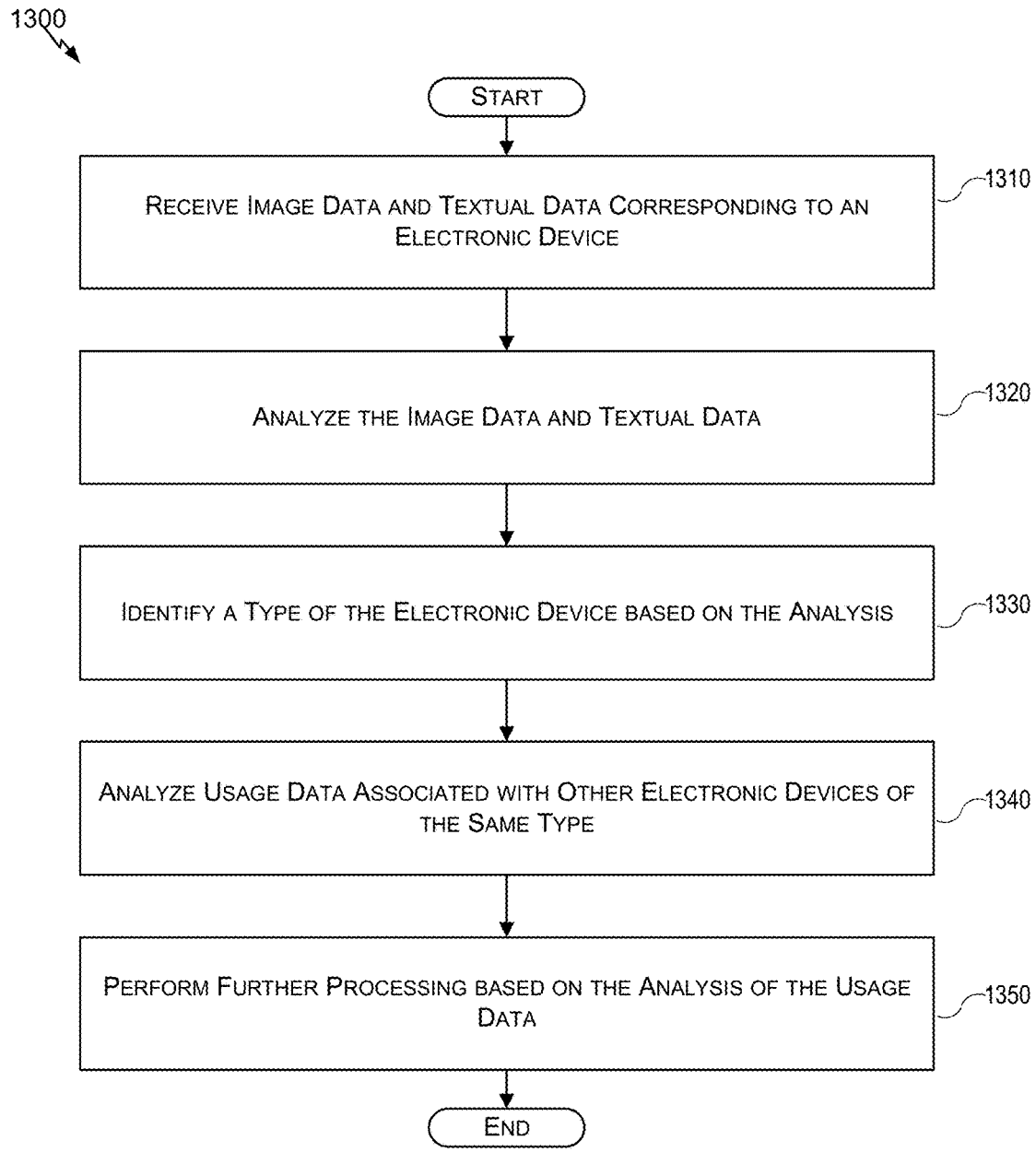
FIG. 13 is a flowchart illustrating a process for identifying a type of an electronic device using image data corresponding to the electronic device, in accordance with some embodiments.

FIG. 13 is a flowchart illustrating a process for identifying a type of an electronic device using image data corresponding to the electronic device, in accordance with some embodiments. Specifically, the process 1300 provides a technique to identify a type of an electronic device through an analysis of image data and textual data. The analysis may include an analysis of the usage data associated with other electronic devices of the same type. The technique can be implemented by a computing device which may be a network device, a user device, or a cloud-based device.

Process 1300 is illustrated as a logical flow diagram, the operation of which represents operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, applications, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1300 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

At 1310, the process 1300 can include receiving image data and textual data corresponding to an electronic device. In some embodiments, the image data may include a photograph of the electronic device, a drawing of the electronic device, or any other suitable image data corresponding to the electronic device. The textual data can include a name or description (e.g., entered by the user) or any other suitable textual data corresponding to the electronic device. In some embodiments, the electronic device can be electrically coupled to a network device (e.g., an outlet). As an illustration, as described above, the image data can include a photograph of a lamp plugged into an outlet and the textual data can include the description "My Lamp."

At 1320, the process 1300 can include analyzing the image data and textual data. In some embodiments, the process can analyze the image data through image processing and analyze the textual data through natural language processing. For example, referring back to the above illustration, the received image data (e.g., the photograph of the lamp provided by the user) with other image data (e.g., photographs of other electronic devices provided by other users), and the received textual data (e.g., "My Lamp") can be compared with descriptions of electronic devices provided by other users. In some embodiments, the analysis may include using natural language processing to parse the received textual data to identify significant terms that may suggest the type of the electronic device (e.g., "Lamp").

At 1330, the process 1300 can include identifying a type of the electronic device based on the analysis. Using the image data and textual data, a type of the electronic device can be determined. Referring back to the above illustration, by performing an image processing of the photograph of the lamp in combination with the term "Lamp" being included in the user-provided description, it can be determined that the electronic device type is a "lamp."

In some embodiments, a confidence value can be generated that corresponds with a confidence that the electronic device is of a particular type. For example, the image data and textual data may result in a 75% confidence that the electronic device type is a "lamp," a 5% confidence that the electronic device type is a "television," and a 1% confidence that the electronic device type is a "garage door opener." In some embodiments, the type of the electronic device can be the device type associated with the highest confidence value. In some embodiments, if a threshold level of confidence is not attained, the type of the electronic device may be considered unknown or indeterminate.

At 1340, the process 1300 can include analyzing usage data associated with other electronic devices of the same type. In some embodiments, analyzing the usage data associated with other electronic devices includes analyzing rules associated with usage of the other electronic devices. For example, upon determining a type of the electronic device, usage patterns (e.g., rules and other automation parameters) associated with other electronic devices of the same type can be analyzed. Referring back to the above illustration, the usage data can include rules used to control usage of other lamps (e.g., "turn the lamp off at midnight" or "turn the lamp on at sunset"). In some embodiments, the usage data may relate to interactions of the other electronic devices with additional electronic devices in the same network (e.g., "when the motion sensor senses movement in a room, turn on the lamp").

In some embodiments, analyzed usage data includes analyzing one or more rules associated with usage of other electronic devices. For example, 50% of the lamps in a geographic area may be associated with the rule "turn the light off at midnight" or "turn the light on when motion is sensed." The analysis may identify one or more frequent rules among a particular type of electronic device (e.g., lamps).

At 1350, the process 1300 can include performing further processing based on the analysis of the usage data. In some embodiments, the further processing may include transmitting a message to a user device, the message including content related to usage of the electronic device. Various types of messages may be transmitted to the user device. In some embodiments, the content related to usage of the electronic device can correspond to a rule. For example, if other users of lamps have a rule set that the lamp is to be "turned on at sunset and turned off at sunrise," the message can ask the user whether such a rule should be established. In some embodiments, the content related to usage of the electronic device may correspond to an interaction between the electronic device and another electronic device in the network. For example, if users with networks including both a lamp and a motion sensor have a rule set that the lamp is to be turned on "when the motion sensor detects motion," the message can ask the user whether such a rule should be established.

It will be appreciated that process 1300 is illustrative and that variations and modifications are possible. Steps described as sequential may be executed in parallel, order of steps may be varied, and steps may be modified, combined, added, or omitted. Process 1300 can be performed for each device that is determined to be connected to the network. It should be noted that process 1300 can be performed concurrently for other devices that are determined to be connected to the network. Process 1300 can be performed for any number of settings and/or attributes that are related to operation of a device. Process 1300 can be performed several times to make adjustments to a setting or an attribute related to operation of a device.

Figure 14:
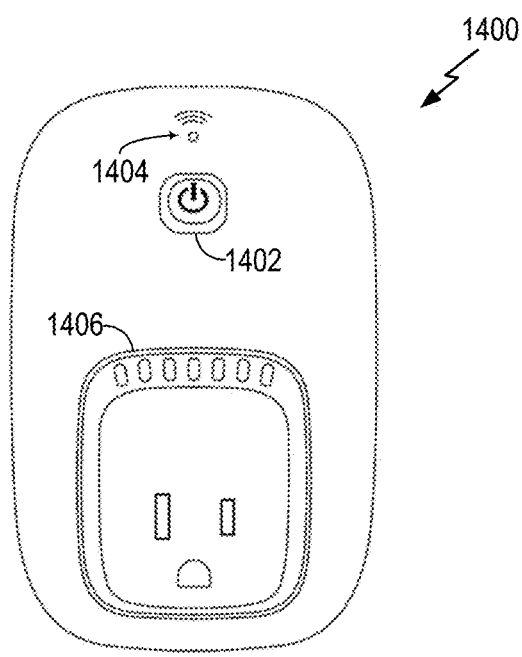
FIG. 14 is an illustration of an example of a front view of a network device in accordance with an embodiment.
Figure 15:
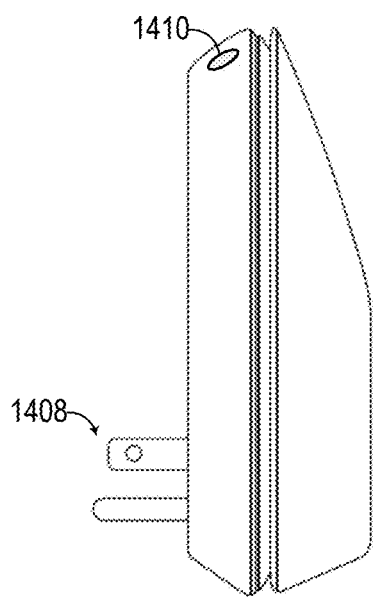
FIG. 15 is an illustration of an example of a side view of a network device in accordance with an embodiment.

FIG. 14 illustrates an example of a front view of a network device 1400 and FIG. 15 illustrates an example of a side view of the network device. The network device 1400 may include any of the network devices 102, 104, and 106 described herein. In some embodiments, the network device 1400 may be a home automation network device. For example, the network device 1400 may include a home automation switch that may be coupled with an electronic device (e.g., a home appliance). A user may wirelessly access the network device 1400 in order to access, control, and/or configure various electronic devices located within the user's home. For instance, the user may remotely control the electronic device, including a television, radio, light, microwave, iron, space heater, wall A/C unit, washer, dryer, fan, and/or the like.

In some embodiments, the network device 1400 may include a WiFi enabled switch that connects electronic devices to a compatible 802.11b/g/n WiFi network. The network device 1400 may thus allow users to locally or remotely turn devices on or off from anywhere, program customized messages, and/or change device status. The network device 1400 may further allow a user to create custom schedules or have devices respond to sunrise or sunset.

The network device 1400 includes an power button 1402 that may be depressed in order to turn the network device 1400 on and off. In some embodiments, a light source may be integrated with or located behind the power switch. For example, a light-emitting diode (LED) may be located on a circuit board under the power button 1402. The light source may be illuminated when the network device 1400 is powered on, and may not be illuminated when the network device 1400 is powered off.

The network device 1400 further includes a communications signal indicator 1404. The signal indicator 1404 may indicate whether the network device 1400 has access to a communications signal, such as a WiFi signal. For example, the signal indicator 1404 may include a light source (e.g., a LED) that illuminates when the network device 1400 is connected to a communications signal. The light source may depict different colors or other characteristics (e.g., flashing, dimming, or the like) to indicate different levels of signal strength or mode of operation.

The network device 1400 includes a restore button 1410. The restore button 1410 may allow a user to reset the network device 1400 to factory default settings. For example, upon being depressed, the restore button 1410, as shown in FIG. 15, may cause all software on the network device to be reset to the settings that the network device 1400 included when purchased from the manufacturer.

The network device 1400 further includes a plug 1408 and an outlet 1406. The plug 1408 allows the network device 1400 to be plugged into a wall socket, such as a socket providing 120V, 220V, or the like. In turn, an electronic device may be plugged into the outlet 1406. Once the network device 1400 is registered according to the techniques described above, the electronic device plugged into the socket may be controlled by a user using an access device (e.g., access device 108).

Figure 16:
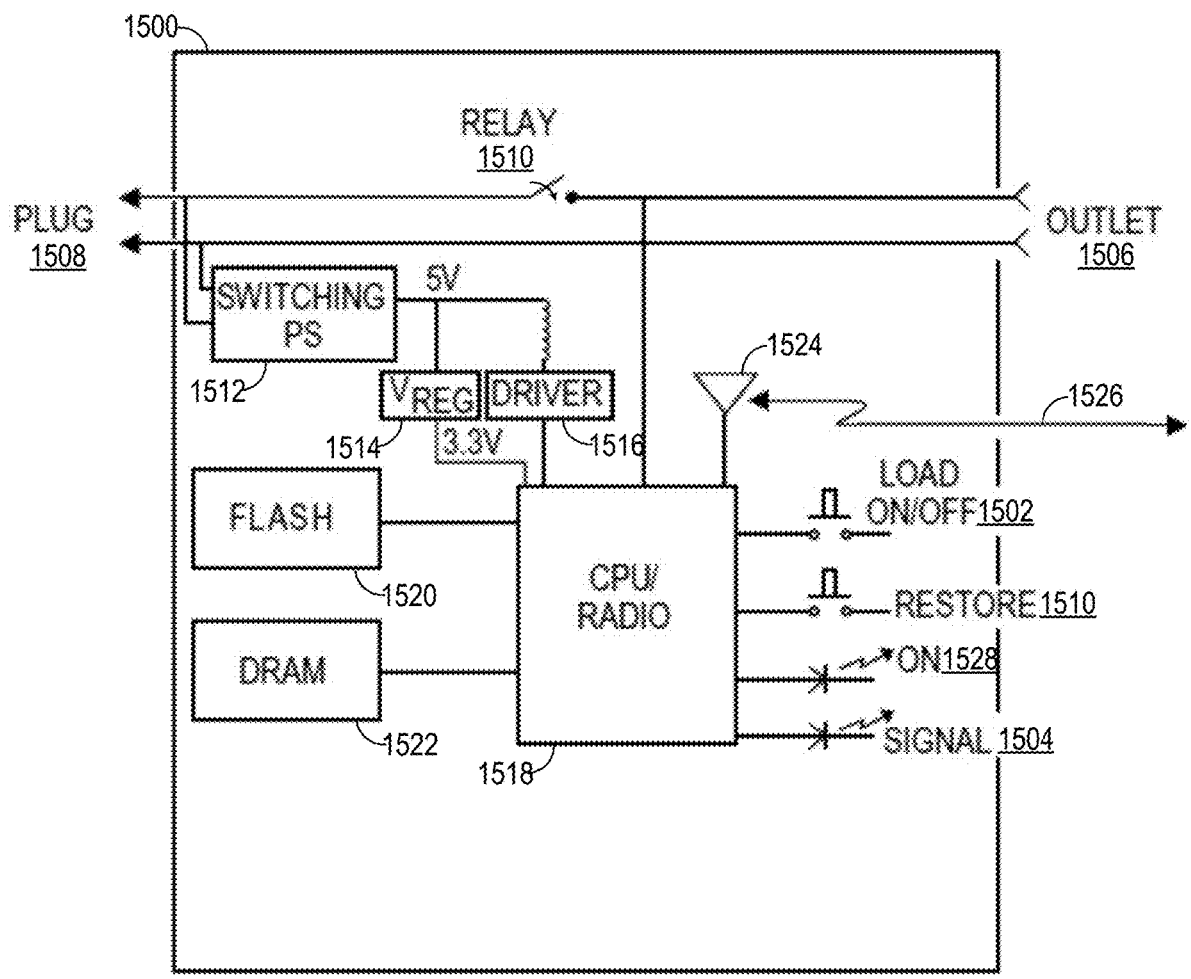
FIG. 16 is an example of a block diagram of a network device, in accordance with an embodiment.

FIG. 16 is an example of a block diagram of the network device depicting different hardware and/or software components of the network device 1400. As described above with respect to FIGS. 14-15, the network device 1400 includes the outlet 1406, the plug 1408, the power button 1402, the restore button 1410, and the communications signal indicator 1404. The network device 1400 also includes light source 1528 associated with the power button 1402. As previously described, the light source 1528 may be illuminated when the network device 1400 is powered on.

The network device 1400 further includes a relay 1510. The relay 1510 is a switch that controls whether power is relayed from the plug 1408 to the outlet 1406. The relay 1510 may be controlled either manually using the power button 1402 or remotes using wireless communication signals. For example, when the power button 1402 is in an ON position, the relay 1510 may be closed so that power is relayed from the plug 1408 to the outlet 1406. When the power button 1402 is in an OFF position, the relay 1510 may be opened so that current is unable to flow from the plug 1408 to the outlet 1406. As another example, an application or program running on an access device may transmit a signal that causes the relay 1510 to be opened or closed. For instance, a mobile application may display a graphical interface on the access device that includes a power button, as described with FIG. 3. The user may tap or otherwise select the power button, and the mobile application may send a communication signal (e.g., over a WiFi network) to the network device 1400 instructing the network device 1400 to open or close the relay 1510.

The network device 1400 further includes flash memory 1520 and dynamic random access memory (DRAM) 1522. The flash memory 1520 may be used to store instructions or code relating to an operating system, one or more applications, and any firmware. The flash memory 1520 may include nonvolatile memory so that any firmware or other program can be can updated. In the event the network device 1400 loses power, information stored in the flash memory 1520 may be retained. The DRAM 1522 may store various other types of information needed to run the network device 1400, such as all runtime instructions or code.

The network device 1400 further includes a CPU/Radio 1518. The CPU/Radio 1518 controls the operations of the network device 1400. For example, the CPU/Radio 1518 may execute various applications or programs stored in the flash memory 1520 and/or the dynamic random access memory (DRAM) 1522. The CPU/Radio 1518 may also receive input from the various hardware and software components, interpret the input, and perform one or more functions in response to the input. As one example, the CPU/Radio 1518 may determine whether the power button 1402 has been pressed, and determines whether the relay 1510 needs to be opened or closed. The CPU/Radio 1518 may further perform all communications functions in order to allow the network device 1400 to communicate with other network devices, one or more gateways, a cloud network, and/or one or more access devices. While the CPU and radio of the network device 1400 are shown to be combined in the CPU/Radio 1518, one of ordinary skill in the art will appreciate that, in some embodiments, the CPU and radio may be separately located within the network device 1400. For example, CPU circuitry may be situated at a separate location on a circuit board from the location of radio circuitry, the CPU circuitry may be located on a different circuit board from the radio circuitry, or the like.

The network device 1400 may communicate with other network devices and/or networks via antenna 1524. For example, antenna 1524 may include a 2.4 GHz antenna that can transmit and receive WiFi communications signals. The antenna 1524 may include other types of antennas that can communicate Bluetooth® signals, Zigbee® signals, Ultra-Wideband (UWB) signals, and/or the like. In some embodiments, the network device 1400 may include multiple antennas for communicating different types of communication signals.

The network device 1400 further includes a driver 1516, a switching power supply 1512, and a voltage regulator 1514. The driver 1516 may include instructions or code that can be used to translate control signals or commands received from applications running on the DRAM 1522 to commands that the various hardware components in the network device 1400 can understand. In some embodiments, the driver 1516 may include an ambient application running on the DRAM 1522. The switching power supply 1512 may be used to transfer power from the outlet in which the plug 1408 is connected to the various loads of the network device 1400 (e.g., CPU/Radio 1518). The switching power supply 1512 may efficiently convert the voltage and current characteristics of the electrical power to a level that is appropriate for the components of the network device 1400. For example, the switching power supply 1512 may perform AC-DC conversion. In some embodiments, the switching power supply 1512 may be used to control the power that is relayed from the plug 1408 to the outlet 1406. The voltage regulator 1514 may be used to convert the voltage output from the switching power supply 1512 to a lower voltage usable by the CPU/Radio 1518. For example, the voltage regulator 1514 may regulate the DC voltage from 5V to 3.3V.

In various embodiments, functions may be stored as one or more computer-program products, such as instructions or code, in a non-transitory machine-readable storage medium, such as the flash memory 1520 and/or the DRAM 1522. The network device 1400 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 1-13, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 1-13. The memory, such as the flash memory 1520 and/or the DRAM 1522, may be a processor-readable memory and/or a computer-readable memory that stores software code (programming code, instructions, etc.) configured to cause a processor(s) within the CPU/Radio 1518 to perform the functions described. In other embodiments, one or more of the functions described may be performed in hardware.

A set of these instructions and/or code might be stored on a non-transitory machine-readable storage medium, such as the flash memory 1520 and/or the DRAM 1522. In some cases, the storage medium might be incorporated within a computer system, such as the CPU/Radio 1518. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the network device 1400 and/or might take the form of source and/or installable code, which, upon compilation and/or installation on the network device 1400 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other access or computing devices such as network input/output devices may be employed.

It should be appreciated that the network device 1400 may have other components than those depicted in FIGS. 14, 15, and 16. Further, the embodiment shown in the figures are only one example of a network device that may incorporate an embodiment of the invention. In some other embodiments, network device 1400 may have more or fewer components than shown in the figure, may combine two or more components, or may have a different configuration or arrangement of components.

Figure 17:
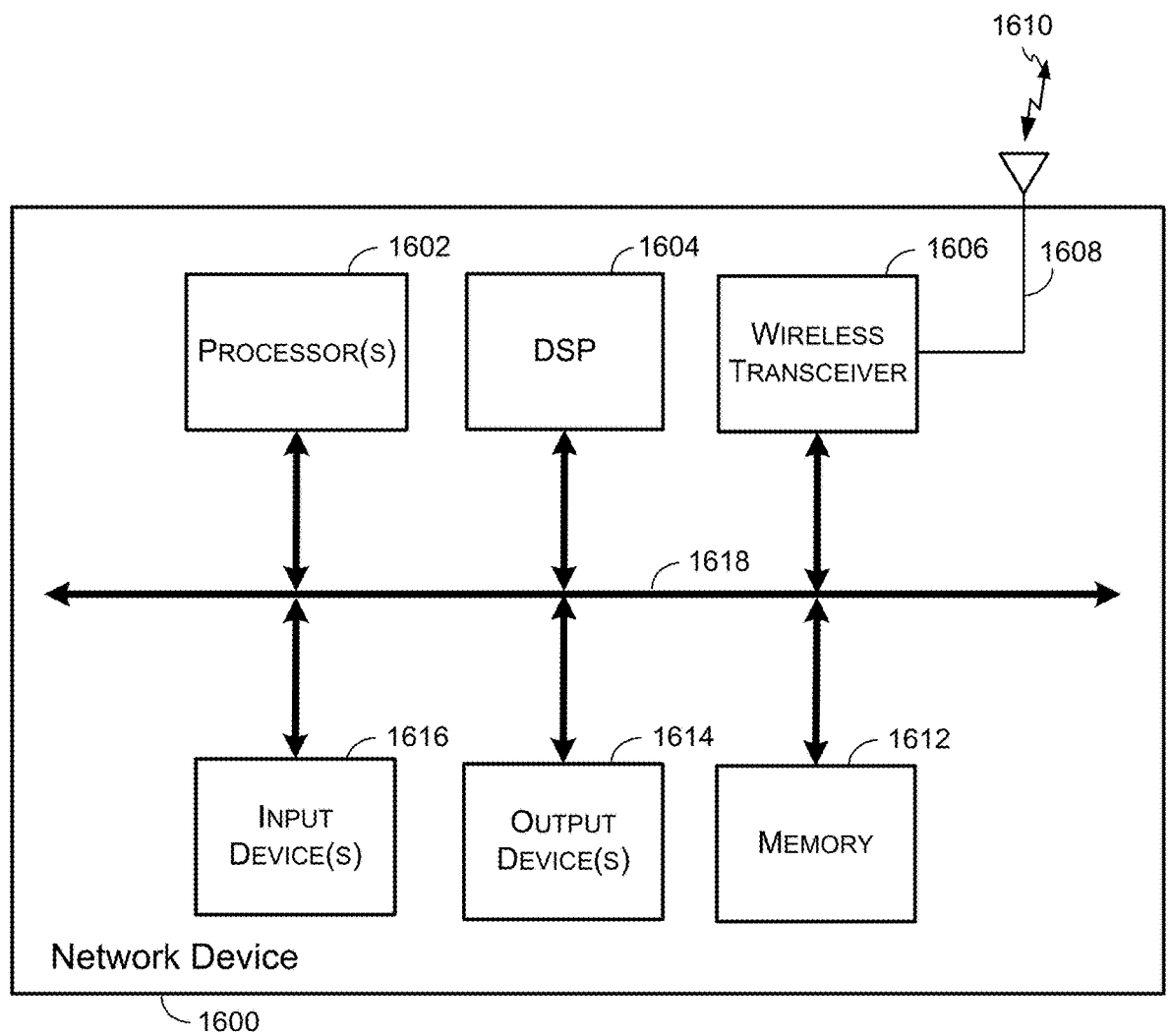
FIG. 17 is a block diagram illustrating an example of an access device, in accordance with some embodiments.

FIG. 17 illustrates an example of a network or access device 1600 (hereinafter "access device"). The access device 1600 may include any human-to-machine interface with network connection capability that allows access to a network. For example, the access device 1600 may include a stand-alone interface (e.g., a cellular telephone, a smartphone, a home computer, a laptop computer, a tablet, a personal digital assistant (PDA), a computing device, a wearable device such as a smart watch, a wall panel, a keypad, or the like), an interface that is built into an appliance or other device (e.g., television, refrigerator, security system, game console, browser, or the like), a speech or gesture interface (e.g., Kinect™ sensor, Wiimote™, or the like), an internet of things (IoT) device interface (e.g., an Internet enabled appliance such as a wall switch, a control interface, or the like). The access device 1600 includes hardware elements that can be electrically coupled via a bus 1618 (or may otherwise be in communication, as appropriate). In one embodiment, the bus 1618 can be used for the processor(s) 1602 to communicate between cores and/or with the memory 1612. The hardware elements may include one or more processors 1602, including without limitation one or more general-purpose processors and/or one or more special-purpose processors (such as digital signal processing chips, graphics acceleration processors, and/or the like); one or more input devices 1616, which can include without limitation a camera, a mouse, a keyboard, a touch sensitive screen, a touch pad, a keypad, and/or the like; and one or more output devices 1614, which can include, without limitation, a display, a printer, and/or the like.

The access device 1600 may include one or more wireless transceivers 1606 connected to the bus 1618. The wireless transceiver 1606 may be operable to receive a wireless signal 1610 via antenna 1608. The wireless signal 1610 may be transmitted via a wireless network. In some embodiments, the wireless network may be any wireless network such as a wireless local area network (e.g., local area network 100), such as WiFi, a Personal Access Network (PAN), such as Bluetooth® or Zigbee®, or a cellular network (e.g. a GSM, WCDMA, LTE, CDMA2000 network). Wireless transceiver 1606 may be configured to receive various radio frequency (RF) signals 1610 via antenna 1608 from one or more gateways, network devices, cloud networks, and/or the like. Access device 1600 may also be configured to decode and/or decrypt, via the DSP 1604 and/or processor(s) 1602, various signals received from one or more gateways, network devices, cloud networks, and/or the like.

The access device 1600 may further include (and/or be in communication with) one or more non-transitory machine-readable storage mediums or storage devices (e.g., memory 1612), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1612, such as RAM, ROM, FLASH, or disc drive, and executed by processor(s) 1602 or DSP 1604. The access device 1600 can also comprise software elements (e.g., located within the memory 1612), including, for example, an operating system, device drivers, executable libraries, and/or other code, such as one or more application programs, which may comprise computer programs implementing various functions. Memory 1612 may be a non-transitory machine-readable storage medium, processor-readable memory, and/or a computer-readable memory that stores the one or more computer-program products configured to cause the processor(s) 1602 and/or DSP 1604 to perform the various functions. In other embodiments, the various functions described may be performed in hardware.

Figure 18:
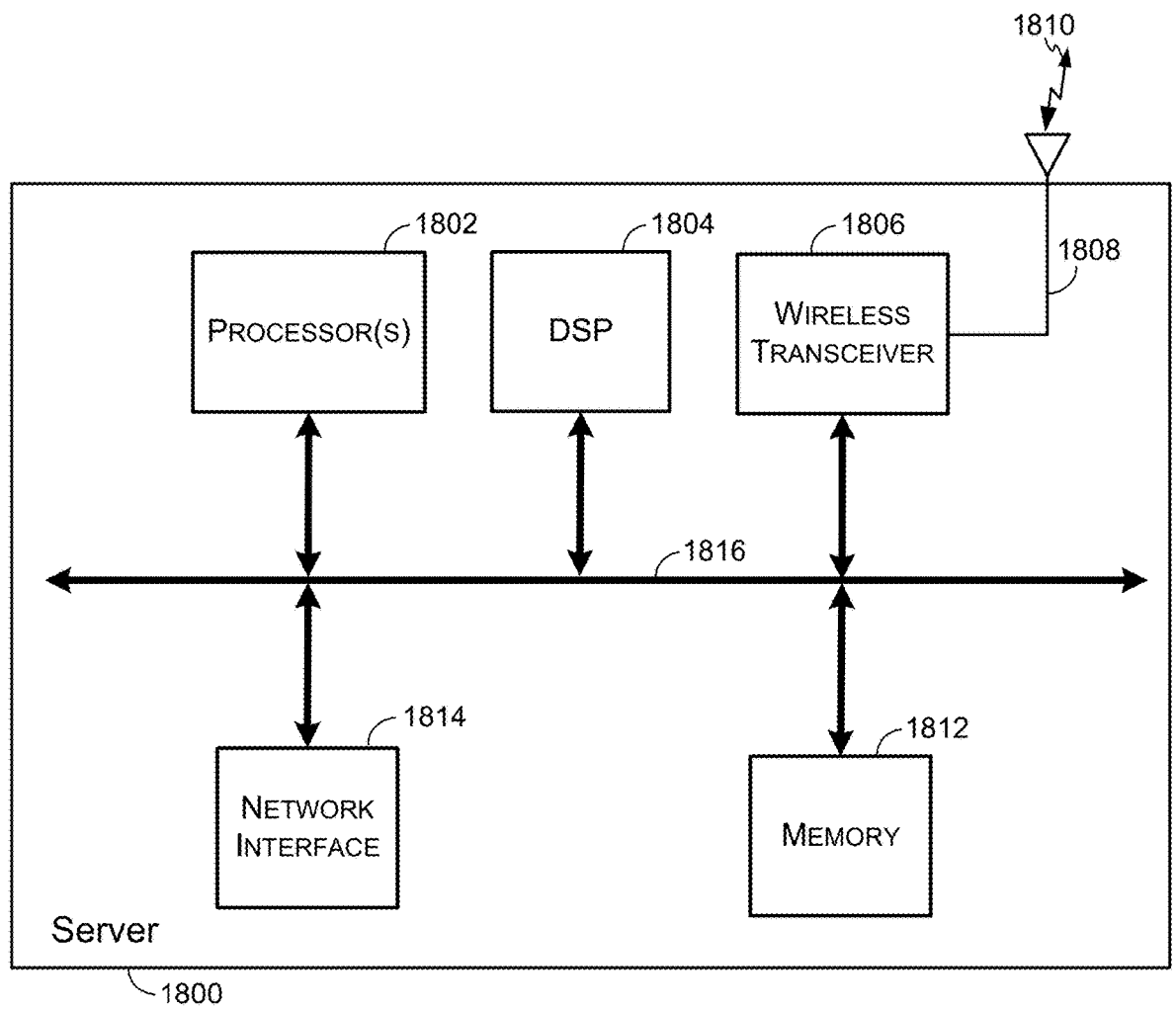
FIG. 18 is a block diagram illustrating an example of a server, in accordance with some embodiments.

FIG. 18 illustrates an example of a server 1800. The server 1800 includes hardware elements that can be electrically coupled via a bus 1816 (or may otherwise be in communication, as appropriate). In one embodiment, the bus 1816 can be used for the processor(s) 1802 to communicate between cores and/or with the memory 1812. The hardware elements may include one or more processors 1802, including without limitation one or more general-purpose processors and/or one or more special-purpose processors (such as digital signal processing chips, graphics acceleration processors, and/or the like), memory 1812, DSP 1804, a wireless transceiver 1806, a bus 1816, and antenna 1808. Furthermore, in addition to the wireless transceiver 1806, server 1800 can further include a network interface 1814 to communicate with a network (e.g., a local area network, a network of a preferred carrier, Internet, etc.).

The server 1800 may further include (and/or be in communication with) one or more non-transitory machine-readable storage mediums or storage devices (e.g., memory 1812), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more one or more computer-program products, such as instructions or code, in memory 1812. The server 1800 can also comprise software elements (e.g., located within the memory), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIGS. 1-13, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIGS. 1-13. The memory 1812 may be a non-transitory machine-readable storage medium, processor-readable memory, and/or a computer-readable memory that stores the one or more computer-program products configured to cause the processor(s) 1802 to perform the functions described. In other embodiments, one or more of the functions described may be performed in hardware.

A set of these instructions and/or code might be stored on a non-transitory machine-readable storage medium, such as the memory 1812. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the server 1800 and/or might take the form of source and/or installable code, which, upon compilation and/or installation on the server 1800 (e.g., using any of a variety of generally available compilers, installation programs, compression/decompression utilities, etc.) then takes the form of executable code.

Figure 19:
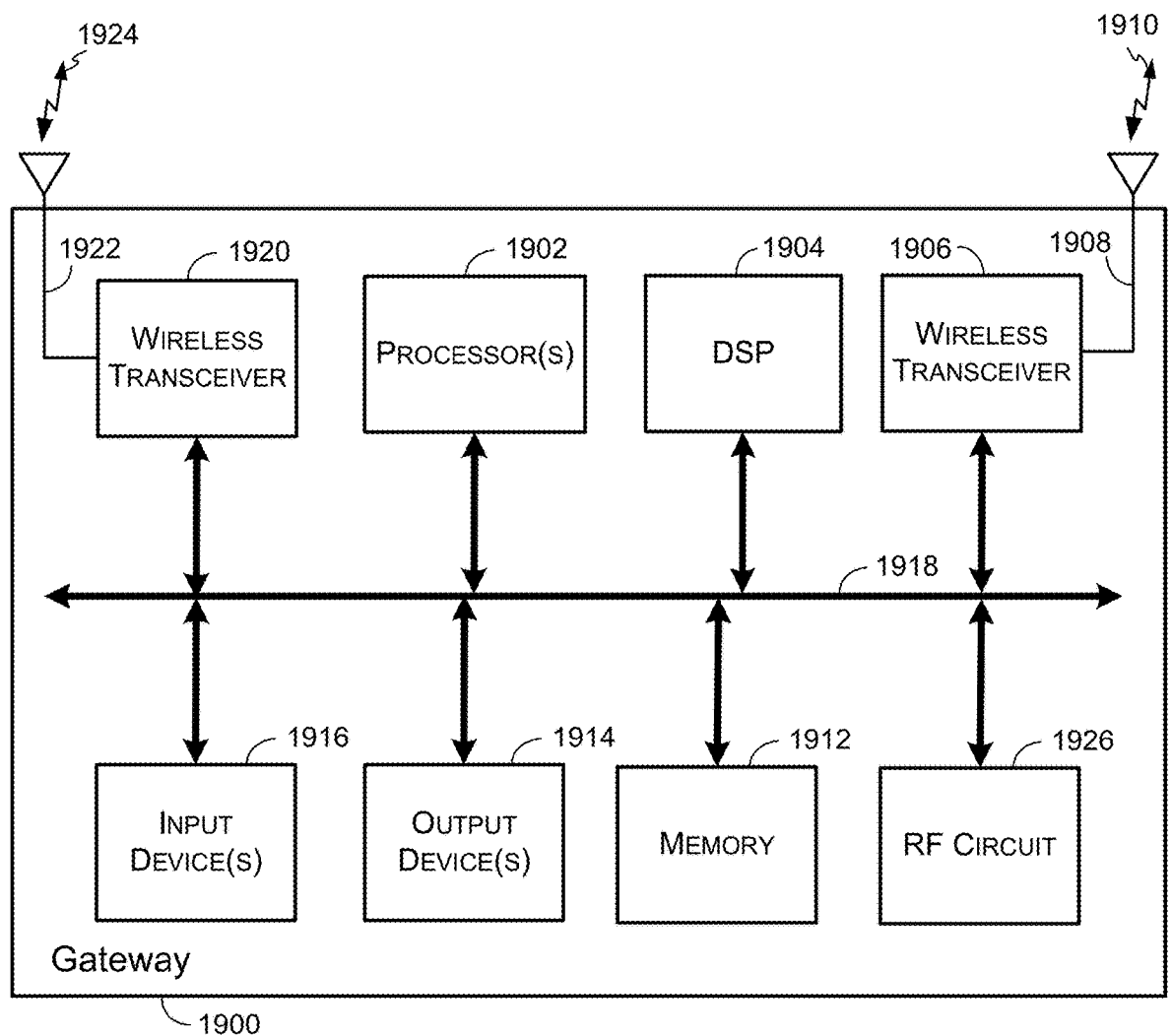
FIG. 19 is a block diagram illustrating an example of a gateway, in accordance with some embodiments.

FIG. 19 illustrates an example of a gateway 1900. The gateway 1900 may include a range extending device, a router, an access point, a modem, and/or any other device that provides network access among one or more computing devices and/or external networks. For example, the gateway 1900 may include a router gateway with access point and router functionality, and may further include an Ethernet switch and/or a modem. As another example, the gateway 1900 may include a range extending gateway that may be used to improve signal range and strength within a network by taking an existing signal from another gateway (e.g., a router gateway, an access point, or the like) and rebroadcasting the signal to create a second logical network.

The gateway 1900 includes hardware elements that can be electrically coupled via a bus 1918 (or may otherwise be in communication, as appropriate). In one embodiment, the bus 1918 can be used for the processor(s) 1902 to communicate between cores and/or with the memory 1912. The hardware elements may include one or more processors 1902, including without limitation one or more general-purpose processors and/or one or more special-purpose processors (such as digital signal processing chips, graphics acceleration processors, and/or the like); one or more input devices 1916, which can include without limitation one or more buttons, a keyboard, a keypad, a touch sensitive screen, a touch pad, and/or the like; and one or more output devices 1914, which can include, without limitation, a display, light or sound indicators, and/or the like.

The gateway 1900 may include one or more wireless transceivers 1906 and 1920 connected to the bus 1918. The wireless transceiver 1906 may be operable to receive wireless signals (e.g., a wireless signal 1910) via an antenna 1908. The wireless transceivers 1920 may be operable to receive wireless signals (e.g., a wireless signal 1914) via an antenna 1922. The wireless transceivers 1906 and 1920 may each include a WiFi transceiver radio designed to transmit and receive signals using frequencies of a specific frequency band, which may be referred to herein as "WiFi circuits." For example, wireless transceiver 1906 may include a 2.4 GHz WiFi circuit, and wireless transceiver 1920 may include a 5 GHz WiFi circuit. Accordingly, the gateway 1900 may include a single WiFi circuit for a first WiFi frequency band, and a single WiFi circuit for a second WiFi frequency band. In some embodiments, the gateway 1900 may include multiple wireless transceivers (not shown) for each available frequency band. The antennas 1908 and 1922 may include multiple band antennas that can transmit and/or receive signals over different frequency bands.

The gateway 1900 may further include radio frequency (RF) circuit 1926. In some embodiments, the wireless transceivers 1906 and 1920 may be integrated with or coupled to the RF circuit 1926 so that the RF circuit 1926 includes the wireless transceivers 1906 and 1920. In some embodiments, the wireless transceivers 1906 and 1920 and the RF circuit 1926 are separate components. The RF circuit 1926 may include a RF amplifier that may amplify signals received over antennas 1908 and 1922. The RF circuit 1926 may also include a power controller that may be used to adjust signal amplification by the RF amplifier. The power controller may be implemented using hardware, firmware, software, or any combination thereof.

The wireless signals 1910 and 1924 may be transmitted via a wireless network. In some embodiments, the wireless network may be any wireless network including but not limited to a wireless local area network (e.g., local area network 100), such as WiFi™, a Personal Access Network (PAN), such as Bluetooth®, Zigbee®, or UWB, or a wide area network, such as a cellular network (e.g. a GSM, WCDMA, LTE, CDMA2000 network), a cloud network, the Internet, or other network. Wireless transceivers 1906 and 1920 may be configured to receive various radio frequency (RF) signals (e.g., signals 1910 and 1924) via antennas 1908 and 1924, respectively, from one or more other gateways, access devices, network devices, cloud networks, and/or the like. Gateway 1900 may also be configured to decode and/or decrypt, via the DSP 1904 and/or processor(s) 1902, various signals received from one or more gateways, network devices, cloud networks, and/or the like.

The gateway 1900 may include a power supply (not shown) that can power the various components of the gateway 1900. The power supply may include a switch-mode power supply, a linear power supply, a push-pull power supply, or any other suitable type of power supply. In some embodiments, the gateway 1900 may include multiple power supplies. For example, a switch-mode power supply may be used to condition input power, and a linear power supply may be used to power the RF circuit 1926. The power supply may be configured to operate over various ranges of appropriate input voltages.

The gateway 1900 may further include (and/or be in communication with) one or more non-transitory machine-readable storage mediums or storage devices (e.g., memory 1912), which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

In various embodiments, functions may be stored as one or more computer-program products, such as instructions or code, in memory 1912, such as RAM, ROM, FLASH, or disc drive, and executed by processor(s) 1902 or DSP 1904. The gateway 1900 can also comprise software elements (e.g., located within the memory 1912), including, for example, an operating system, device drivers, executable libraries, and/or other code, such as one or more application programs, which may comprise computer programs implementing the functions provided by various embodiments, and/or may be designed to implement methods and/or configure systems, as described herein. Merely by way of example, one or more procedures described with respect to the processes discussed above, for example as described with respect to FIG. 13, may be implemented as code and/or instructions executable by a computer (and/or a processor within a computer); in an aspect, then, such code and/or instructions can be used to configure and/or adapt a general purpose computer (or other device) to perform one or more operations in accordance with the described methods. Such functions or code may include code to perform the steps described above with respect to FIG. 13. The memory 1912 may be a non-transitory machine-readable storage medium, processor-readable memory, and/or a computer-readable memory that stores the one or more computer-program products configured to cause the processor(s) 1902 to perform the functions described. In other embodiments, one or more of the functions described may be performed in hardware.

A set of these instructions and/or code might be stored on a non-transitory machine-readable storage medium, such as the memory 1912. In some cases, the storage medium might be incorporated within a computer system. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions of one or more computer-program products might take the form of executable code, which is executable by the gateway 1900 and/or might take the form of source and/or installable code, which, upon compilation and/or installation on the gateway 1900 (e.g., using any of a variety of generally available compilers, installation programs, compression/decompression utilities, etc.) then takes the form of executable code.

Figure 20:
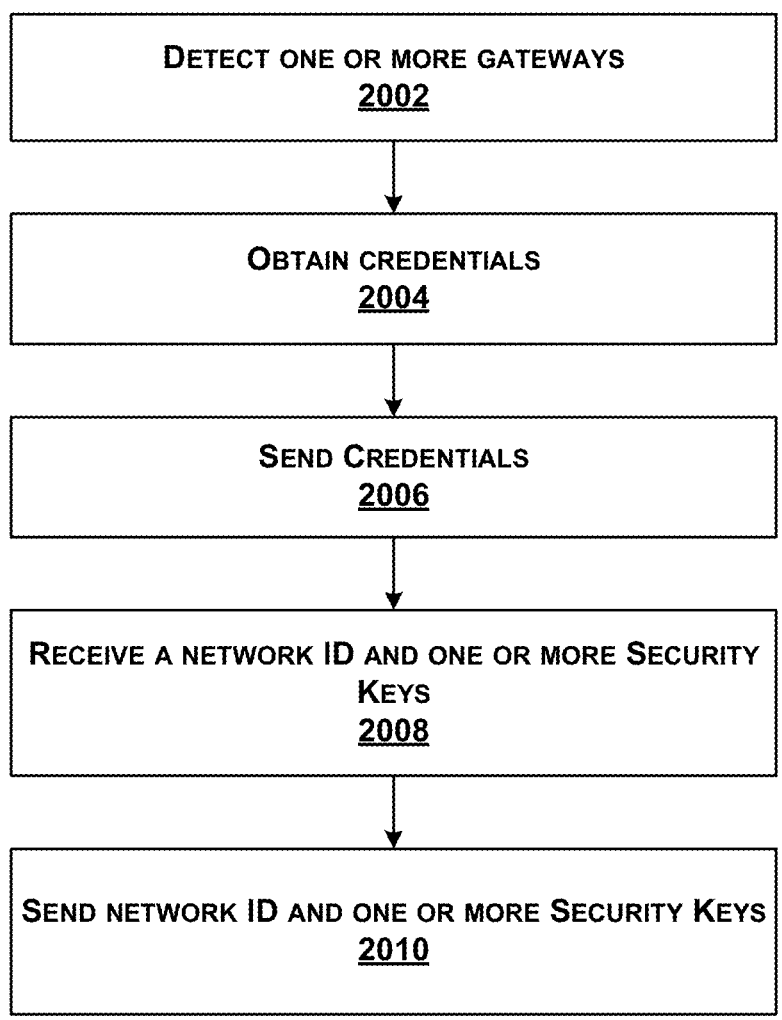
FIG. 20 is a flowchart illustrating an embodiment of a process for registering one or more network devices, in accordance with some embodiments.

Referring back to FIG. 1, upon being powered on or reset, the network devices 102, 104, 106 may be registered with the cloud network 114 and associated with a logical network within the local area network 100. FIG. 20 illustrates an example of a process 2000 for registering one or more network devices, such as the network devices 102, 104, 106 illustrated in FIG. 1. When multiple network devices 102, 104, 106 and gateways 110, 112 are included within a local area network, the network devices and/or gateways may be installed at different times, resulting in the techniques described with respect to FIG. 20 possibly occurring for each network device and/or gateway at different points in time. For example, a user may install network device 102 at a first point in time on a first floor of the user's house. Gateway 110 may also be located on the first floor, resulting in the network device 102 pairing with gateway 110. The user may later install gateway 112 and network device 106 on a second floor of the user's home, resulting in the network device 106 pairing with gateway 112.

At 2002, a network device may detect one or more gateways upon being powered on or reset. In some embodiments, a provisioning process may occur when the network device is powered on or reset and detected by an access device (e.g., access device 108). During the provisioning process, the access device may directly communicate with the network device. In some embodiments, direct communication between network devices (e.g., network devices 102, 104, 106) and access device (e.g., access device 108) may occur using various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like.

The provisioning process may include pairing the network device with a gateway and registering the gateway, network device, and access device with a server, such as a server located within the cloud network 114. For example, upon being powered on or reset to factory settings, the network device may send or broadcast identification information to one or more access devices. The identification information may be sent during a discovery process. For example, the identification information may be sent in response to a discovery request from an access device. In some cases, the identification information may include a name of the network device.

An application, program, or the like that is installed on and executed by the access device may receive the identification information from the network device. When the application on the access device is launched by a user, the access device may display the identification information for selection by the user. Once the network device identification information is selected, the access device may send a signal to the network device indicating that it has been selected. The network device may then send to the access device a list of gateways that are detected by the network device. The access device may receive and display the list of gateways. In some embodiments, the list of gateways includes multiple gateways (e.g., gateways 110 and 112) that are located within the local area network. The user may select the gateway that the user wishes for the network device to pair. For example, the gateway that provides the best signal strength for the network device may be selected. The access device may then prompt the user to enter login information that is required for accessing the network signals provided by the selected gateway. For example, the login information may be the same information that was originally set up to access the gateway network signals (e.g., when the gateway was initially installed). Once entered, the access device may send the login information to the network device. The network device may use the login information to pair with the selected gateway. As one example, network device 102 and network device 104 may be paired with gateway 110, and network device 106 may be paired with gateway 112.

Once paired with a gateway, the network device may be registered with a cloud network (e.g., cloud network 114). For example, the access device (e.g., via the application, program, or the like) may instruct the network device to register with the cloud network upon receiving confirmation from the network device that it has been successfully paired with a gateway. At 2004, the network device may obtain credentials from the gateway as part of the registration process. For example, network device 102 may obtain credentials from gateway 110. At a same or later point in time, network devices 104 and 106 may obtain credentials from gateways 110 and 112, respectively. In some embodiments, the credentials may include a SSID of the local area network and a MAC address of the gateway. An SSID received from two gateways (e.g., gateways 110, 112) may be the same due to the gateways both being within the same local area network. In some cases, the SSID of the two gateways may be different. The MAC address of each of the gateways may be unique to each gateway. As a result of each gateway having a unique MAC address, the credentials obtained from a gateway may be unique to that particular gateway. One of ordinary skill in the art will appreciate that other credentials may be obtained from a gateway, such as an Internet Protocol address, or the like.

The network device may then send the gateway credentials to the cloud network at 2006. For example, the network devices 102, 104, 106 may send credentials for the gateway with which each is paired to the server located within the cloud network 114. For example, network device 102 may transmit the credentials obtained from gateway 110 to the server, and network device 106 may transmit the credentials obtained from gateway 112 to the server. In some embodiments, the network device may also send information relating to the network device (e.g., MAC address, serial number, make, model number, firmware version, and/or an interface module identifier, or the like) to the server, and/or information relating to the access device (e.g., MAC address, serial number, application unique identifier, or the like) to the server. In some embodiments, the communication of the credentials, the network device information, and/or the access device information sent from the network device to the cloud network server may be in a Hypertext Transfer Protocol (HTTP) format, a Hypertext Transfer Protocol Secure (HTTPS) format, a secure Transmission Control Protocol (TCP) format, or the like. One of ordinary skill in the art will appreciate that other communication formats may be used to communicate between the network device and the cloud network server.

Once the credentials, network device information, and/or access device information are received by the server, the server may register each gateway as a logical network within the local area network and may generate a network ID for each logical network. For example, the server may register the gateway 110 as a first logical network. During the registration process, the server may generate a first network ID for identifying the first logical network. As noted above, one of ordinary skill in the art will appreciate that any number of gateways may be present within the local area network, and thus that any number of logical networks may be registered for the local area network. The server may further generate a first set of security keys for authenticating the network device and the access device. For example, the server may generate a unique key for the network device 102 and a separate unique key for the access device 108.

In some embodiments, as previously described, network device 104 may also be paired with gateway 110 at the same or a later point in time as the network device 102. During registration of the network device 104, the server may determine that the access device 108 has already been registered with another network device (e.g., network device 102) that is associated with the same logical network of gateway 110. In such embodiments, the server may retrieve the first network ID that was used in registering the first logical network. The server may also generate a new unique security key for the network device 104, and may retrieve the unique key that was previously generated for the access device 108 when registering the gateway 110 as the first logical network.

The gateway 112 may also be registered by the server as a second logical network with a second network ID. A second set of security keys may be generated for the network device 106 and the access device 108. For example, the server may generate a unique security key for the network device 106 and a unique security key for the access device 108 as it relates to the second logical network. In some embodiments, the gateway may 112 be installed at a later point in time after the gateway 110 is installed, and thus may be registered as the second logical network at the later point in time.

A record or profile may then be created for associating each network ID with the credentials of a corresponding gateway, the corresponding network device(s), and the access device. For example, the server of the cloud network 114 may associate the first network ID with the credentials of gateway 110. Similarly, the server may associate the second network ID with the credentials of gateway 112. In some embodiments, the server performs the association by generating and storing a record including the network ID, the set of security keys, the gateway credentials, the network devices associated with the network ID (e.g., MAC address or serial number of a network device), the access devices associated with the network ID (e.g., MAC address, serial number, application unique identifier, or the like), and/or any other information relevant to the network devices and/or gateways. For example, the server may store the first network ID and the first set of security keys in a first record at a first memory space (e.g., in Flash, DRAM, a database, or the like) along with the SSID and MAC address for gateway 110 and an identifier of the network devices 102 and/or 104. The server may also store the second network ID and the second set of security keys in a second record at a second memory space along with the SSID and MAC address for gateway 112 and an identifier of the network device 106. In some embodiments, an example of a network device identifier may include a MAC address of the network device, a serial number of the network device, or any other unique identifier.

Each of the first and second network IDs may include a unique number or alphanumeric string generated sequentially or randomly. For example, the first time a network device and an associated gateway are registered on the cloud network 114, the unique network ID for the logical network of the gateway may start with 7000000. Each subsequent logical network that is created may be a sequential increment of the initial network ID (e.g., 7000001, 7000002, 7000003, etc.). As another example, the network ID may be generated by a random or pseudo-random number generator. One of ordinary skill in the art will appreciate that other techniques for generating a unique ID may be used. The technique used to generate the network IDs may be dependent on a type of database that is included in the cloud network 114. For example, different databases may have different proprietary mechanisms for creating a unique identifier.

The set of keys generated for each logical network may be generated using database specific technique. For example, a MySQL technique may be used to generate the sets of keys. Each key may include a universally unique identifier (UUID) or a globally unique identifier (GUID). As described above, for each logical network, the server may generate a unique key for a network device and a separate unique key for an access device.

At 2008, the network device may receive the network ID and the set of security keys. For example, once the server has generated a record or profile associating the network device 102 with the first logical network, the server may transmit the first network ID and the first set of security keys to the network device 102. The network device 102 may store the first network ID and one or more keys of the first set of keys. For example, the network device 102 may store the unique security key that was created by the server for the network device 102.

As noted previously, the network devices 102, 104, 106 and gateways 110, 112 may be installed at different times. For example, in some embodiments, network device 104 may be installed at a point in time after the first logical network is created based on the pairing between gateway 110 and network device 102. In such embodiments, upon being powered on, the network device 104 may pair with gateway 110, obtain credentials from gateway 110, and transmit the credentials to the server in the cloud network 114 using similar techniques as those described above. The server may associate the network device 104 with the previously generated first network ID. As described above, the server may also generate a new unique security key for the network device 104, and may retrieve the unique key that was previously generated for the access device 108 when registering the first logical network. The network device 104 may then receive and store the first network ID and the security keys from the server.

At 2010, the network device may send the network ID and the set of security keys to the access device. For example, the network device 102 may send to the access device 108 the first network ID and the unique security key generated for the access device 108. The network device 102 and the access device 108 may then communicate with the cloud network server using the first network ID and each device's unique key. In some embodiments, the network device and the access device may generate a signature using their respective security key. The signature is sent to the cloud network server along with a communication from the network device or access device. The cloud network server may process the signature in order to authenticate each device, as described below. The network device and access device may use different techniques to generate a signature.

A network device may generate a signature using its uniquely generated security key. For example, the signature may be expressed as: Authorization=MacAddress":"Signature":"ExpirationTime. The Authorization term may be an attribute, and the MacAddress, Signature, and ExpirationTime terms may include values for the Authorization attribute. In particular, the MacAddress value may include the MAC address of the network device, which may include a unique alphanumeric or numeric string. The network device may retrieve its MAC address from memory and place it in the MacAddress field. The Signature value may be expressed as: Signature=Base64(HMAC-SHA1(PrivateKey, StringToSign)). The Signature value may include an alphanumeric or numeric string. HMAC-SHA1 is an open source technique that includes a Hash-based Message Authentication Code (HMAC) using a SHA1 hash function. The HMAC-SHA1 technique uses the values PrivateKey and StringToSign as inputs. The PrivateKey input includes the unique security key that was generated by the server for the network device. The StringToSign input may be expressed as StringToSign=MacAddress+"\n"+SerialNumber+"\n"+ExpirationTime. Accordingly, the StringToSign input is generated by appending a serial number of the network device and an expiration time to the network device's MAC address. The ExpirationTime term may indicate the period of time for which the signature is valid. In some embodiments, the ExpirationTime term may include a current time at which the signature is generated plus period of time for which the signature is valid. In one example, the ExpirationTime term may be expressed as ExpirationTime=Number of seconds since Jan. 1, 1970.

The network device may place the signature in a data packet for transmission with a communication signal to the cloud network server. The network device may also place the network ID in the data packet. The signature and the network ID, if included, may be used by the cloud network server to verify that the network device is associated with the logical network. In some embodiments, a signature is provided with each communication sent from the network device to the server. Once the signature is received by the server, the server generates a signature using the same expression as that used by the network device. For example, the server may retrieve the network device's key and other relevant information from storage and generate the signature using the key and the other information using the expression described above. The server then verifies whether the signatures match. Upon determining that the signatures match, the server authenticates the network device's communication.

An access device may also generate a signature using its uniquely generated security key. For example, the access device signature may be expressed as: Authorization=SDU UniqueId":"Signature":"ExpirationTime. The Authorization term may be an attribute, and the SDU UniqueId, Signature, and ExpirationTime terms may include values for the Authorization attribute. The SDU UniqueId term may include a unique phone identifier. The SDU UniqueId value may depend on the type of access device that is used and the type of values that may be accessed and/or generated by the type of access device. In some cases, one type of access device may not allow an application to access a unique identifier of the access device (e.g., a serial number, UUID, or the like). In such cases, the SDU UniqueId value may include a value generated by an application or program installed on and executed on the access device that is used to access the network device. The value may be unique to the application or program that generated the value. In other cases, another type of access device may allow an application to access a unique identifier of the access device. In such cases, the SDU UniqueId value may include a value that is unique to the access device itself, such as a serial number, UUID, or the like. In this example, the access device may retrieve the unique value from storage within the access device. One of ordinary skill in the art will appreciate that other unique identifiers may be used to uniquely identify the access device. The Signature value may be expressed as: Signature=Base64(HMAC-SHA1(PrivateKey, StringToSign)). Using this expression, the input to the HMAC-SHA1 technique may include a PrivateKey term and a StringToSign term. The PrivateKey input includes the unique security key that was generated by the server for the access device with regard to a particular logical network. The StringToSign input may be expressed as StringToSign=UniqueId+"\n"+"\n"+Expiration Time. The StringToSign value is different from the StringToSign value generated by network device in that no serial number is included. Accordingly, the StringToSign input is generated by appending an expiration time to the access device's unique identifier. The ExpirationTime term may indicate the period of time for which the signature is valid, similar to that above for the signature generated by the network device.

The access device may place the signature in a data packet and may transmit the data packet to the cloud network server with a communication signal. The network device may also place the network ID in the data packet. The signature and the network ID, if included, may be used by the cloud network server to verify that the access device is associated with the logical network and authorized to communicate with one or more network devices associated with the logical network. In some embodiments, a signature is provided with each communication sent from the access device to the server. The cloud server may receive the signature and may generate a signature using the same expression as that used by the access device. For example, the server may retrieve the access device's key and other relevant information from storage and generate the signature using the key and the other information using the expression described above. The server then verifies whether the signatures match. Upon determining that the signatures match, the server authenticates the access device and allows it to communicate with one or more of the network devices associated with logical network.

Once the provisioning process is completed, the access device 108 may access the network device 102 locally via the gateway 110 (e.g., communication signal 118) or remotely via the cloud network 114 (e.g., communication signal 120). In some embodiments, the communication between the access device 108 and the cloud network 114 may be a HTTP or HTTPS communication. One of ordinary skill in the art will appreciate that other communication mechanisms may be used to communicate between the access device 108 and the cloud network 114.

The network 100 may enable a user to monitor and/or control operation of the devices 102 and 104. For example, a user may monitor and/or control operation of devices by interacting with a visual interface of the gateway 110 (i.e., a web page for gateway 110) and/or a visual interface rendered on a display of an access device, such as access device 108. In some embodiments, an application may be run on the access device. The application may cause the access device to present a graphical interface that includes a visual interface for each device accessible on the network 100.

A network device may generate and/or provide a "status" of the network device. In certain embodiments, the status or state of a network device can be indicated on a visual interface on the access device, for example within the tile with text and/or graphically. The status of the network device can change based on time (e.g., a period, an interval, or other time schedule). The status of a network device may be any piece of information pertinent to that particular network device. The status of a network device may be any changeable variable of that particular network device. For example, the status of a network device may include a state of the-network device itself (e.g., on or off) or how the network device is situated within the network with respect to the other network and other network devices throughout the network. For example, the status of a network device may refer to the network device's proximity to another network device and/or its ability to communicate with another network device because of the relative signal strength between the two network devices. In certain embodiments, the status can include a value or some other information indicating a unit of measure for a setting or an attribute related to operation of a device connected to the network device. The setting or the attribute can be adjustable within a range of values. For example, the device connected to the network device can be a light bulb and the status can include a value corresponding to brightness (e.g., a percentage of total brightness) emitted by the light bulb when the light bulb is powered-on. In another example, the device can be a motion sensor and the status can include a value corresponding to sensitivity of the sensor in a range of values between 0 to 100 when the sensor is powered on. In yet another example, the device can be a fan and the status can include a value corresponding to a speed of the fan on a scale of 0 to 100 when the fan is powered-on.

As described above, upon being powered on or reset, the-network devices 102 and/or 104 may be registered with the cloud network 114 and associated with a logical network within the local area network 100. Similarly, upon being powered or switched off or otherwise being disconnected from the network 100, the status of the-network device 102 would be known and stored by a cache (not shown) associated with the network 100. For example, cloud network 114 may include storage (e.g. cache) that stores the status of the network devices within each local area network 100 it is connected to and/or provides access to. In another example, the gateway 110 may include storage that stores the status of the network devices within each local area network it is connected to and/or provides access to. More specifically, the status stored in the cache may include a status table which indicates the current status of each network device (as of its last communication with each network device). A status table may include all statuses of each-network device, or individual storage tables for each local area network or other subset of its network devices/networks. In one embodiment, a change in status may prompt the-network device to push its change in in status to the cloud network 114 for storage or updating of the cloud's stored status table. In another embodiment, cloud network 114 and/or gateway 110 may continuously (or periodically) communicate with each-network device to check to see if its status has changed.

In some embodiments, a network device (e.g. network device 102 and/or 104) may, upon connecting to the local area network 100, check the status of the-network devices on the network 100. In other embodiments, one-network device may check the status of one or more of the other network devices on the network 100. The network device may seek to check the status of another network device or access device for various reasons, including to display such status (es) to a user on a display or otherwise, to check whether that network device belongs to the same network, to synchronize or coordinate any scheduled executions, to update an attribute based on adjustment received among others. For example, a network device or user may desire to check various statuses on a connected device, such as power level, timestamped activity history (e.g. temperature for a thermostat, motion for a motion detector, etc.), how long it has been active/turned on, attributes for operation of the connected device (e.g., a brightness of a lamp, a speed of a fan, or a sensitivity of a sensor, etc.), among many others.

In some embodiments, a device, such as the access device 108 shown in FIG. 1 or the gateway 110, connected to the network 100 can communicate an updated status of a network device, such as the network devices 102 and/or 104. The updated status can be communicated via the network 100 and can include an adjustment that affects a status of the network device. The adjustment can include an amount of change to one or more attributes, one or more settings, or a combination thereof related to operation of the network device connected to the network 100. The access device 108 or the gateway 110 can present a graphical interface that can receive input corresponding to an adjustment to a status of a device. In some embodiments, the updated status of the network device communicated to the network 100 can be received by a network device to which the updated status applies, or can be received by the gateway 110, the cloud network 110, or any other device in communication with the network. If the device cannot directly receive the updated status, it can also receive the updated status from the cloud network 114, the gateway 110, or the other devices in the network 100. In some embodiments, the network device can communicate its updated status to the network 100, which can indicate whether the status has been updated. The updated status can be received by the access device or any other device in the network 100. In some embodiments where the access device is not located within the network 100, the access device may not immediately receive the updated status. The updated status can be stored by the cloud network 114 or the gateway 110 for communication to the access device. The status of the network device can indicate whether an adjustment was made based on an adjustment in a setting or an attribute transmitted by the access device. Alternatively, or additionally, the access device can receive, from any other network device connected to the network 100, a status update indicating whether the adjustment was in fact made at a network device.

A network device seeking to check the status of any other device on the network 100 may communicate with the cloud network 114, to which all devices on the network 100 are connected either directly or indirectly. Since the cloud network 114 and/or the gateway 110 can store an updated table/list of the statuses of each of the network devices 102 and 104 within the requesting network's local area network, the cloud network 114 and/or gateway 110 may communicate such status data to the network devices 102 and 104 and the access device. For example, if-network devices 102 and 104 were to each turn on and communicate their statuses to cloud network 114, cloud network 114 may analyze the status of network devices 102 and 104 and communicate to network devices 102 and 104 that they are each connected to the same local area network 100.

Figure 21:
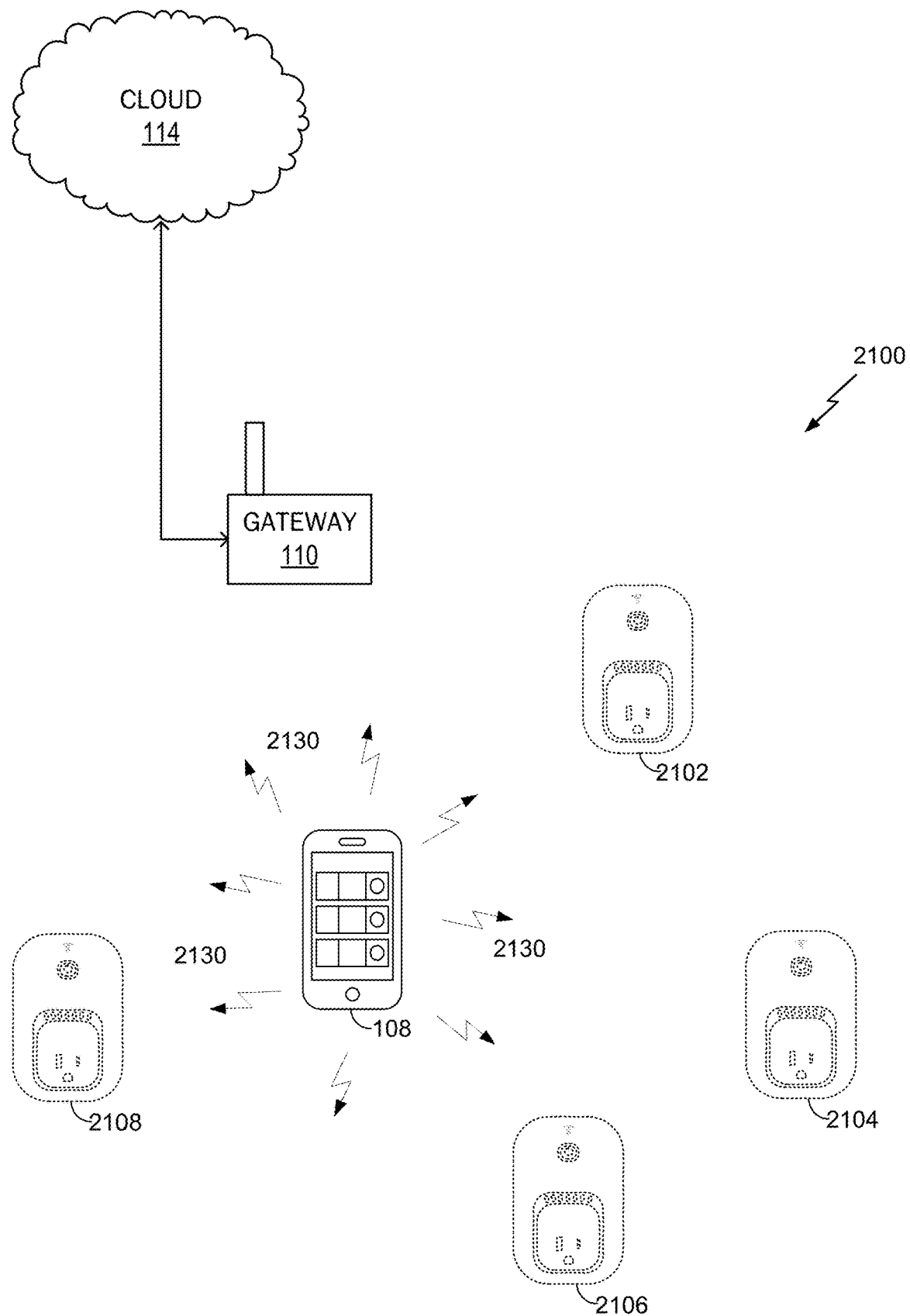
FIG. 21 is an illustration of an example of a network environment, in accordance with some embodiments.

FIG. 21 illustrates an example of a network 2100, according to embodiments of the present invention. Specifically, the network 2100 can be a wireless local area network enabling an access device to communicate with network devices to control adjustment of attributes related to operation of the network devices. Network 2100 includes network device 2102, network device 2104, network device 2106, and network device 2108. The network 2100 also includes access device 108. In other words, the network 2100 may be substantially similar to the network 100 except that access device 108 has been turned on near the network 2100, to which it is associated, or has entered an area to which the network 2100 can reach.

When access device 108 can enter the network 2100 as shown in FIG. 21, access device 108 may be authenticated based on the access device's authentication with the logical network or may otherwise commence communication with cloud network 114. Access device 108 may also communicate notification of its presence or other information directly to other network devices 2102-2108 within network 2100, as shown in FIG. 21 by communication paths 2130. As noted, such communication may include various communications protocols, such as Universal Plug and Play (UPnP), Bluetooth®, Zigbee®, Ultra-Wideband (UWB), WiFi-Direct, WiFi, Bluetooth® Low Energy (BLE), sound frequencies, and/or the like. For example, access device 108 may communicate to all other devices in network 2100, including network device 2102, network device 2104, network device 2106, and network device 2108, information/data regarding its status. Such status data may include the fact that it is present and turned on, or other status data/information. At any time that network devices 2102, 2104, 2106 and 2108 recognize that access device 108 is present at network 2100, the network devices may communicate back to access device 108. For example, the network devices may send an acknowledgement (e.g., ACK signal) back to access device 108 to confirm that they received the status data sent by access device 108. The network devices may also send their own status data to access device 108.

While network devices 2102-2108 and access device 108 may each receive communication from other network devices around the network 2100, including the status of each of those network devices, network devices 2102-2108 and/or access device 108 may be continuously scanning network 2100 (including, for example, running discovery algorithms) to determine whether any devices within the network have moved, turned on/off or otherwise added to or subtracted from the network 2100, or have otherwise changed statuses.

Since network devices 2102-2108 and access device 108 may each receive communication from other devices around network 2100, including the status of each of those devices, each network device within network 2100 may know the status of each other network device in the network 2100. For example, access device 108 or devices 2102-2108 may not be required to communicate with cloud network 114 in order to obtain one or more of such statuses. Since cloud network 114 is an external network and may be remote from network 2100, communication between network devices within the network 2100 and cloud 114 may take more time than communication between two devices within network 2100. For example, communication between devices within network 2100 may take anywhere from 1 millisecond to 100 milliseconds, while communication between a device within network 2100 and the cloud network 114 may take anywhere from 50 milliseconds to 1 second or more). Furthermore, if a network device is retrieving information from cloud 114, the request must travel from the network device to cloud network 114, and then the information must travel back from cloud network 114 to the network device. This process may double the latency caused by retrieving information with cloud 114. Therefore, devices within the network 2100 may choose to send and receive/retrieve statuses directly with other devices within the network 2100 instead of communicating such information via cloud network 114. When a network device receives status data from another network device on the device's local area network 2100, it may store that status data so that it may retrieve and use that status data at a later time.

Figure 22:
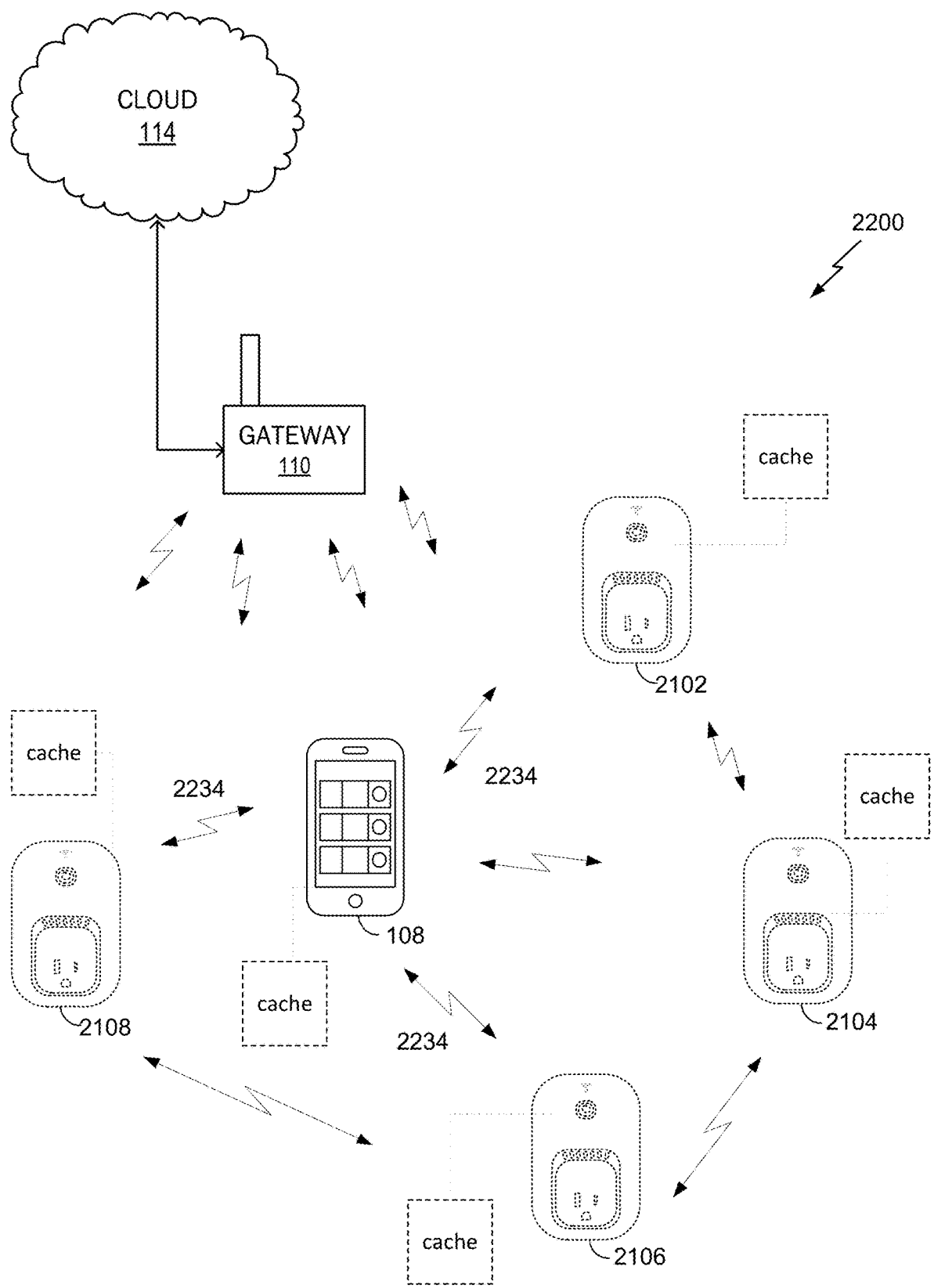
FIG. 22 is an illustration of an example of a network environment, in accordance with some embodiments.

FIG. 22 illustrates an example of a network 2200, according to embodiments of the present invention. The local area network 2200 may include network device 2102, network device 2104, network device 2106, network device 2108, and access device 108. FIG. 22 also illustrates that one or more network devices 2102-2108 and/or access device 108 may include a storage device, such as a cache, for storing data, including data regarding its own status and data regarding statuses received from the other devices within local area network 2200. For example, access device 108 may, after being powered up, broadcast/send its status to network device 2108 via communication 2234. Network device 2108 may store the status data received from access device 108 until the next time access device 108 updates its status by sending new/updated status data to network device 2108. Cache may be used for storage within network devices 2102-2108 and/or access devices within the local area network 2200 so that each of the devices may be able to quickly retrieve the data it needs from storage. An application operating on the access device 108 can access the cache to obtain information to display the visual interface for each network device 2102-2108 registered within the network 2200. Although a caching device may be used to store such data within the network and/or access devices within the local area network 2200, other types of storage may be used.

The cache can contain a known interface list including interface information for different, known types of devices. The known list can include a record for each network device known by the access device 108 to exist on the network 2200. When an application is run on the access device 108, the access device 108 can access the known interfaces in the cache to present the display of access device 108. The display can present one or more visual interfaces, each corresponding to a network device known to exist on the network 2200. Each visual interface can be generated based on a visual interface module corresponding to each device on the network 2200. In an example, the display can include a visual interface (e.g., a module tile) for each device in the network 2200 having an interface in the known interface list.

The cache can also contain known status information about each network device in the known device list. When the application is run on the access device 108, the access device 108 can access the known status information in the cache to present a status display. The access device 108 can populate each tile with an indicator representing the respective known status information for each device in the known device list. The status display can include an indicator of one or more attributes, one or more settings, or a combination thereof related to operation of each device in the network 2200. For example, the status display can include a speed of a fan (e.g., a fan speed of 56 in a range of values between 0 and 100) of the network device 2102 (e.g., a fan), a value of sensitivity of a sensor (e.g., a value of 34 in a range of values 0-100) for the network device 2104 (e.g., a motion sensor), a value of brightness (e.g., 65 percent brightness) for the network device 2106 (e.g., a light bulb), and a value of temperature (e.g. a slow cooker). Although shown as having a single indicator for an attribute or a setting related to operation of a network device, the status display can present a plurality of indicators corresponding to different attributes and/or settings related to operation of a network device.

In some embodiments, the cache can include other information about a network device. The other information can indicate a device's firmware version, last known firmware update status, connectivity to cloud status, registration status (e.g., whether the network device has a key or not), and other such information. The cache can include information that could be used for troubleshooting. In embodiments described below, the access device 108 can access status information from another other device on the network 2200 and can use that information to update its own cache, update the status display, and/or pass the information to the cloud network 114 and/or the gateway 110 for trouble shooting and/or storage.

Even though each network device may know and store (e.g. in cache) the state of each other network device within local area network 2200, a network device may not know when another network device changes status (e.g. turns/powers off). However, network devices and/or access devices within local area network 2200 may broadcast/send any updates in its status to other devices on the network. For example, if network device 2102 changes status, it may send status data to the other network devices, such as network devices 2104, 2106 and 2108 and to access device 108. However, network device 2102 may not know which devices to update since the other devices may change statuses periodically (e.g. turn off).

Therefore, a network or access device may subscribe to another network or access device within local area network 2200. For example, network devices 2104, 2106 and 2108 and access device 108 may subscribe to status data notifications/updates from network device 2102. Such a subscription may be registered for upon initial connection with network device 2102 when network device 2102 first enters local area network 2200 or at any other time after network device 2102 has been associated with local area network 2200. Subscriptions may be controlled to last indefinitely or may expire after a certain predetermined period of time after initial subscription. However, network devices may re-subscribe to another network device before or after their previous subscription has expired.

Subscriptions between network device and/or access devices may be registered, similar to registering a network device upon initial entrance into the local area network, including security registrations described herein with respect to FIGS. 1 and 2. For example, a network device may send its unique security key, which it may have stored along with its network ID after being registered on the network, to a network device to which it wants to subscribe. However, subscriptions may take on many other forms, including sending a different form of identification to a network device to which a network device wants to subscribe. However, subscriptions may take on many other forms, including sending a different form of identification to a network device to which a network device wants to subscribe.

Upon receiving a subscription from another network device or access device, the device being subscribed to may store a list of the devices that subscribed to it. For example, network device 2102 may store a list of network devices 2104, 2106 and 2108 and access device 108 after those devices subscribe to network device 2102. Then, when network device 2102 undergoes a change in status, network device 2102 may send that change in status to only the devices that had previously subscribed to it but where the subscription had not yet expired. Furthermore, according to some embodiments, the subscription list of a network device may be automatically updated if that device receives notification that another device has left the range of the local area network, either from that device itself or from a different device. Therefore, the various devices within a given local area network, such as network 2200, each contain continuously updated statuses of each other device on the network and obtain those statuses and updates through direct communication without necessary use of the cloud.

Figure 23:
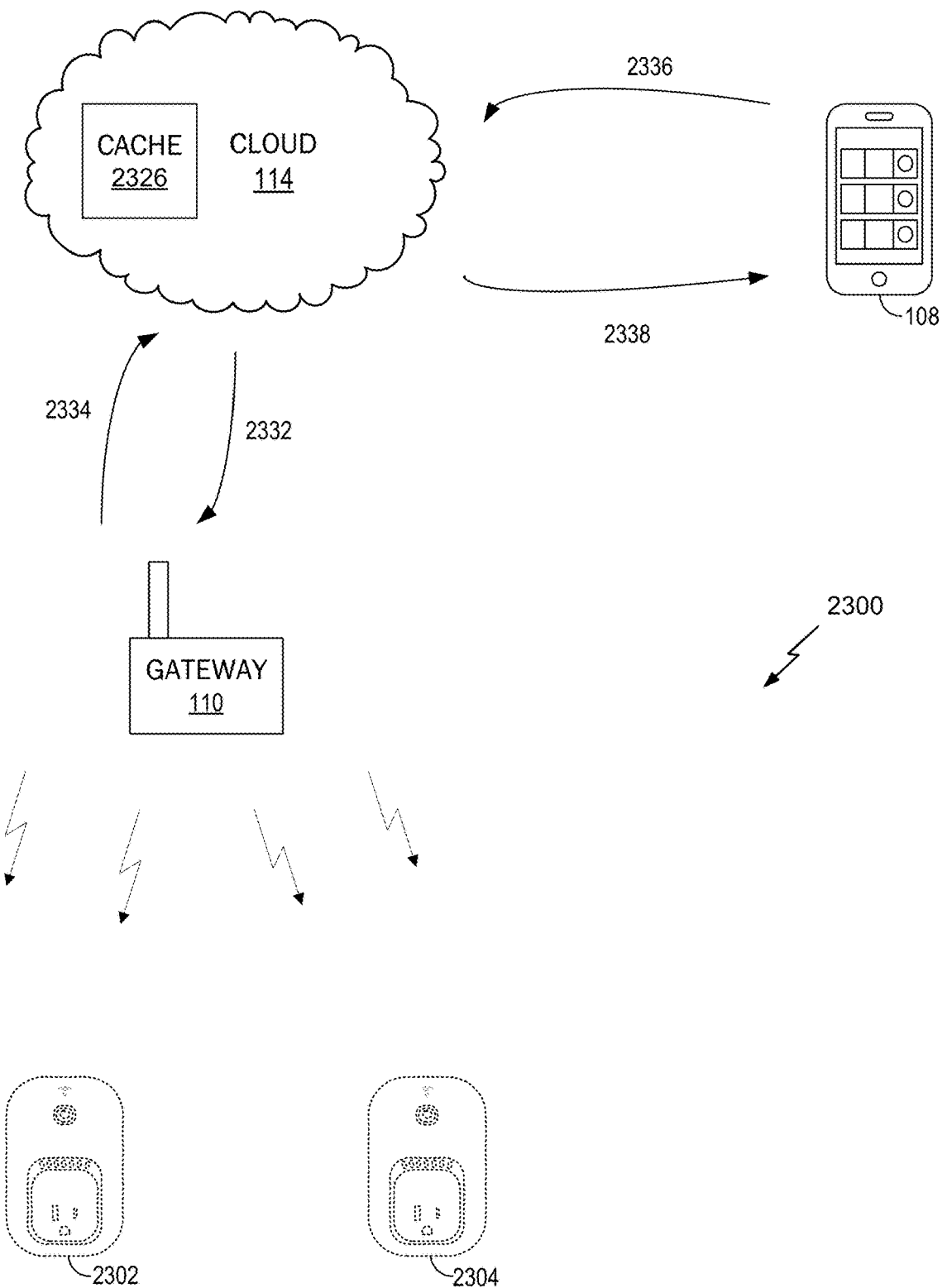
FIG. 23 is an illustration of an example of a network environment, in accordance with some embodiments.

FIG. 23 illustrates an access device 108 that is located remotely from network 2300 (e.g. local area network), according to embodiments of the present invention. Local area network 2300 includes gateway 110 and network devices 2302 and 2304 (which may be, for example, the same as any of network devices 2102-2108 in FIGS. 21 and 22), as shown in FIG. 23. However, network 2300 may also include a variety of other network devices and one or more access devices directly connected to network 2300. Gateway 110 is connected to cloud network 114, and allows network devices 2302 and 2304 to connect to cloud 114, the internet, or other external networks via gateway 110. In some embodiments, the network devices 2302 and 2304 may include home automation devices that allow a user to access, control, and/or configure various home appliances located within the user's home, such as a television, radio, light, microwave, iron, and/or the like.

Access device 108 is not directly connected to network 2300. Instead, access device 108 is external to network 2300 and may connect to cloud network 114 and to network 2300 via cloud network 114. As noted, network devices 2302 and 2304 may change status on a periodic basis. In some embodiments, even when external to and not directly connected to network 2300, an access device may request to check the status of the devices on the network. When access device 108 seeks to check the status of any device on the network, the access device 108 may transmit/send a communication 2336 to the cloud network 114, to which all devices on the network are connected either directly or indirectly via gateway 110. Since the cloud network 114 stores an updated table/list of the statuses of each of the devices within the requesting access device's network, the cloud network 114 may transmit a communication 2338 of such status data to the access device 108. For example, after network devices 2302 and 2304 are turned on, authenticated and are a part of network 2300, network devices 2302 and 2304 may communicate their statuses to cloud network 114. Furthermore, any time the status of network devices 2302 and 2304 changes, the device that incurred a status change may push/send information (e.g. an indication) of that status change to cloud network 114. Cloud network 114 may store, in cache 2326 or otherwise, the statuses (which may be time stamped in metadata or otherwise) of network devices 2302 and 2304. Therefore, when access device 108 requests from cloud network 114 the statuses of devices on network 2300, cloud 114 may send its most recently stored/updated statuses to access device 108.

To obtain the most updated status data of devices within network 2300, cloud 114 may, upon receiving a request for status data related to network devices 2302 and 2304, transmit/send a communication 2332 (e.g. request, query, etc.) for such status data to network devices 2302 and 2304 via gateway 110. Once network devices 2302 and 2304 receive this request, network devices 2302 and 2304 may send a communication 2334 (e.g. updated status data) to cloud 114 to replace the previously stored/cached statuses in cache 2326. Upon receipt of updated status data 2334 from network 2300, cloud 114 may send a communication 2338 of such status data to the access device 108.

However, the process of cloud network 114 requesting updated statuses from network devices 2302 and 2304 within network 2300 may cause latency within the system. More specifically, the time required for cloud network 114 to request updated statuses from network devices 2302 and 2304 and to in turn receive updated statuses from network devices 2302 and 2304 may be substantially greater than the time required for cloud network 114 to send its currently stored statuses (without being updated) for network devices 2302 and 2304 to access device 108. For example, of the total time required for access device 108 to receive updated statuses from cloud network 114, 80% or more of that total time may include cloud network 114 requesting updated statuses from network devices 2302 and 2304. On the other hand, of the total time required for access device 108 to receive updated statuses from cloud network 114, 20% or more of that total time may include the status data being transmitted from cloud network 114 to access device 108. Since a majority of the process required for access device 108 to request and receive status data for network devices 2302 and 2304 is the transmission of data between cloud 114 and network devices 2302 and 2304, the access device 108 and cloud network 114 may maximize efficiency by minimizing the effect of the transmission of data between cloud 114 and network devices 2302 and 2304 on the whole process/system.

Substantial variations may be made in accordance with specific requirements. For example, customized hardware might also be used, and/or particular elements might be implemented in hardware, software (including portable software, such as applets, etc.), or both. Further, connection to other access devices, network devices, electronic devices, or computing devices such as network input/output devices may be employed.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

While illustrative embodiments of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method, comprising:
   receiving, at a computing device on a network, image data associated with an image of an electronic device on the network, wherein the electronic device is associated with a user, and wherein the image data was captured at an access device associated with the user;
   receiving, at the computing device, textual data associated with the electronic device, wherein the textual data was inputted at the access device and transmitted to the computing device, and wherein the textual data includes identification information associated with the electronic device;
   analyzing, by the computing device, the image data and textual data;
   identifying a type of the electronic device based on the analysis of the image data and the textual data;
   monitoring, by the computing device, multiple other electronic devices of a same type as the electronic device over time, and gathering usage data associated with the multiple other electronic devices;
   analyzing, by the computing device, the usage data associated with the other electronic devices of the same type to determine one or more automation parameters common to the other electronic devices;
   transmitting, to the access device, a query to determine whether the one or more automation parameters should be applied to the electronic device, wherein after the query is received, the query is presented to the user;

receiving, at the computing device, a response to the query, wherein the response to the query was inputted by the user at the access device; and applying the automation parameters to the electronic device based on the response to the query by the user.

2. The computer-implemented method of claim 1, further comprising:

transmitting a communication to the access device, and wherein the communication includes content related to usage of the electronic device.

3. The computer-implemented method of claim 2, wherein the content related to usage of the electronic device includes a rule.

4. The computer-implemented method of claim 2, wherein the content related to usage of the electronic device corresponds to an interaction between the electronic device and another electric device in a shared network.

5. The computer-implemented method of claim 1, wherein analyzing the usage data associated with the other electronic devices includes determining rules associated with usage of the other electronic devices.

6. The computer-implemented method of claim 1, wherein analyzing the image data includes image processing, and wherein analyzing the textual data includes natural language processing.

7. The computer-implemented method of claim 1, wherein the electronic device is electrically coupled to a network device that connects the electronic device to the network.

8. The computer-implemented method of claim 1, wherein the computing device is a network device, a user device, or a cloud-based device.

9. A system, comprising:

one or more data processors; and a non-transitory computer-readable storage medium containing instructions which when executed on the one or more data processors, cause the one or more processors to perform operations including:

receiving, at a computing device on a network, image data associated with an image of an electronic device on the network, wherein the electronic device is associated with a user, and wherein the image data was captured at an access device associated with the user;

receiving, at the computing device, textual data associated with the electronic device, wherein the textual data was inputted at the access device and transmitted to the computing device, and wherein the textual data includes identification information associated with the electronic device;

analyzing, by the computing device, the image data and textual data;

identifying a type of the electronic device based on the analysis of the image data and the textual data;

monitoring, by the computing device, multiple additional electronic devices of a same type as the electronic device over time, and gathering usage data associated with the multiple additional electronic devices;

analyzing, by the computing device, the usage data associated with the additional electronic devices of the same type to determine one or more automation parameters common to the additional electronic devices;

transmitting, to the access device, a query to determine whether the one or more automation parameters should be applied to the electronic device, wherein after the query is received, the query is presented to the user;

receiving, at the computing device, a response to the query, wherein the response to the query was inputted by the user at the access device; and applying the automation parameters to the electronic device based on the response to the query by the user.

10. The system of claim 9, wherein the instructions further comprise:

transmitting a communication to the access device, and wherein the communication includes content related to usage of the electronic device.

11. The system of claim 10, wherein the content related to usage of the electronic device includes a rule.

12. The system of claim 10, wherein the content related to usage of the electronic device corresponds to an interaction between the electronic device and another electric device in a shared network.

13. The system of claim 9, wherein analyzing the usage data associated with the additional electronic devices includes determining rules associated with usage of the additional electronic devices.

14. The system of claim 9, wherein analyzing the image data includes image processing, and wherein analyzing the textual data includes natural language processing.

15. The system of claim 9, wherein the electronic device is electrically coupled to a network device that connects the electronic device to the network.

16. The system of claim 9, wherein the computing device is a network device, a user device, or a cloud-based device.

17. A computer-program product tangibly embodied in a non-transitory machine-readable storage medium, including instructions configured to cause a data processing apparatus to perform operations including:

receiving, at a computing device on a network, image data associated with an image of an electronic device on the network, wherein the electronic device is associated with a user, and wherein the image data was captured at an access device associated with the user;

receiving, at the computing device, textual data associated with the electronic device, wherein the textual data was inputted at the access device and transmitted to the computing device, and wherein the textual data includes identification information associated with the electronic device;

analyzing, by the computing device, the image data and textual data;

identifying a type of the electronic device based on the analysis of the image data and the textual data;

monitoring, by the computing device, multiple additional electronic devices of a same type as the electronic device over time, and gathering usage data associated with the multiple additional electronic devices;

analyzing, by the computing device, the usage data associated with the additional electronic devices of the same type to determine one or more automation parameters common to the additional electronic devices;

transmitting, to the access device, a query to determine whether the one or more automation parameters should be applied to the electronic device, wherein after the query is received, the query is presented to the user;

receiving, at the computing device, a response to the query, wherein the response to the query was inputted by the user at the access device; and applying the automation parameters to the electronic device based on the response to the query by the user.

18. The computer-program product of claim 17, wherein the operations further comprise:
transmitting a communication to the access device, and wherein the communication includes content related to usage of the electronic device.

19. The computer-program product of claim 18, wherein the content related to usage of the electronic device includes a rule.

20. The computer-program product of claim 18, wherein the content related to usage of the electronic device corresponds to an interaction between the electronic device and another electric device in a shared network.

* * * * *